US012061771B2

United States Patent
Schur

(10) Patent No.: US 12,061,771 B2
(45) Date of Patent: Aug. 13, 2024

(54) SYSTEM AND METHOD FOR VISUAL STREAMS/FEEDS/SERVICES AND NO-CODING PROGRAMMING/MANAGEMENT INTERFACE OF ∞™ I-BUBBLETAG TRUSTED APPLICATION/HUMAN FLOWS AND OF ∞™ I-BUBBLETAG ADDRESSABLE/MEASURABLE RESOURCES FOR END SUPPLY EXCELLENCE

(71) Applicant: Patrick Schur, Magden (CH)

(72) Inventor: Patrick Schur, Magden (CH)

( * ) Notice: Subject to any disclaimer, the term of this patent is extended or adjusted under 35 U.S.C. 154(b) by 0 days.

(21) Appl. No.: 17/560,401

(22) Filed: Dec. 23, 2021

(65) Prior Publication Data

US 2023/0205392 A1 Jun. 29, 2023

(51) Int. Cl.
*G06F 3/048* (2013.01)
*G06F 3/04817* (2022.01)
*G06F 3/0482* (2013.01)
*G06F 3/0484* (2022.01)
(Continued)

(52) U.S. Cl.
CPC ........ *G06F 3/0482* (2013.01); *G06F 3/04817* (2013.01); *G06F 3/0484* (2013.01); *G06F 21/32* (2013.01); *G06Q 10/06315* (2013.01)

(58) Field of Classification Search
CPC .. G06F 3/0482; G06F 3/04817; G06F 3/0484; G06F 21/32; G06Q 10/06315
See application file for complete search history.

(56) References Cited

U.S. PATENT DOCUMENTS 8,448,241 B1 * 5/2013 Kadakia ................ G06F 21/577
726/25
11,334,768 B1 * 5/2022 Brody ...................... G06N 3/08
(Continued)

FOREIGN PATENT DOCUMENTS

WO 2005015404 A2 2/2005
WO 2019135183 A1 7/2019

OTHER PUBLICATIONS

International Search Report, PCT/IB2019/050033, dated Nov. 7, 2019, 13 pages.

*Primary Examiner* — Hua Lu
(74) *Attorney, Agent, or Firm* — Gearhart Law, LLC; David Postolski

(57) ABSTRACT

Systems and methods for visual streams/Feeds and no-coding programming/management interface of trusted application/human flows and of addressable/measurable resources for end of supply excellence are described herein. Specifically, a biometrically controlled, crypto secure, peer-to-peer/service/authority/united trusted, "no touch" capable, space point independent, closed-loop self-resource/service-resource efficacy increasing, flexible assistant as a service is described that addresses the situational disconnected multi-channeling, over-processing and parallel communication flaws and lack of evidence/efficiency/non-identifiable transparency seen in current systems of (social) media and (physical) services, administration and overhead.

24 Claims, 51 Drawing Sheets

(51) Int. Cl.
*G06F 21/32* (2013.01)
*G06Q 10/0631* (2023.01)

(56) References Cited

U.S. PATENT DOCUMENTS

| | | | |
|---|---|---|---|
| 2007/0226032 A1* | 9/2007 | White | G06Q 10/101 |
| | | | 705/300 |
| 2008/0153517 A1* | 6/2008 | Lee | H04W 4/02 |
| | | | 455/457 |
| 2008/0208830 A1* | 8/2008 | Lauckhart | G06F 16/332 |
| 2008/0229253 A1* | 9/2008 | Carteri | G06F 8/34 |
| | | | 715/854 |
| 2008/0250333 A1* | 10/2008 | Reeves | G06F 3/0483 |
| | | | 715/753 |
| 2013/0185368 A1* | 7/2013 | Nordstrom | H04W 4/023 |
| | | | 709/206 |
| 2013/0215116 A1* | 8/2013 | Siddique | G06Q 20/40 |
| | | | 705/26.7 |
| 2013/0227700 A1* | 8/2013 | Dhillon | H04L 63/105 |
| | | | 726/26 |
| 2017/0353508 A1* | 12/2017 | Yoakum | H04L 65/4038 |
| 2018/0095733 A1* | 4/2018 | Torman | G06F 40/143 |
| 2018/0121476 A1* | 5/2018 | Bakke | G06F 16/122 |
| 2019/0205148 A1* | 7/2019 | Schur | G06F 9/453 |
| 2020/0074853 A1* | 3/2020 | Miller | G08G 1/012 |
| 2020/0125345 A1* | 4/2020 | Belagali | G06F 11/368 |
| 2021/0090449 A1* | 3/2021 | Smith | G06Q 30/0261 |

* cited by examiner

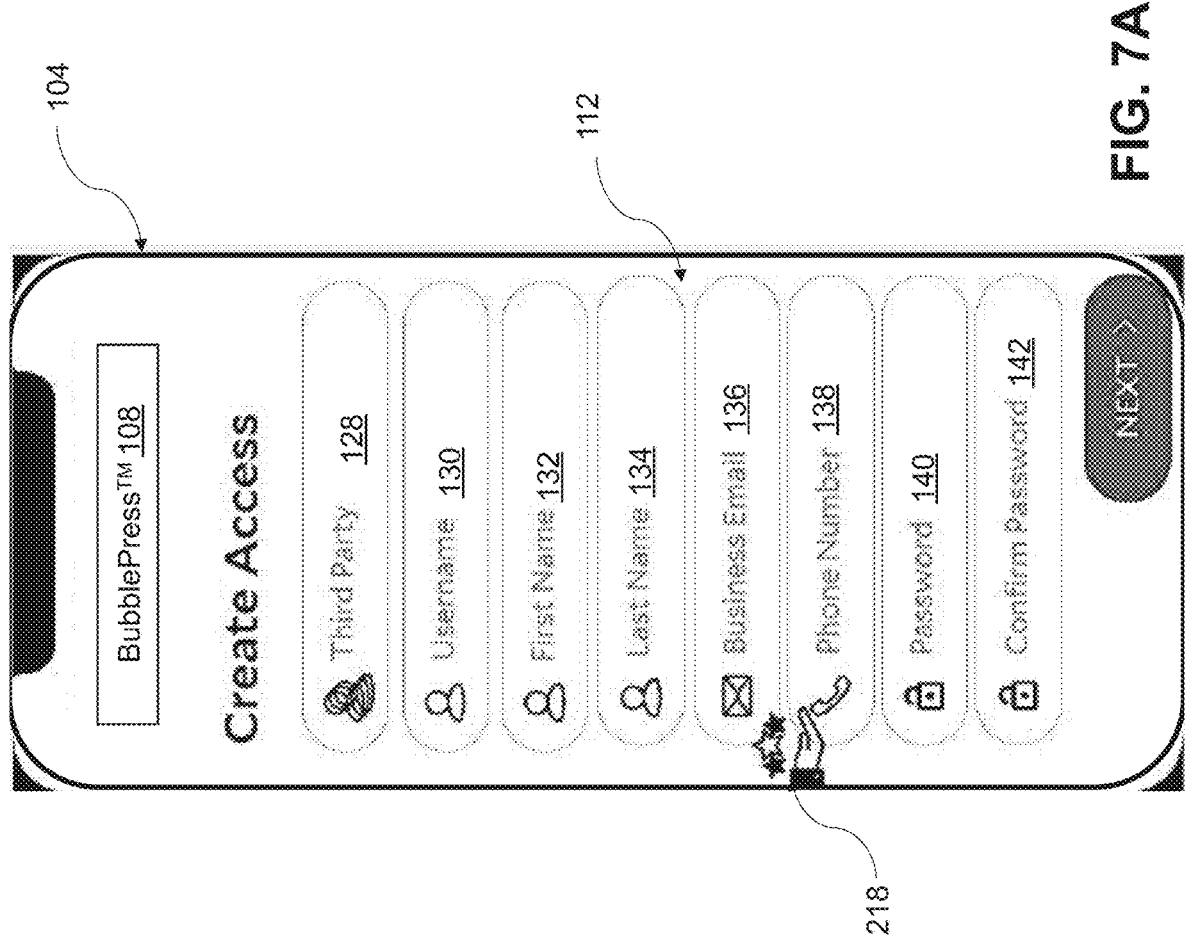

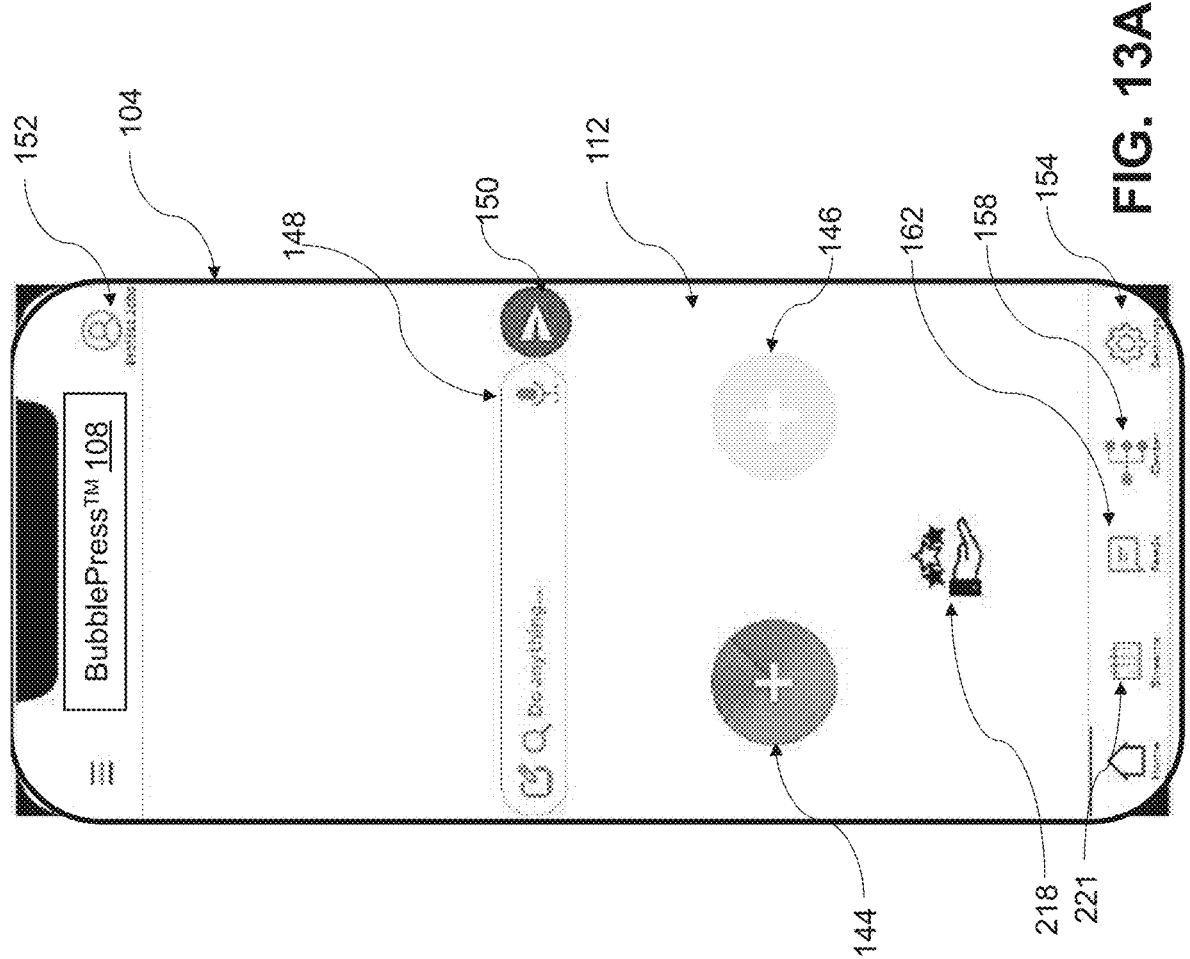

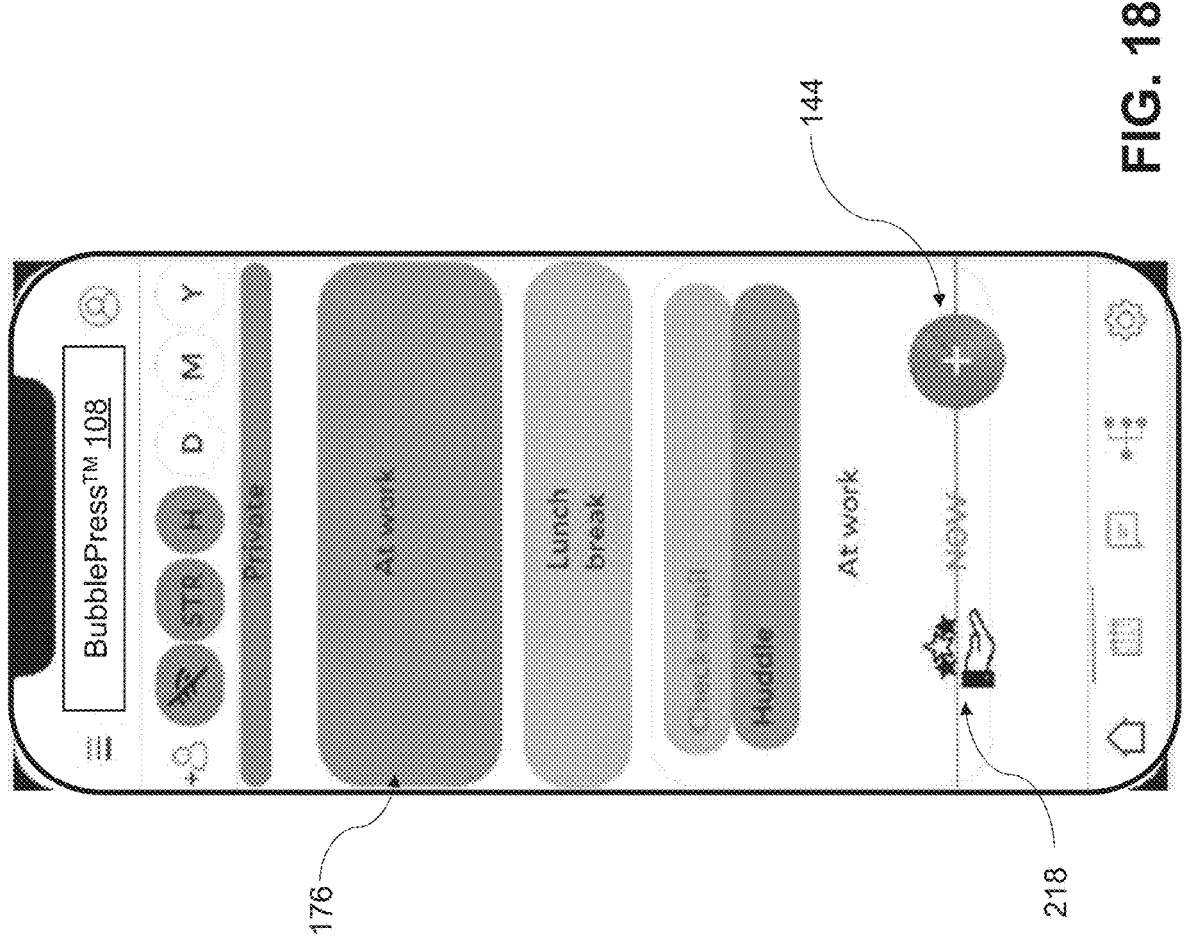

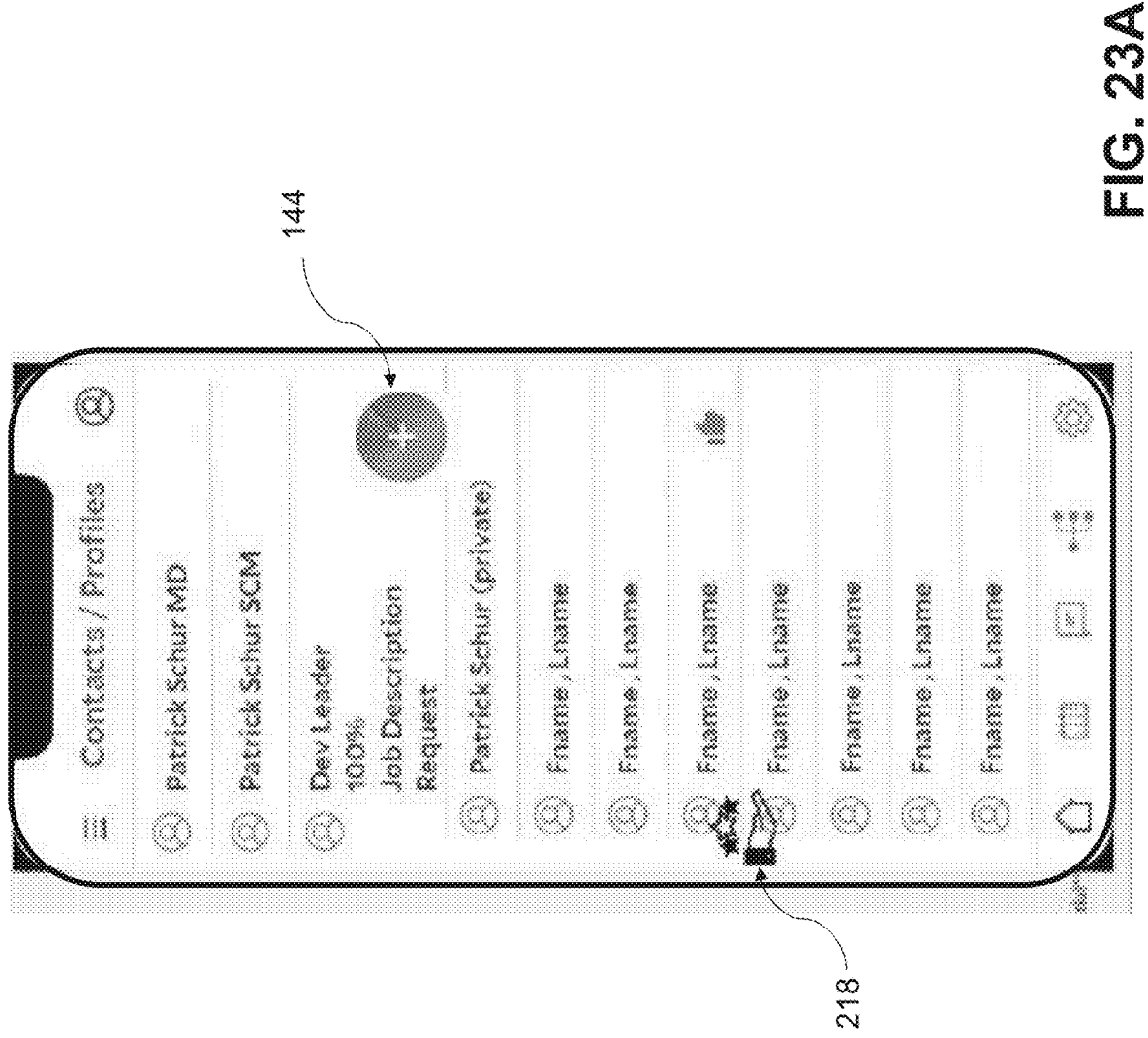

SYSTEM AND METHOD FOR VISUAL STREAMS/FEEDS/SERVICES AND NO-CODING PROGRAMMING/MANAGEMENT INTERFACE OF ∞™ I-BUBBLETAG TRUSTED APPLICATION/HUMAN FLOWS AND OF ∞™ I-BUBBLETAG ADDRESSABLE/MEASURABLE RESOURCES FOR END SUPPLY EXCELLENCE

FIELD OF THE EMBODIMENTS

The field of the invention and its embodiments relate to a system and a method for visual Streams/Feeds/Services and no-coding programming/management interface of ∞™ i-bubbletag trusted application/human flows and of ∞™ i-bubbletag addressable/measurable resources for end of supply excellence.

BACKGROUND OF THE EMBODIMENTS

Despite recent advancements in technology, the (personal) sharing of (social) information, easy understandable digital/human life process information and other resources between parties still poses challenges. For example, it is sometimes difficult to determine who has access or the necessary credentials to what information, which results in a lack of transparency and resource asymmetries, especially (social) process asymmetries. Additionally, it may be difficult to measure successes and pinpoint points of failure during the sharing process. These issues become heightened when dealing with supply chain systems.

In commerce, a supply chain is a system of organizations, people, activities, information, and resources involved in supplying a product or service to a consumer. Supply chain management extends from the acquisition of raw materials, through the manufacturing and distribution process, and typically ends at the point of consumption. In many instances, supply chain management is a disjointed process in which a particular manufacturer or distributor tracks portions of the supply chain, but may not incorporate individually serialized product records or pass the existing records to the next portion of the supply chain. In particular, oversight groups and end consumers may not have a simple access to, or an opportunity to contribute to, the supply chain data. Thus, what is needed is an enhanced system that allows for easy and transparent communication between parties, as well as the removal of such complexity from supply chain systems.

SUMMARY OF THE EMBODIMENTS

The present invention and its embodiments relate to a system and a method for visual Streams/Feeds and no-coding programming/management interface of ∞™ i-bubbletag trusted application/human flows and of ∞™ i-bubbletag addressable/measurable resources for end of supply excellence.

A first embodiment of the present invention describes a method executed by an application of a computing device to provide enhanced and transparent communication between users. The application is built on created i-Bubble™/application flow/human flow application-in-application elements/structures. The method includes numerous process steps, such as: receiving a prompt to authenticate a user via a verification method. The verification method may be a biometric identification method (e.g., a facial identification method, a fingerprint identification method, a palm print identification method, an iris recognition method, or a retina recognition method, among others) or a method utilizing login credentials. In response to authenticating the user, the user may be provided access to a Home Screen of the application.

It should be appreciated that the application described herein is an inter-programmable operating system in streams and Cross-Services on which templates of services or projects may be developed, provided, and shared. Moreover, the Cross-Services comprise virtual communication services that allow for communication, collaboration, and service productivity between the user and one or more other users and groups. These Cross-Services also allow the user to use any i-Bubble™ application-in-application (or "app-in-app") elements/structures and to define measurable resources on options or option sets (after having previously activated or deactivated the recording in the application-in-application settings) within the application such that time, money, material, human power engagements/workload, an Internet of Things (IoT) method, an RFID verification method, a WLAN/WIFI pattern/connection strength method, a voice recognition method, a noise recognition method, user actions taken and/or screen time on the computing device, infrared light emitting diode (LED) light changes, among others not explicitly listed herein and their surrogates (e.g. displacement over time, which defines a stream) may be combinable and/or shared with other streams. The templates of services and projects comprise digital semantic projections on personal Human Streams or "fireframes" with supply chain and co-working/co-creating capabilities on the go. Further, the application comprises an artificial intelligent (AI) no-coding interface for the anticipation of semantic resource chains, private suggested decision options and/or public trusted suggested decision options and/or authority trusted enforced restrictions on the go.

Furthermore, the method of the first embodiment also includes the following process steps: receiving, via a graphical user interface (GUI) of the computing device on the Home Screen and from the user, an i-Bubble™ representation associated with at least an input and a tag associated with text or steps/Demojis™/Demoticons™/spaghettis/sequences/chains/cycles/decision trees (e.g., menus/circles on each step). The user is configured to select a color, a sharing level, a trusting level, and a security level for the i-Bubble™ representation. The sharing level is selected for any resource including an information i-Bubble™ defined contact or contact group of sharing (e.g., a public or private sharing level). As described herein regarding the trusting level, every resource that is connected to an i-Bubble™ has to be in some cases or can be shared to somebody and on this way gets trusted or gets authentication by this published contact. As described herein, the security level is for personal sensitive information that should be crypto secure, e.g., hash graph storing and submission. The i-Bubble™ representation may be pushed to a thread based on the sharing level of each Cross-Service (e.g., Streams/«Dynamic Agenda», Feeds, Center/«Push and Pull Service Center», contacts, profiles, channels, and jobs/job applications/engagements).

The method may also include: receiving, from another user, an action executed on the text of the tag of the i-Bubble™ representation to find information flows or streams associated with the text of the tag. In some examples, the i-Bubble™ representation may be combined with one or more other i-Bubble™ representations to create a structure, such as: a menu/circle, and a flow structure, e.g., steps/Demojis™/Demoticons™/spaghettis/sequences/ chains/cycles/decision trees (e.g., menus/circles on each step). The method may further include: receiving, via the GUI, an action on a menu/circle to open or create a new project, an application flow/human flow application-in-application elements/structures or an appearance structure, where the appearance may be a high level i-Bubble™, checklist, a to-do list, a note, a spreadsheet, or a form.

In some examples, the method may include: receiving, via the GUI, an action on a streams icon, a Feeds icon, a Center/«Push and Pull Service Center» icon, and/or a settings icon. The Feeds icon allows for sharing of words, high-level i-Bubbles™ and other appearances, in addition specific application flows, human flows/streams, pushes/pulls, and/or any i-Bubble™ or application-in-application elements/structures. The i-Bubbles™ or the application-in-application elements/structures comprise projects, steps/Demojis™/Demoticons™/spaghettis/sequences/chains/cycles/decision trees or appearances. The Center/«Push and Pull Service Center» icon is used for services in a Center/«Push and Pull Service Center» and allows for two-sided or multi-sided sharing of the i-Bubble™ representation with an approve-reject tandem action ID push and ID pull button that improves trusted third-parties. Further, the settings icon allows for the adoption of Feed settings, Center settings and for the creation of application-in-application settings, like options/option sets including any personal resources, one-way-action buttons, tandem-action buttons and the creation of a menu/circle with add-on and split function.

Moreover, the method may additionally include: receiving, via the GUI and through a contact channel, communication (e.g., contacts, profiles, channels, and/or jobs/job applications/engagements) from the user to one or more other users. The contact channel is trusted based on a verification method, such as described above.

The method may further include: providing the user safe access to the web via a biometric method or via scanning a QR code. Furthermore, in some examples, the application may include an artificial intelligent (AI) assistant or engine configured to provide the user with best matched suggestions of private inputs or public trusted inputs.

A second embodiment of the present invention describes a computer system. The computer system includes: one or more processor, one or more memories, and one or more computer-readable hardware storage devices. The one or more computer-readable hardware storage devices contain program code executable by the one or more processors via the one or more memories to implement a method for providing enhanced and transparent communication between users.

The method includes numerous process steps, such as: receiving a prompt to authenticate a user via a verification method; providing the user access to an application in response to authenticating the user; receiving, from the user, an i-Bubble™ representation associated with at least an input and a tag associated with text; receiving, from the user, a selection of a color, a sharing level, a trusting level and a security level for the i-Bubble™ representation; and combining the i-Bubble™ representation with one or more other i-Bubble™ representations to create a structure. The structure is a menu/circle and a flow structure (e.g., steps/Demojis™/Demoticons™/spaghettis/sequences/chains/cycles/decision trees (e.g., menus/circles on the cycle). Moreover, the application has built-in human flow application-in-application elements/structures and streams.

It should be appreciated that the application is an interprogrammable operating system in streams and Cross-Services on which templates of services or projects may be developed, provided, shared and individualized. The Cross-Services comprise virtual communication services that allow for communication between the user and one or more other users and for the user to define resources on options within the application such that over time, a stream may be created that is comparable (interference) and combinable with other streams. Moreover, the templates of services and projects comprise supply chain capabilities.

BRIEF DESCRIPTION OF THE DRAWINGS

FIG. 7A depicts a user-side schematic diagram depicting a GUI of a computing device of a system on which a user may create login credentials to access a BubblePress™ application, in accordance with embodiments of the present invention.

FIG. 8 depicts a user-side schematic diagram associated with the comparison and interference analysis (and if edit permissions are given as well adoptions) of two different existing application-in-application element/structure-based projects by using a space, the tag+ and a space between the project/element/structure titles, in accordance with embodiments of the present invention.

FIG. 13A depicts a user-side schematic diagram of a Home Screen of a BubblePress™ application of a system, in accordance with embodiments of the present invention.

FIG. 18 depicts a user-side schematic diagram depicting a Dynamic Agenda/Human Streams ('fireframes') in a BubblePress™ application of a system, in accordance with embodiments of the present invention.

FIG. 23A depicts a user-side schematic diagram associated with a listing of contacts, profiles, channels, and jobs/job applications/engagements for various users in a BubblePress™ application of a system, where a job description has been requested, in accordance with embodiments of the present invention.

DESCRIPTION OF THE PREFERRED EMBODIMENTS

Figure 1:
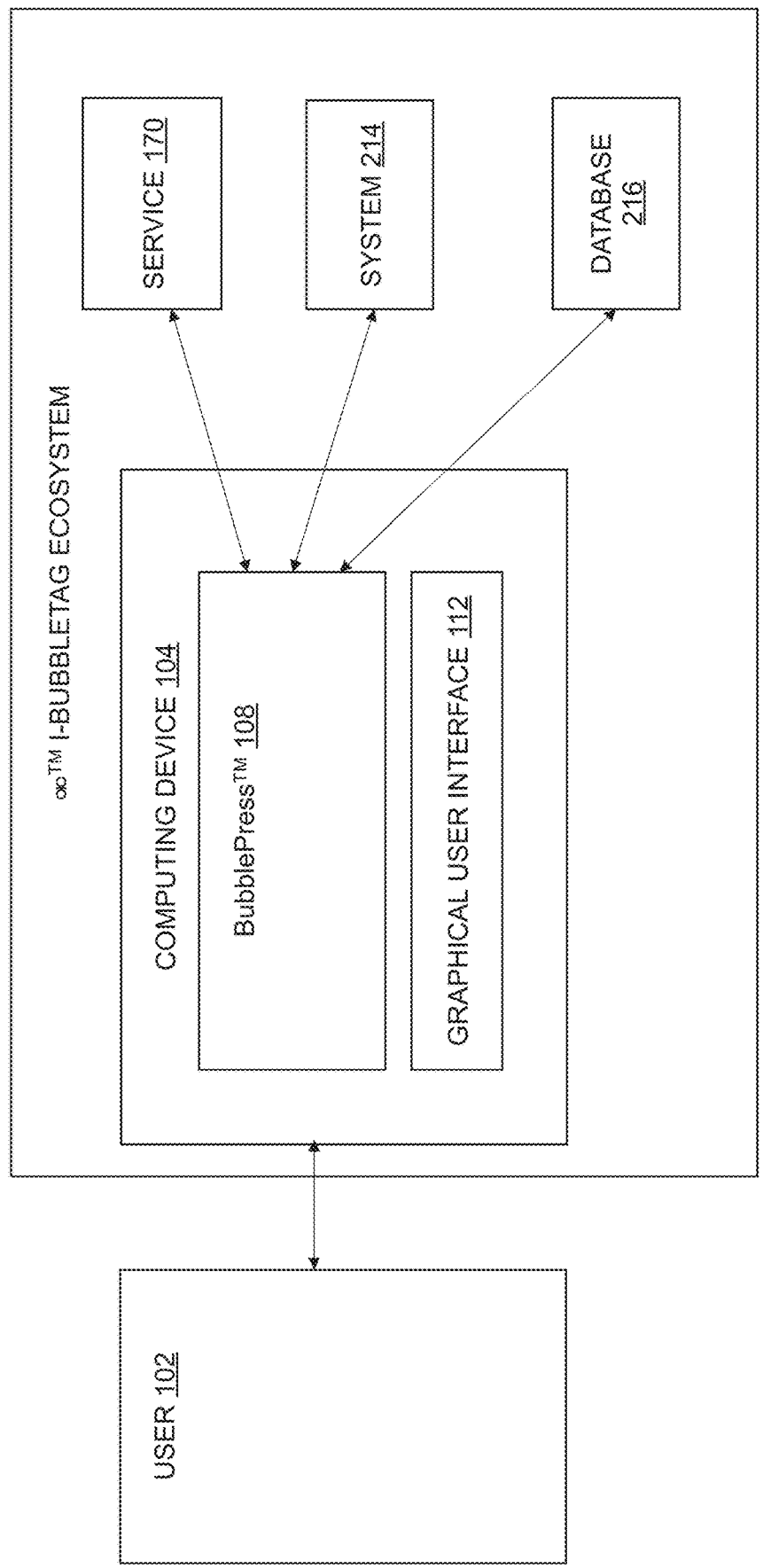
FIG. 1 depicts a block diagram of a system, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The present invention leverages experience based, qualitative analysis of information channel systems according to a certain degree of modularity or subsystem. Furthermore, the present invention seeks to provide a biometric verified, crypto secured, flexible, in-stream and dynamic application (deemed BubblePress™) 108. Additionally, the present invention seeks to address the multi-channeling, over-processing and parallel communication flaws seen in current systems by providing a biometrically controlled, crypto secure, peer-to-peer/service/authority/united trusted, "no touch" capable, space point independent, closed-loop self-resource/service-resource efficacy increasing, flexible assistant as a service (e.g., the BubblePress™ application 108).

Moreover, an integrated, personalized, bottom-up self-monitoring and no-coding programming/management system described herein interacts through standardized communication modules that allow in-stream dynamic process management and connect the digital to human life with respect to personalized "information stewardness" and safety of personalized information (such as e-health information). As described herein "information stewardness" includes personalized information exchange to different sharing, trusting and security levels, and at best, a biometric crypto secure level. Moreover, the i-Bubble™ stewardness also describes the advanced "COPY, CUT, PASTE" of the user. If any word or sentence of a message, note, or spreadsheet etc. (appearances), menu/circle, or spaghetti/flow (cycles) is addressed by an ∞™ i-bubbletag, it is visualized on the i-Bubble™ on a mobile screen.

Further, any sentence in one i-Bubble™ can be subdivided into i-Bubbles™, each with one word and each addressed by an ∞™ i-bubbletag, visualized on the i-Bubble™ on the mobile screen. In additional examples, any i-Bubble™ with a word can be fused (like words to a sentence) into one i-Bubble™ with a sentence, with each being addressed by an ∞™ i-bubbletag, visualized on the i-Bubble™ on the mobile screen. Additionally, any i-Bubble™ with a word or sentence can be "highlighted" or marked as a high level i-Bubble™ and any hashtag can be added without being part of a sentence—the same is true for the ∞™ i-bubbletag. Further, any i-Bubble™ with a word or sentence can be marked as a low level i-Bubble™. Every activated resource measurement and the sets of these different measurements 'on the go' are used to connect the user/human to real life if these measurements are visualized as the i-Bubble™ on the mobile screen and may also be used for interferences or as a "ping" for needed user actions.

Furthermore, the i-Bubble™ stewardness describes the advanced "COPY, CUT, PASTE" of the application-in-application (or "app-in-app") user. If any window or bubble on the mobile screen is addressed by the oo™ i-bubbletag, each is put on a menu/circle or spaghetti/flow in user modus, visualized on the i-Bubble™ on the user mobile screen.

The adopted BubblePress™ application user described herein is able to adopt given templates as an application-in-application user, is able to switch between both modus (e.g., user modus and the application-in-application modus), is able to switch between Feed settings, Center settings, the application-in-application settings, and is able to use no-coding commands on a Home Screen input line.

The present invention not only provides a programming/management or no-coding operating system that allows for interaction between people, but the present invention provides a singular (work)space to do so and allows for necessary transparency.

Figure 3A:
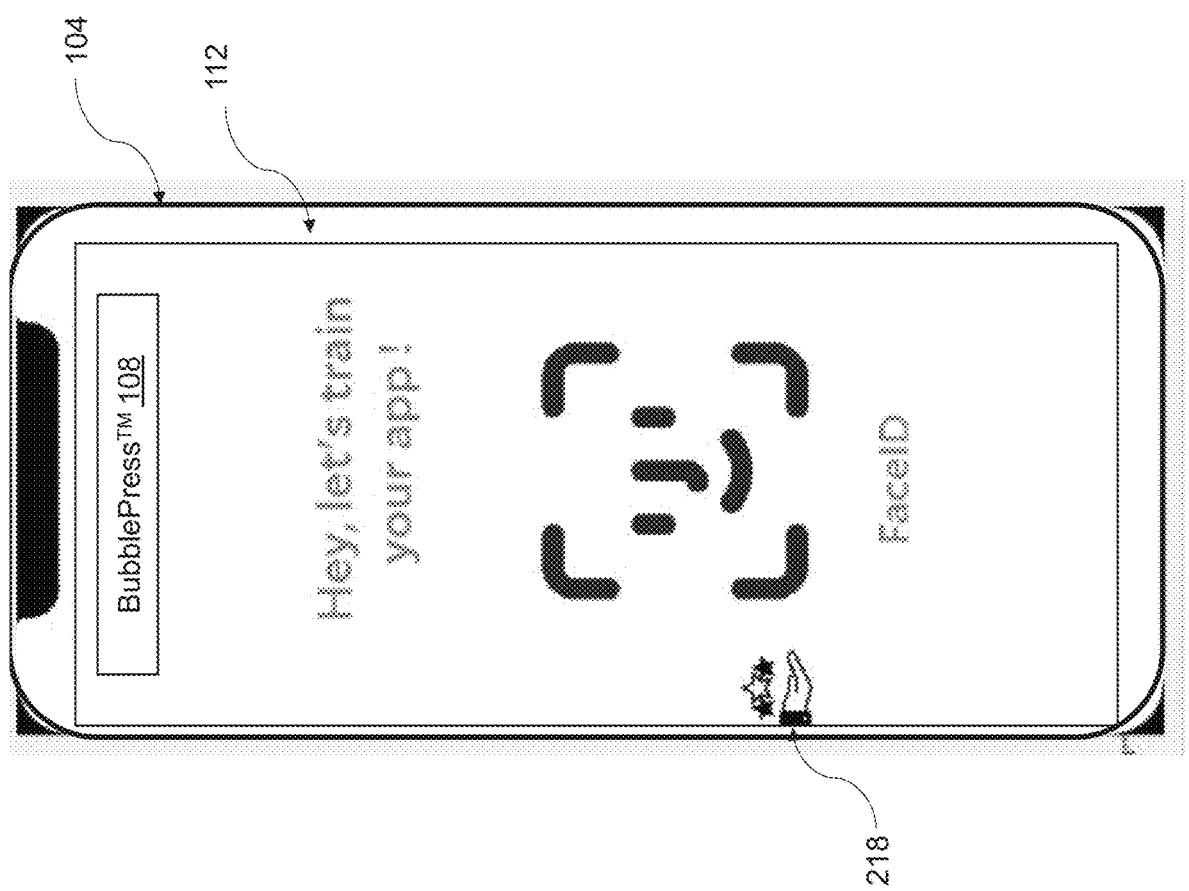
FIG. 3A depicts a user-side schematic diagram depicting a facial identification method on a graphical user interface (GUI) of a computing device, in accordance with embodiments of the present invention.
Figure 3B:
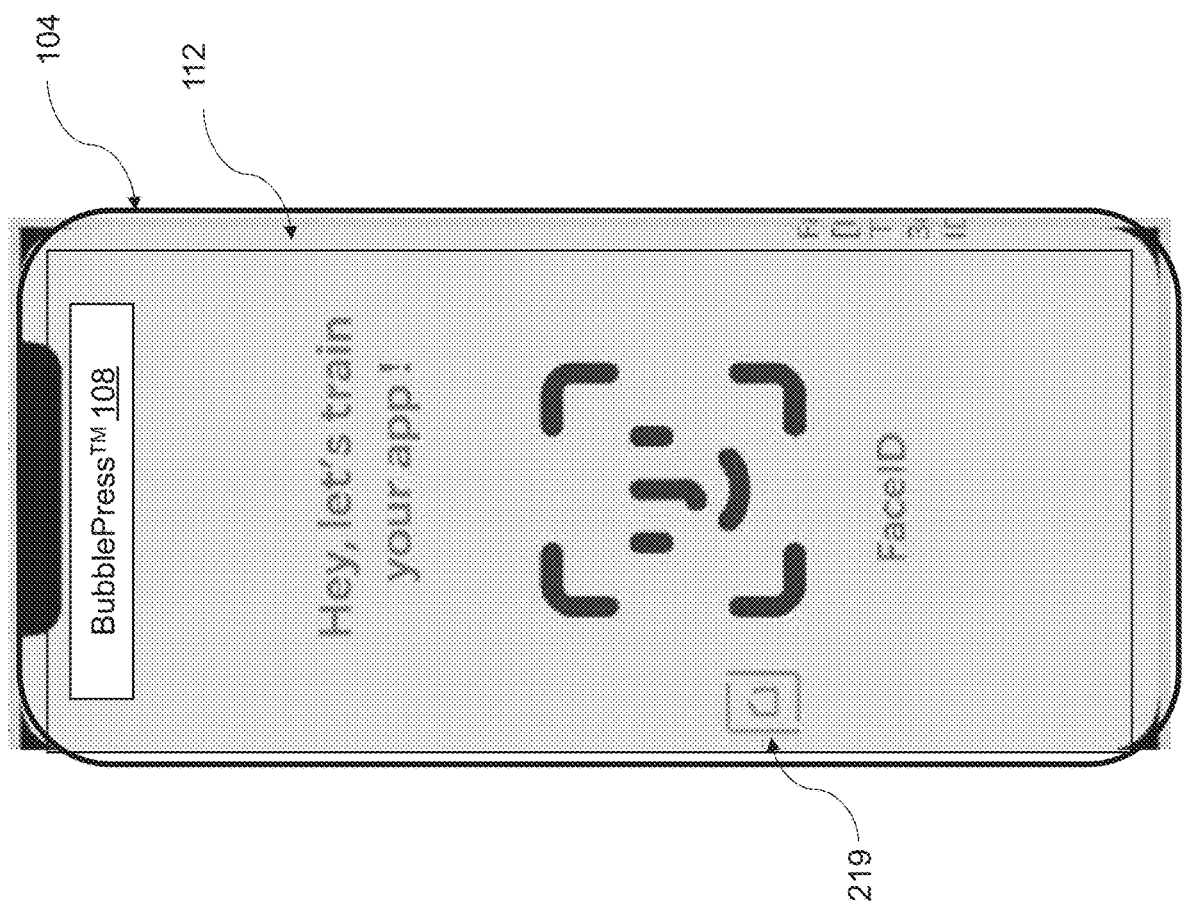
FIG. 3B depicts a schematic diagram depicting a facial identification method on a graphical user interface (GUI) of a computing device of a system that is configurable, in accordance with embodiments of the present invention.

As shown herein, FIGS. 3A, 4, 5A, 6, 7A, 7C, 8, 9, 13A, 17A, 18, 20, 21, 22, 23A, 23B, 24A, 25A, 26A, 27A, 28A, 29A, 30A, 31A, and 32 depict schematic diagrams of what a user sees when interacting with the application described herein. FIGS. 3B, 5B, 7B, 10, 11, 12, 13B, 14, 15, 16, 17B, 19, 23C, 23D, 24B, 25B, 26B, 27B, 28B, 29B, 30B, and 31B are configurable. Moreover, FIG. 3A depicts a schematic diagram for a user on the application and FIG. 3B depicts a schematic diagram for the user on the application, where the user can search, write, and execute no-coding commands.

Any user can give Beta-Feedback on white fireframes (e.g., FIGS. 3A, 4, 5A, 6, 7A, 7C, 8, 9, 13A, 17A, 18, 20, 21, 22, 23A, 23B, 24A, 25A, 26A, 27A, 28A, 29A, 30A, 31A, and 32), and any application-in-application user can write feedback with words or/and i-Bubble™ elements and switch back to the app modus by clicking on the house on the purple fireframe (e.g., FIGS. 3B, 5B, 7B, 10, 11, 12, 13B, 14, 15, 16, 17B, 19, 23C, 23D, 24B, 25B, 26B, 27B, 28B, 29B, 30B, and 31B).

FIG. 1 depicts a schematic diagram of a system. The system generally includes a computing device 104. The computing device 104 may be a computer, a laptop computer, a smartphone, and/or a tablet, among other examples not explicitly listed herein. The computing device 104 may also include an application 108 (e.g., deemed "BubblePress™") that is accessible by a user 102 via a graphical user interface (GUI) 112 of the computing device 104. The BubblePress™ application 108 may interact with, communicate with, or exchange data with a service 170, a system 214, and/or a database 216. Specifically, the oo™ i-bubbletag ecosystem diverts to the biometric crypto secure BubblePress™ application 108, platform, and service. Moreover, it should be appreciated that the BubblePress™ application 108 is built on certain human flow elements that are created.

More specifically, static applications are normally designed on what is known as a wireframe. The present invention is an application and an application-in-application in a Human Stream, which integrates the handshake of human flow on the same i-Bubble™ elements or application-in-application elements/structures. The Human Stream is defined in the settings, specifically in the application-in-application setting via the selection and combination of different options or option sets. One option could be the activated option, e.g., "daylight—night", or the option "flexible time window." Another option could be the following: we could schedule a dinner together when on the stream these both options are activated and shared to each other. This set of options can be visualized on the "Dynamic Agenda" new stream in parallel. The combination of the human flow in these wireframes is called "fireframes" herein.

Specifically, the BubblePress™ application 108 may be a programming/management or non-coding operating system that allows for interactions between people. The BubblePress™ application 108 works as an inter-programmable operating system (e.g., a mass application with patients as the users 102 and an application-in-application with co-creators as the users 102) in-Human Streams (or 'fireframes') and essential Cross-Services, on which templates of services and projects 126 (of FIG. 2) on the BubblePress™ application 108 may be developed, provided, and shared.

Figure 2:
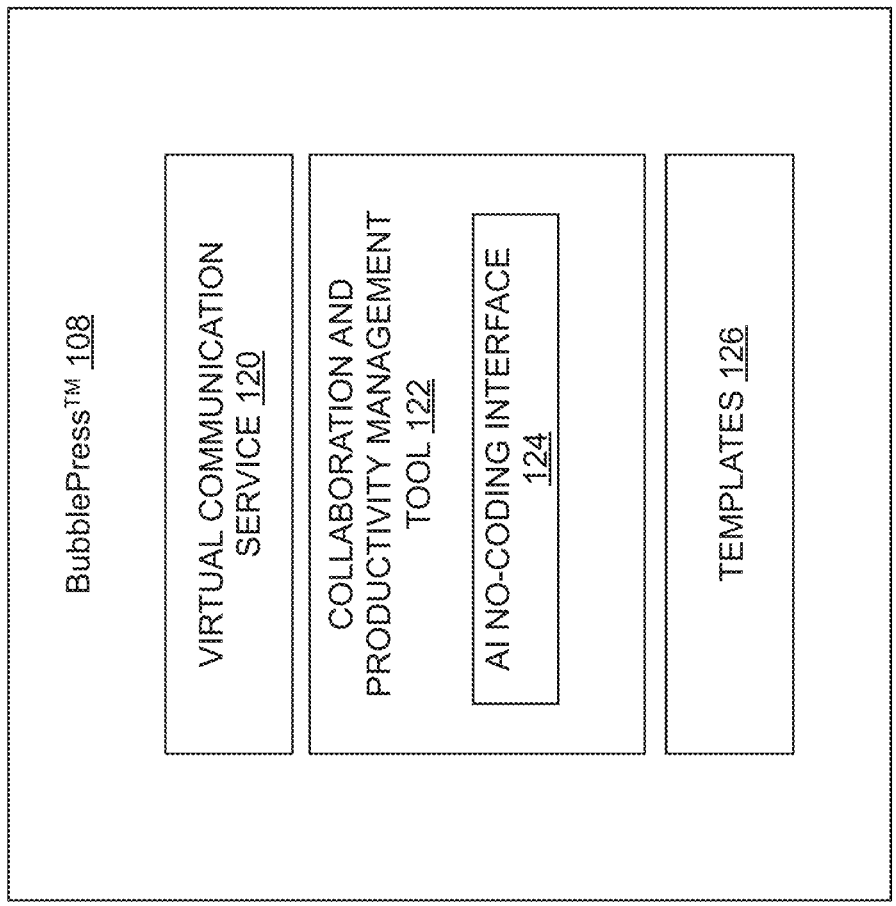
FIG. 2 depicts a block diagram of components of a BubblePress™ application of a system, in accordance with embodiments of the present invention.

As described herein, Cross-Services are essential for communication, collaboration, and productivity, and are based on all provided application-in-application elements. Specifically, the Cross-Services include, as shown in FIG. 2, a virtual communication service 120 that allows for communication between the user 102 and one or more other users and a collaboration and productivity management tool 122. Other Cross-Services include Streams/«Dynamic Agenda», Feeds, Center/«Push and Pull Service Center», Contacts, profiles, channels, jobs, and engagements. Moreover, the Cross-Services and any i-Bubble™ application-in-application element can be integrated into a project together with other third-party specific/primary services.

The virtual communication service 120 allows for the user 102 to define resources on options within the application 108, and over time, a stream may be created that can be combined with other streams. The virtual communication service 120 further allows for the user 102 to engage a multi-functional button, which will be discussed herein, to push ideas. The collaboration and productivity management tool 122 has an artificial intelligent (AI) no-coding interface 124. In fact, the AI no-coding interface 124 is simple and has low complexity. These templates of services or projects 126 and digital semantic projections have supply chain capabilities. As such, a new, simple information supply chain in a channeling system, such as a clinical healthcare channeling system, is realized. It should be appreciated that the projects 126 in FIG. 2 may be created out of templates, Cross-Services and any other i-Bubble™ elements/structures, which can be addressed via icons or via no-coding commands (See, Appendix).

Moreover, it should be appreciated that the BubblePress™ application 108 solves the need of micro- and macro-performance data beyond boundaries with the right details to be useful for transparency purposes. In a transparent system with personalized stewardness of information, each user will have an improved understanding of how users interact with each other. This process visualization will create new awareness and smart insights in microeconomic and complex systems, especially creating secured shared, best-selected procedural values and aligned costs for all users.

FIG. 3A depicts a user-side schematic diagram depicting a facial identification method on a graphical user interface (GUI) of a computing device and FIG. 3B depicts a schematic diagram depicting a facial identification method on a graphical user interface (GUI) of a computing device of a system that is configurable, in accordance with embodiments of the present invention.

Specifically, FIG. 3A and FIG. 3B depict the GUI 112 of the computing device 104, where the user 102 may access the BubblePress™ application 108 via a facial identification or facial recognition method in FIG. 3A. Once verified, the user 102 may utilize the BubblePress™ application 108. It should be appreciated that the BubblePress™ application 108 may create an application or has the ability to do so. Specifically, FIG. 3B depicts a Beta-Feedback component 219 with text and application-in-application elements/structures without edit right permissions. The Beta-Feedback component 219 allows for the user 102 to submit problems and suggestions for improvement on the application-in-application elements. Typically, the user 102 has no permission to change the project, which is distinct from a multi-colored plus circle 144 described herein, where the user 102 typically has permission to change the project.

Figure 4:
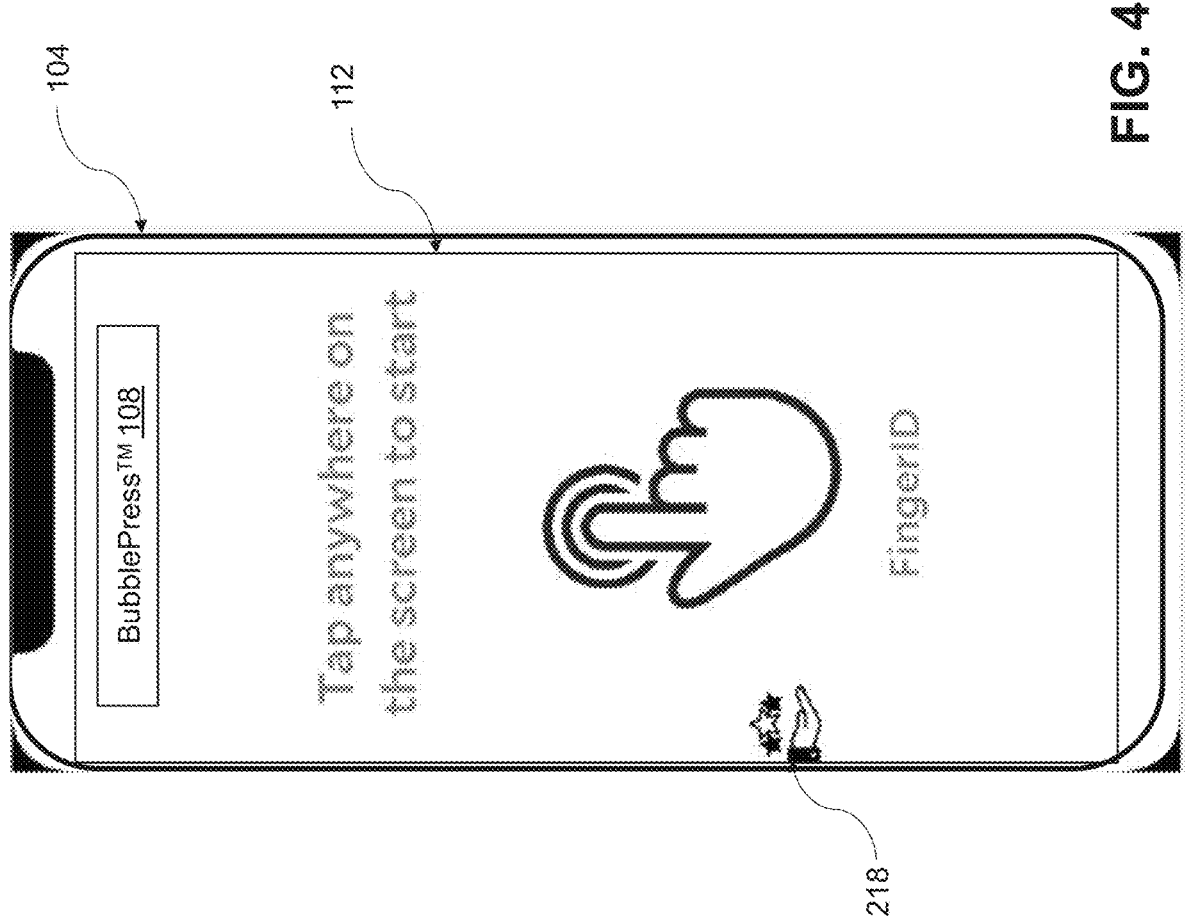
FIG. 4 depicts a user-side schematic diagram of a fingerprint identification method on a GUI of a computing device of a system, in accordance with embodiments of the present invention.
Figure 5A:
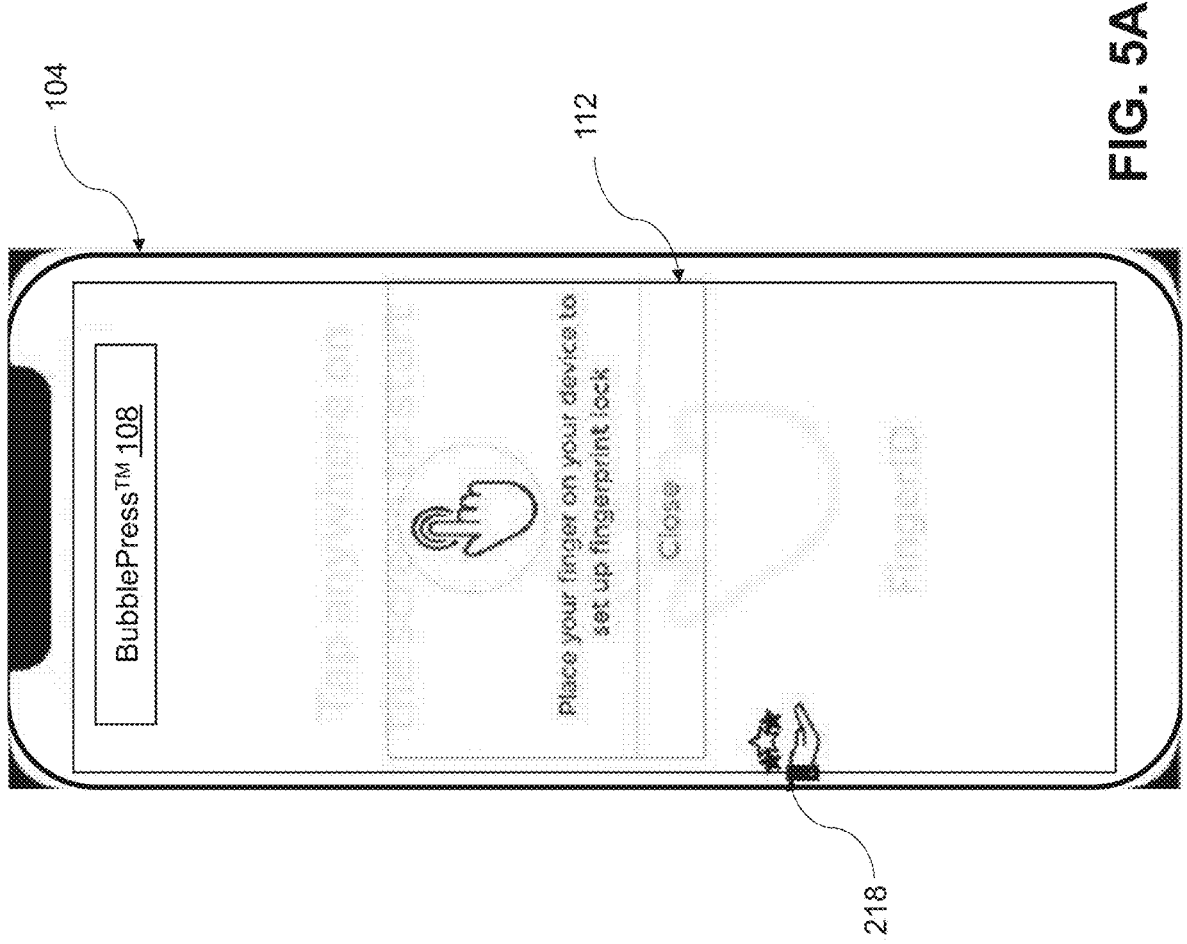
FIG. 5A depicts a user-side schematic diagram depicting a fingerprint identification and locking method on a GUI of a computing device of a system, in accordance with embodiments of the present invention.
Figure 5B:
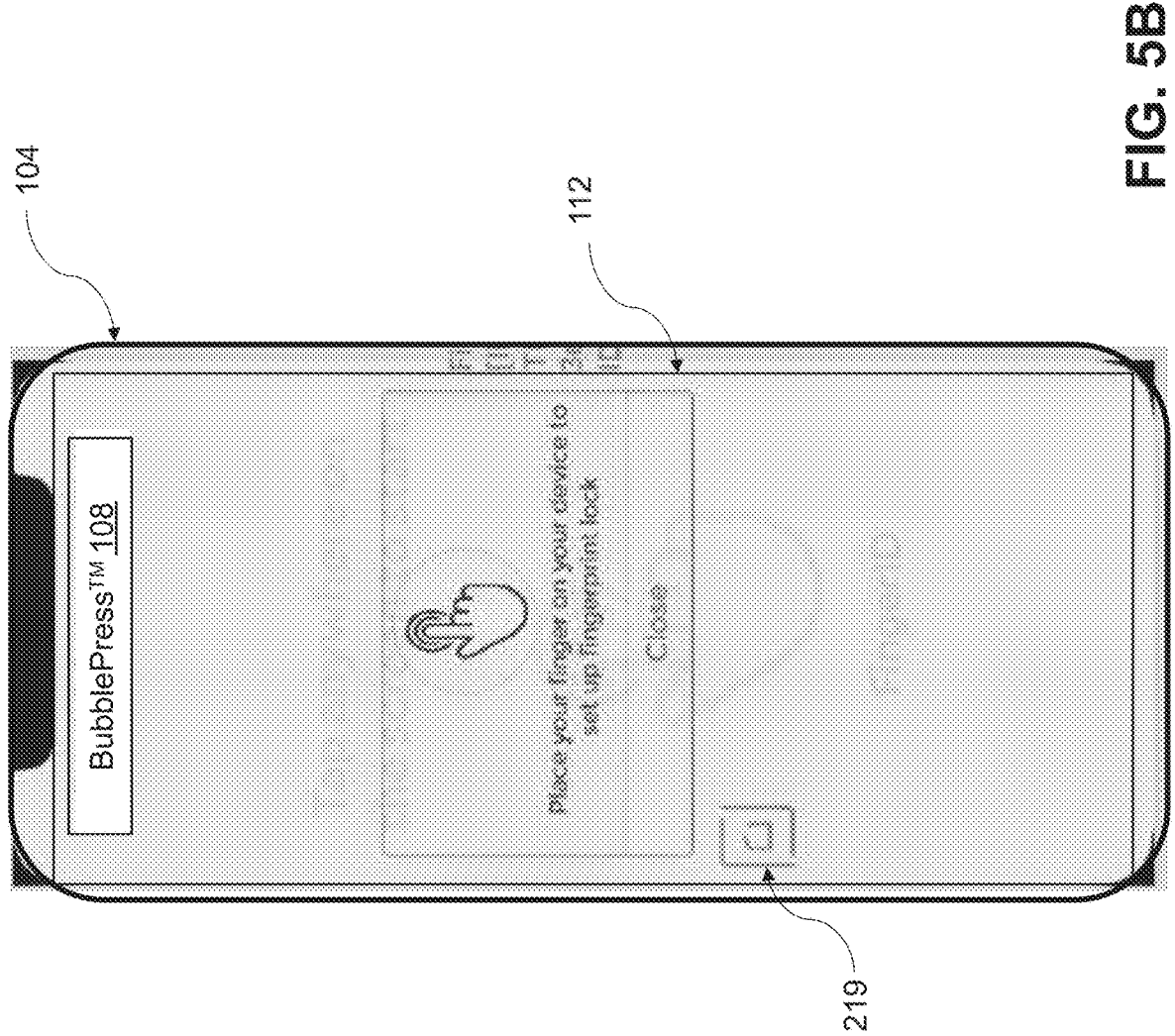
FIG. 5B depicts a schematic diagram depicting a fingerprint identification and locking method on a GUI of a computing device of a system that is configurable, in accordance with embodiments of the present invention.
Figure 6:
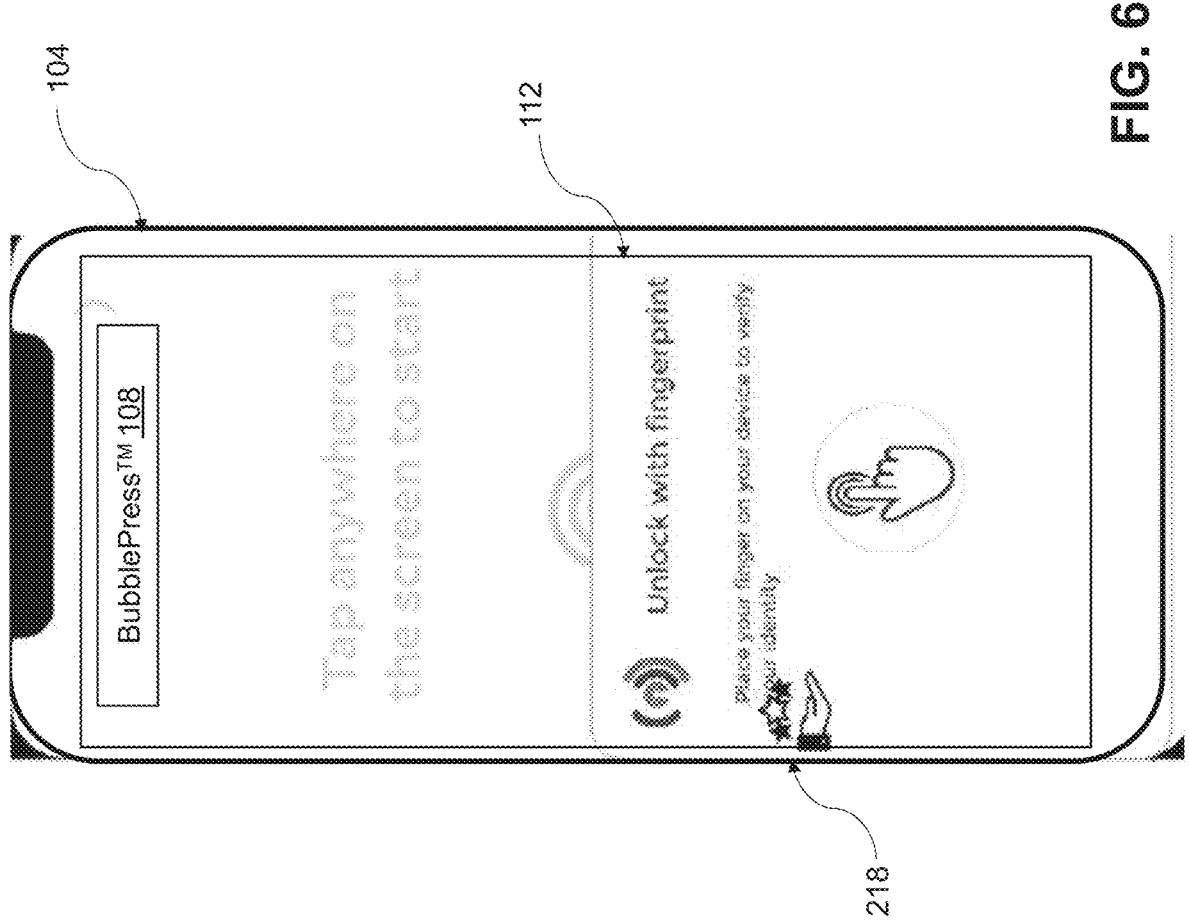
FIG. 6 depicts a user-side schematic diagram depicting a fingerprint identification and unlocking method on a GUI of a computing device of a system, in accordance with embodiments of the present invention.

FIG. 4 depicts a user-side schematic diagram of a fingerprint identification method on a GUI of a computing device of a system, FIG. 5A depicts a user-side schematic diagram depicting a fingerprint identification and locking method on a GUI of a computing device of a system, FIG. 5B depicts a schematic diagram depicting a fingerprint identification and locking method on a GUI of a computing device of a system that is configurable, and FIG. 6 depicts a user-side schematic diagram depicting a fingerprint identification and unlocking method on a GUI of a computing device of a system.

In FIG. 4, FIG. 5A, FIG. 5B, and FIG. 6, an identity of the user 102 may be authenticated using a fingerprint identification method. The fingerprint of the user 102 may be used to lock, unlock, or verify an identity of the user 102. Other means and method of biometric identification are contemplated herein, such as: palm print identification, facial authentication, iris recognition, retina recognition, etc. Other methods of identification include secure web access with a QR code, as will be described further herein. The identification and verification methods descried herein ensure that the BubblePress™ application 108 is biometrically crypto secured. In some examples, the user 102 is automatically logged out of the BubblePress™ application 108 if a predefined time interval has passed without any interaction from the user 102.

Figure 7B:
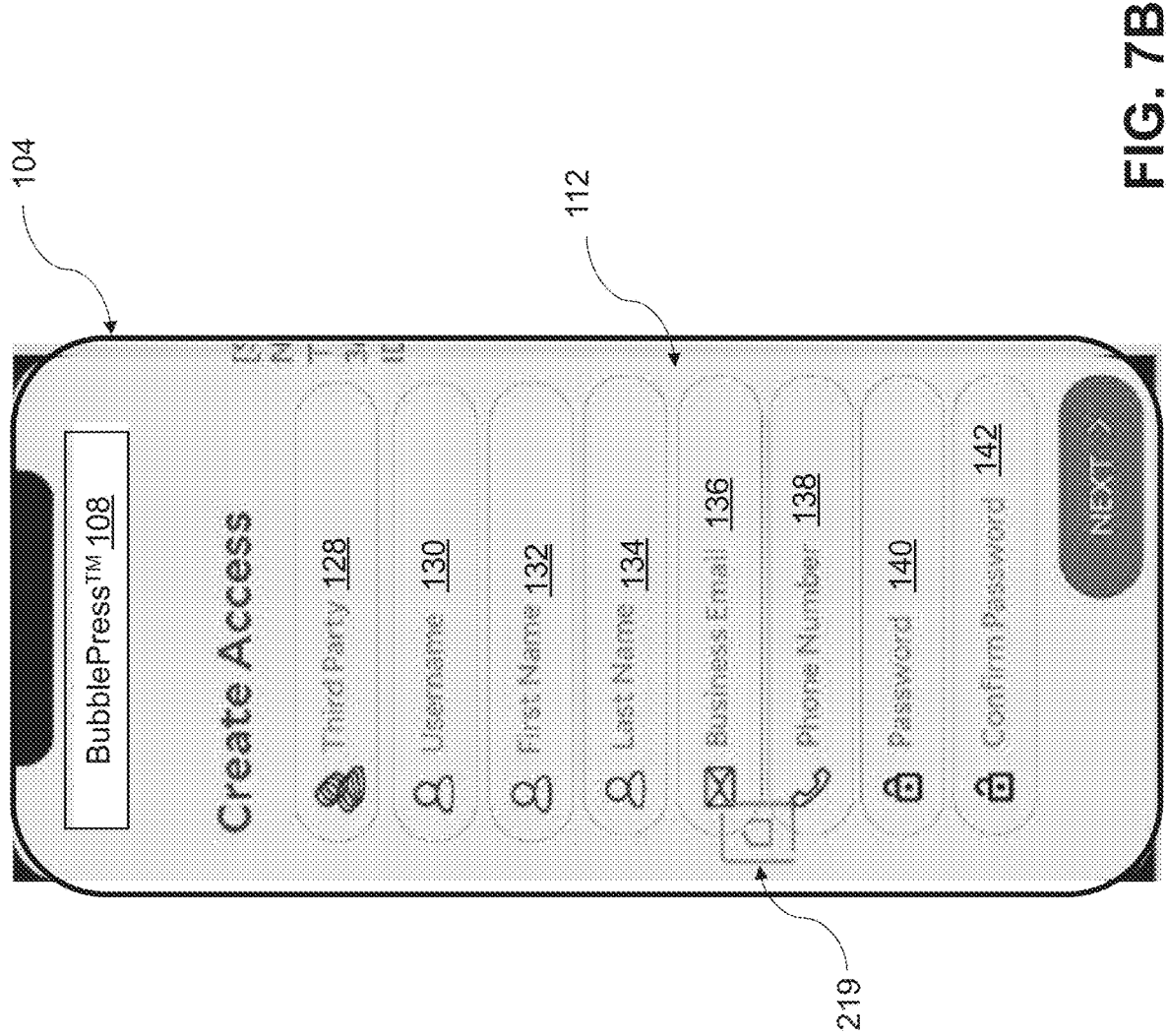
FIG. 7B depicts a schematic diagram depicting a GUI of a computing device of a system on which a user may create login credentials to access a BubblePress™ application that is configurable, in accordance with embodiments of the present invention.
Figure 7C:
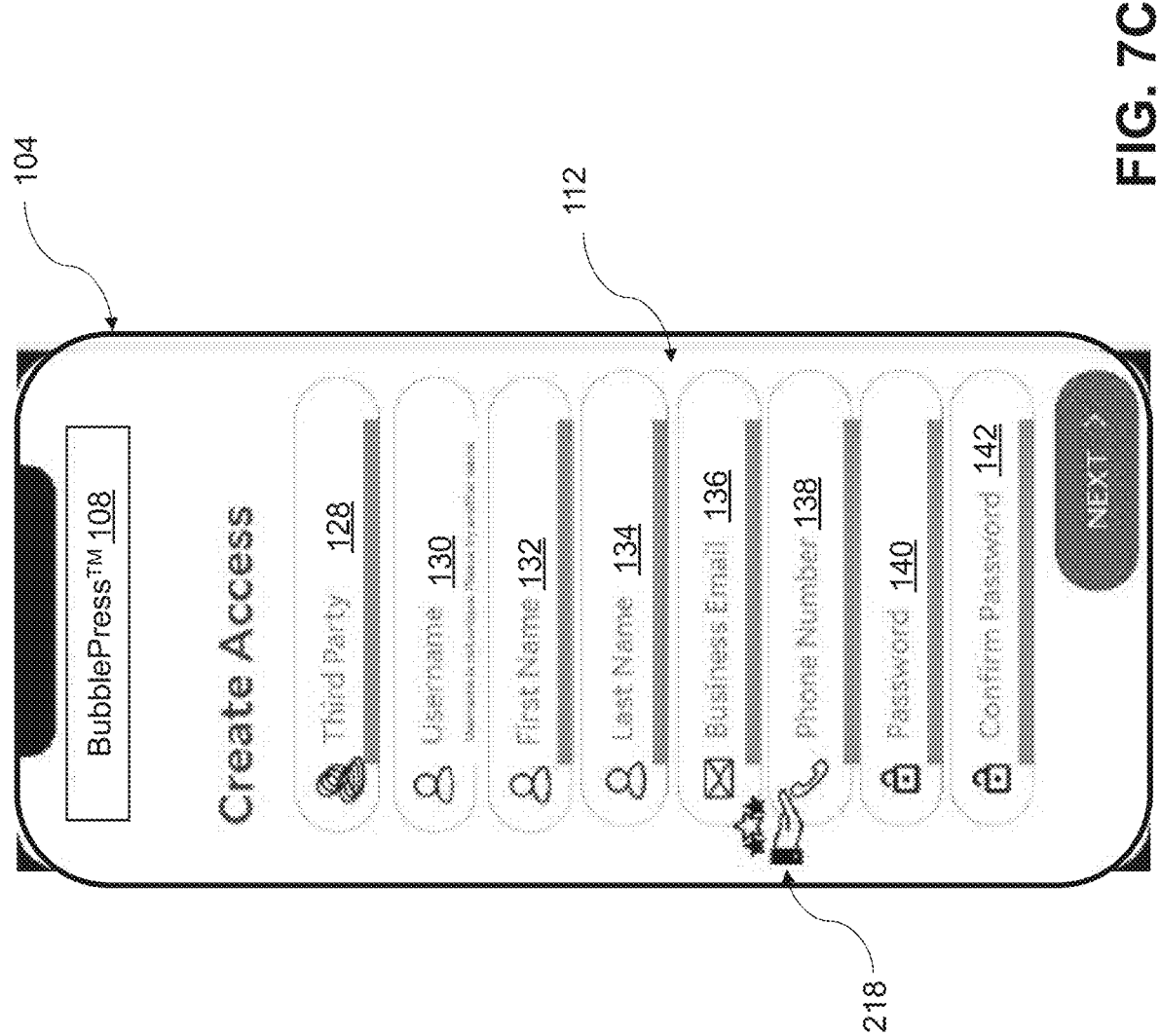
FIG. 7C depicts a user-side schematic diagram depicting a GUI of a computing device of a system on which a user may create login credentials to access a BubblePress™ application, in accordance with embodiments of the present invention.

FIG. 7A and FIG. 7C depict user-side schematic diagrams depicting a GUI of a computing device of a system on which a user may create login credentials to access a BubblePress™ application. FIG. 7B depicts a schematic diagram depicting a GUI of a computing device of a system on which a user may create login credentials to access a BubblePress™ application that is configurable.

Specifically, FIG. 7A-FIG. 7C depict the GUI 112 of the computing device 104, where the user 102 may create an account to access the BubblePress™ application 108. Creation of the account may include acknowledging an identity of the user 102 as a third-party user 128, creating a username 130, entering a first name 132 of the user 102, entering a last name 134 of the user 102, entering a business email address 136 of the user 102, entering a telephone number 138 of the user 102, entering a password 140 to be associated with the username 130 and confirming the password 142.

Figure 8:
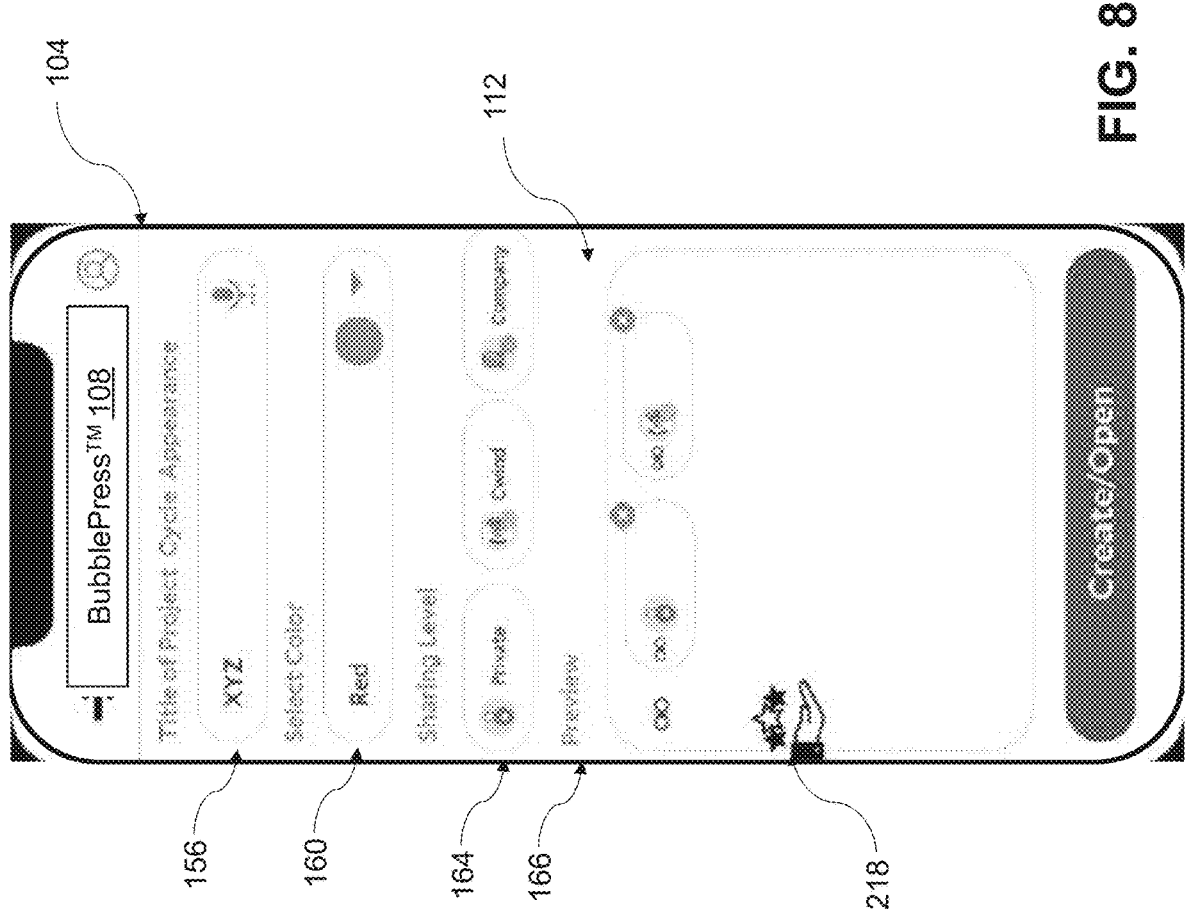
FIG. 8 depicts a user-side schematic diagram associated with creating or opening a new project, which includes access and Home Screen adoptions of this project/application-in-application element/structures, cycle, or appearance on a BubblePress™ application of a system, in accordance with embodiments of the present invention. More specifically.

FIG. 8 depicts a user-side schematic diagram associated with selection of a given application-in-application element/structure, or opening a new application-in-application element/structure e.g. project, cycle, or appearance on a BubblePress™ application. Specifically, FIG. 8 depicts an application flow cycle or spaghetti flow creation, all Cross-Services and all application-in-application elements/structures.

As shown in FIG. 8, if the user 102 wishes to select of a given application-in-application element/structure, e.g., project, or open a new application-in-application element/structure, e.g., project, cycle, or appearance, the user 102 may input a title into a first entry box 156, select a color in a second entry box 160, and select a sharing level at a third location 164. A preview of these selections may be viewed in a preview pane 166. Users can switch between both of these layers by clicking on a "hand" icon 218 of the application.

Figure 9:
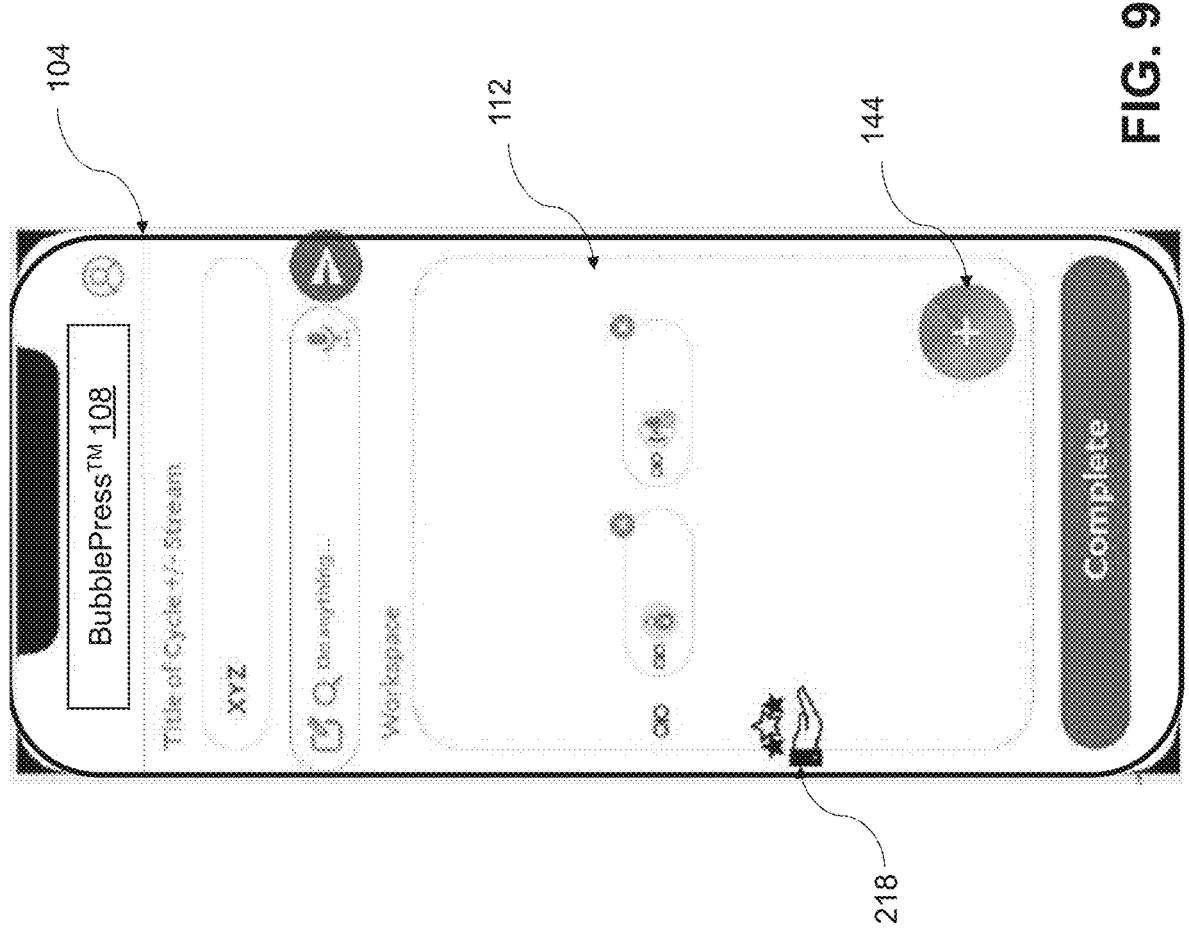
FIG. 9 depicts a schematic diagram associated with creating a cycle, such as a Demoji™/Demoticon™/spaghetti/sequence/chain/decision tree (e.g., menu/circle on cycle), through use of circles in a BubblePress™ application of a system that is configurable, in accordance with embodiments of the present invention.
Figure 10:
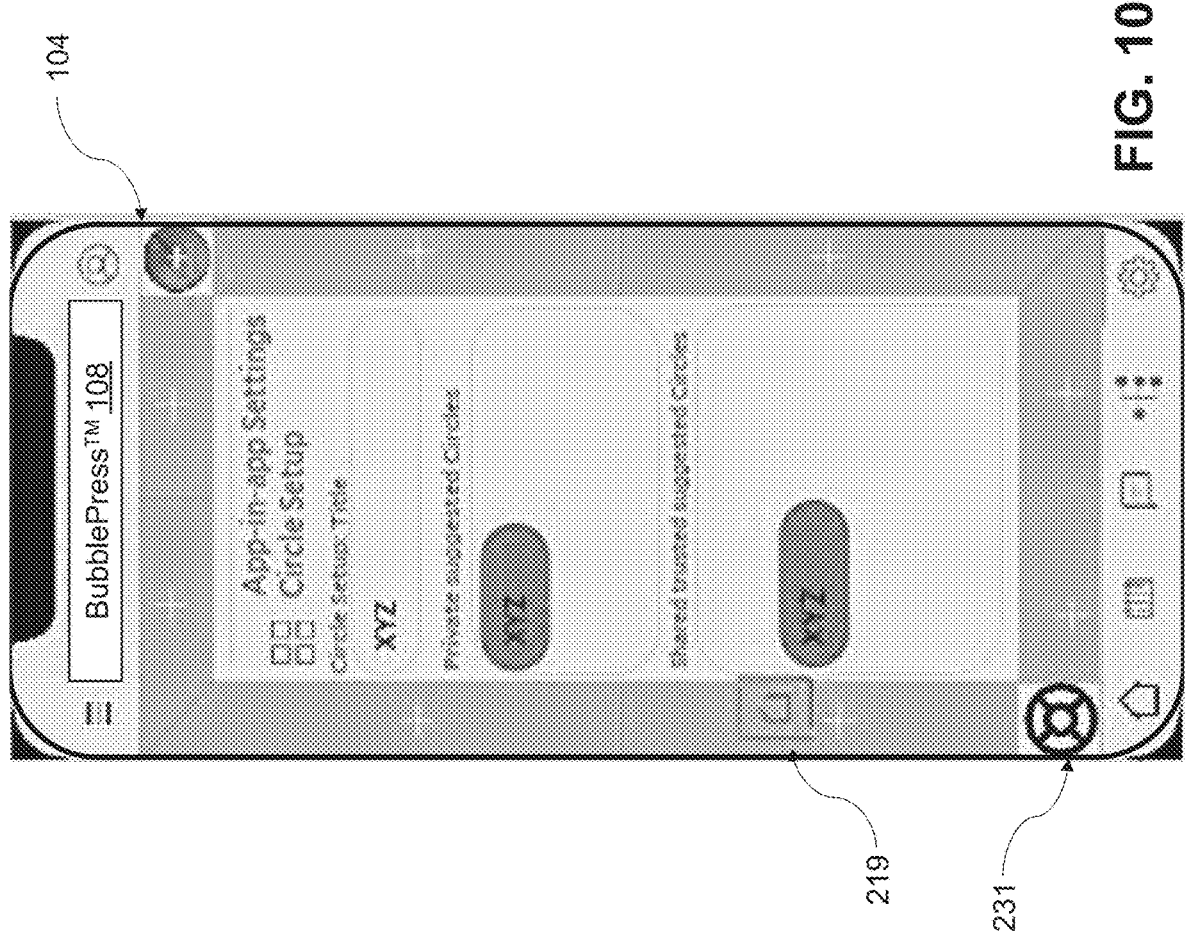
FIG. 10 depicts a schematic diagram of configurable application-in-application settings to create circles, setup circles, add one or more circles or split circles, in accordance with embodiments of the present invention.

FIG. 9 depicts a schematic diagram associated with creating a cycle, such as a Demoji™/Demoticon™/spaghetti/sequence/chain/decision tree (e.g., menu/circle on cycle), through use of circles in a BubblePress™ application of a system that is configurable, in accordance with embodiments of the present invention. Moreover, FIG. 9 depicts Cross-Services or Streams/«Dynamic Agenda», Feeds, a Center/«Push and Pull Service Center», and other Cross-Services (including contacts, profiles, channels, jobs/job applications/engagements). FIG. 9 depicts a schematic diagram associated with creating a cycle, such as a spaghetti or decision tree, through use of circles in a BubblePress™ application that is configurable. FIG. 10 depicts a schematic diagram of configurable application-in-application settings to create circles, setup circles, add one or more circles or split circles, in accordance with embodiments of the present invention.

Specifically, as shown in FIG. 9, the user 102 may create a cycle, such as the spaghetti or the decision tree, through use of the circles described herein. In FIG. 9, the multi-colored plus circle 144 may be executed to confirm a pull or push for the sharing of the i-Bubble™ or i-Bubbles™ to trusted third-parties. In some examples, a pull may trigger a server (not shown) to generate such a structured "push" if a given device and the user is disconnected or inactive. In FIG. 9, the (work)space subframes may contain cycles, such as the spaghettis or the decision trees, with subdivision or fusion of sections. As shown in FIG. 9, execution of the multi-colored plus circle 144 allows for stream 'STR' option set selection and/or confirmation of the ID PULL.

Figure 11:
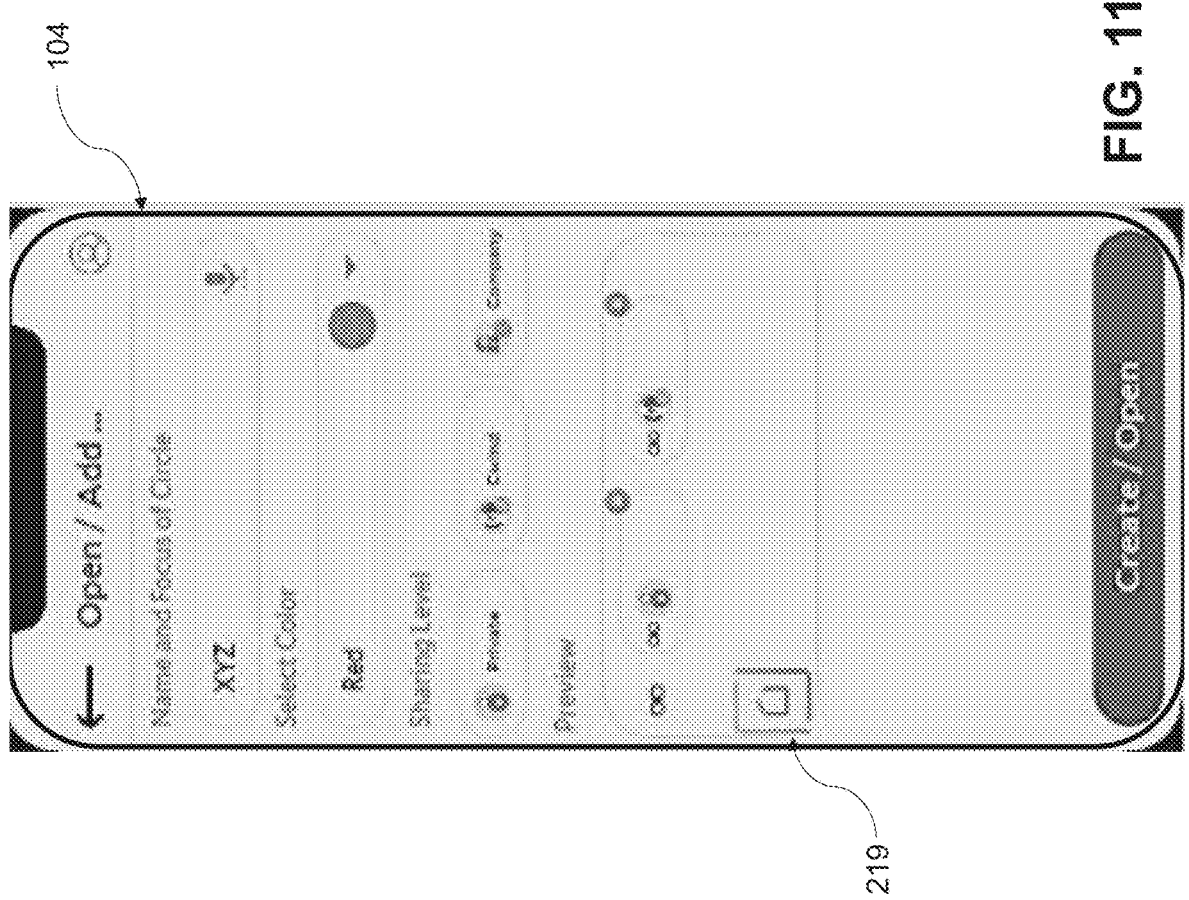
FIG. 11 depicts a schematic diagram of configurable application-in-application settings to open or add one or more circles, in accordance with embodiments of the present invention.
Figure 12:
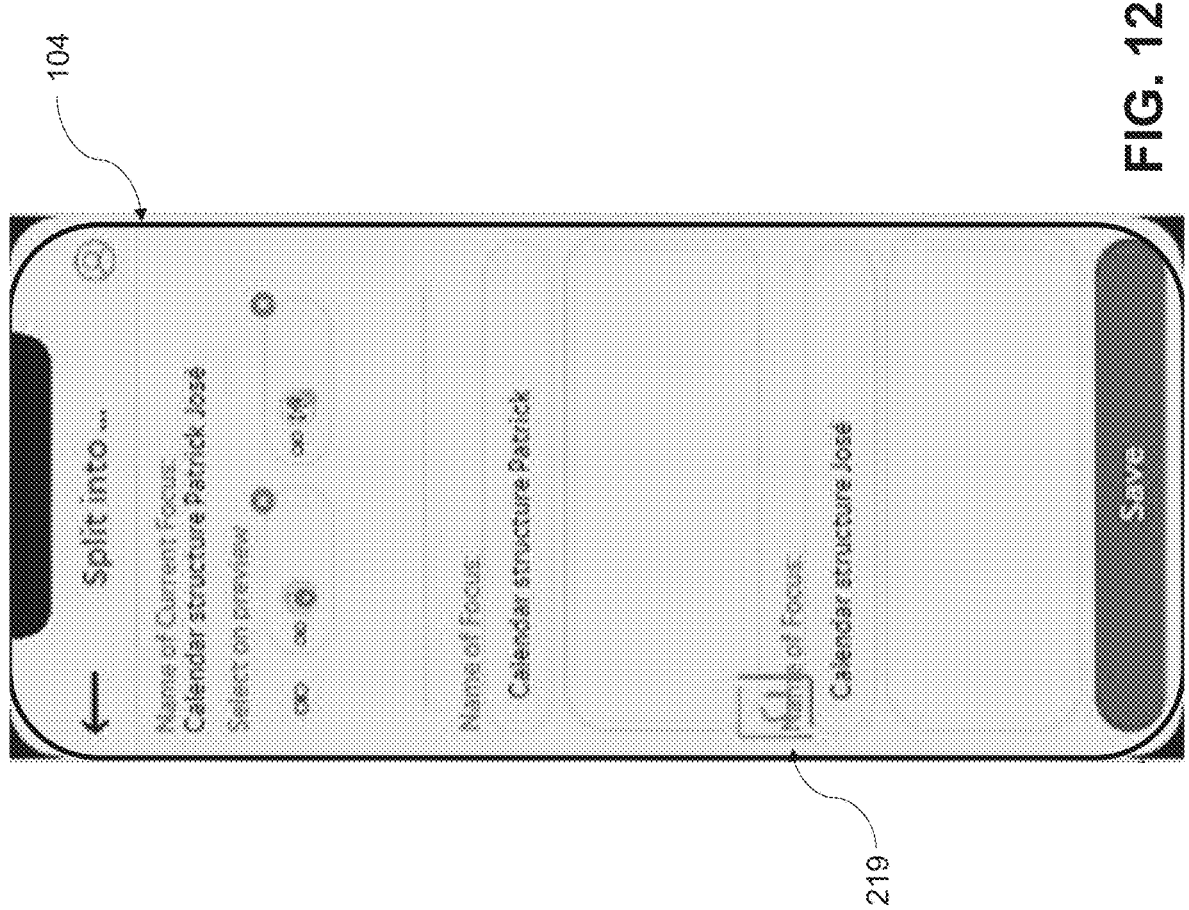
FIG. 12 depicts a schematic diagram of configurable application-in-application settings to setup circles, or split the circles into different focuses, in accordance with embodiments of the present invention.

FIG. 10-FIG. 12 are associated with decision circle and menu creation. Specifically, FIG. 10 and FIG. 11 depict schematic diagrams of configurable application-in-application settings to create, circles, setup circles, or add one or more circles. FIG. 12 depicts a schematic diagram of configurable application-in-application settings to create circles, setup circles, or split the circles into different focuses.

As shown in FIG. 10, execution of the multi-colored plus circle 144 allows for circle use or circle creation and execution of a button 231 allows for circle creation (e.g., a semi-essential circle with limited edit right permissions or an essential circle without edit right permissions). Specifically, execution of the multi-colored plus circle 144 allows the user to add new parts of circles (e.g., same focus name) or fuse two circles by a name focus. Execution of the button 231 allows for the splitting of a circle and saving it as a circle or as the spaghetti and giving each part a new focus and/or deleting one part. If the user wishes to switch to application/Cross-Services, the user may click on the house icon.

According to FIG. 11, the user may use circles or create circles. If the user clicks on the multi-colored plus circle 144, the user may switch to the application-in-application, may add a new part to a circle with the same focus, or may fuse two circles by a name focus. If the user clicks on the button 231, the user may split the circle and save it as a circle or spaghetti and give each part a new focus and/or delete one part. Moreover, the user may click on the house icon to switch to the application/Cross-Services.

According to FIG. 12, the user may use circles or create circles. If the user clicks on the multi-colored plus circle 144, the user may switch to the application-in-application, may add a new part to a circle with the same focus, or may fuse two circles by a name focus. If the user clicks on the button 231, the user may split the circle and save it as a circle or spaghetti and give each part a new focus and/or delete one part. Moreover, the user may click on the house icon to switch to the application/Cross-Services.

Figure 13B:
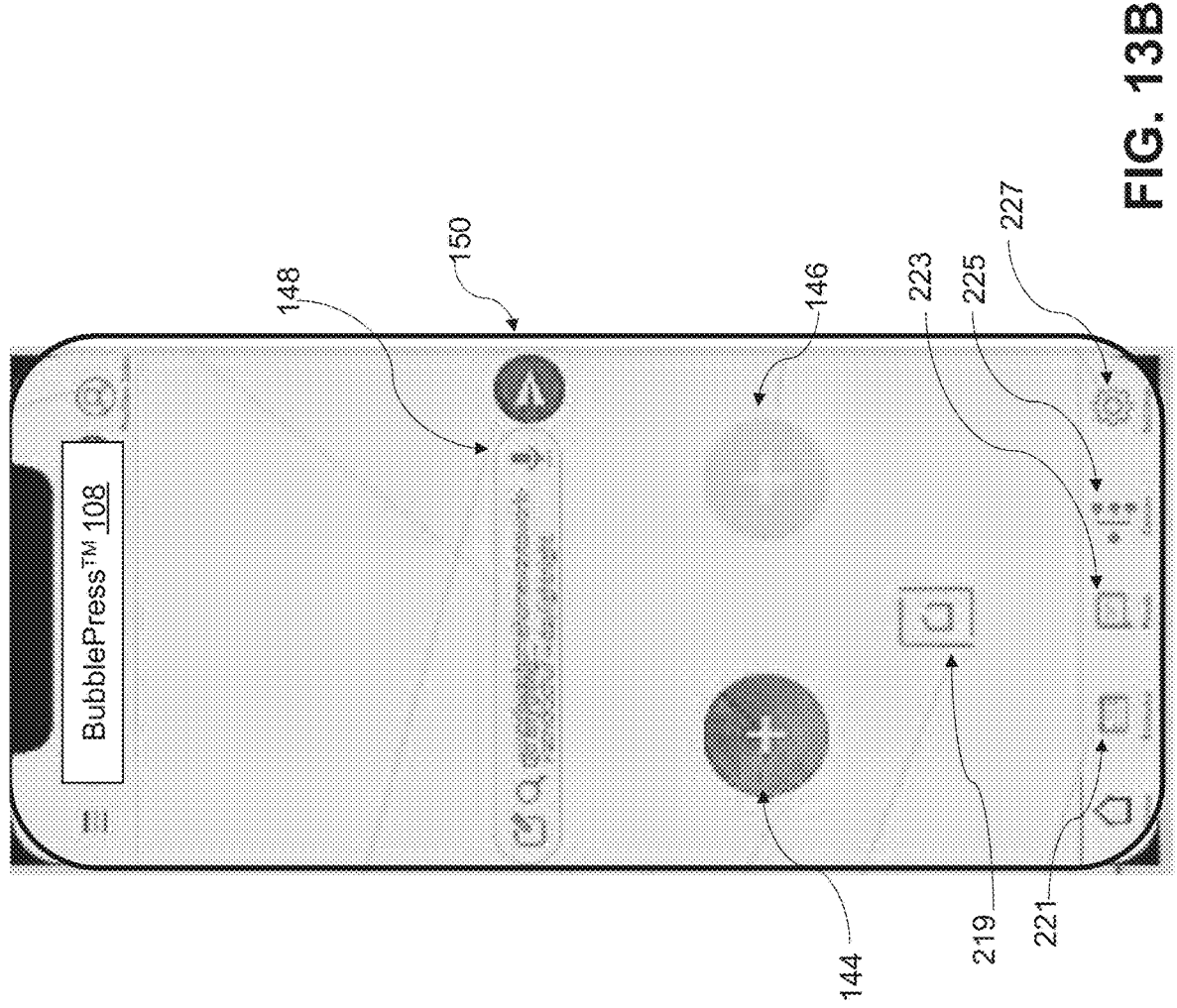
FIG. 13B depicts a schematic diagram of a Home Screen of a BubblePress™ application of a system that is configurable, in accordance with embodiments of the present invention.

FIG. 13A depicts a user-side schematic diagram of a Home Screen of a BubblePress™ application of a system and FIG. 13B depicts a schematic diagram of a Home Screen of a BubblePress™ application of a system that is configurable, in accordance with embodiments of the present invention.

It should be appreciated that if the user 102, while on the Home Screen of the BubblePress™ application 108, clicks on the multi-colored plus circle 144, the user 102 will arrive at FIG. 8. The user 102 can move to FIG. 8, FIG. 21, or FIG. 22 according to the user input.

Figure 17A:
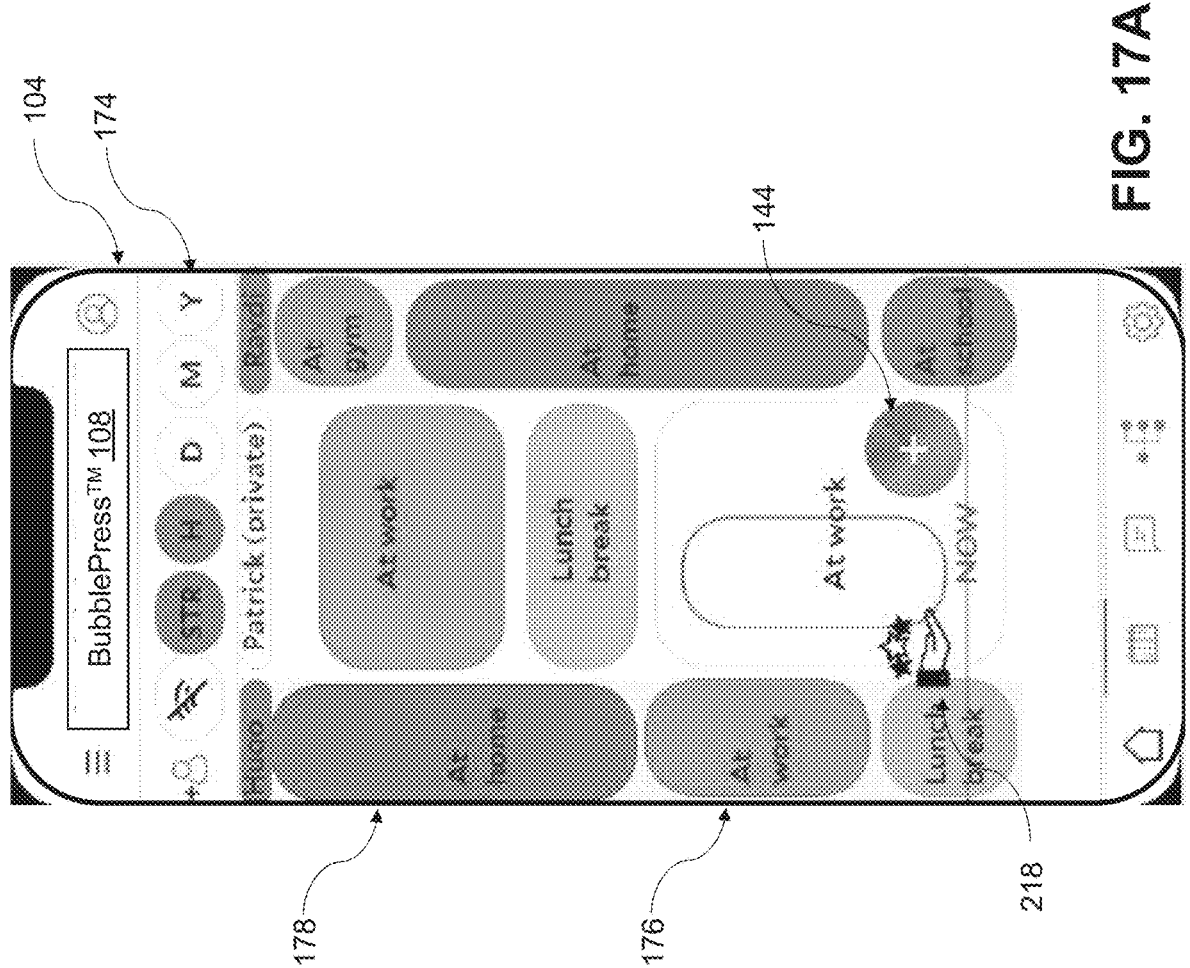
FIG. 17A depicts a user-side schematic diagram associated with a Dynamic Agenda/Human Streams ('fireframes') and in-Human Stream flow projections (projections on 'fireframes') in a BubblePress™ application of a system, in accordance with embodiments of the present invention.

If the user 102, while on the Home Screen of the BubblePress™ application 108, clicks on the Streams/«Dynamic Agenda» icon 221, the user 102 will arrive at FIG. 17A and can engage in actions on FIG. 17 and FIG. 18.

Figure 25A:
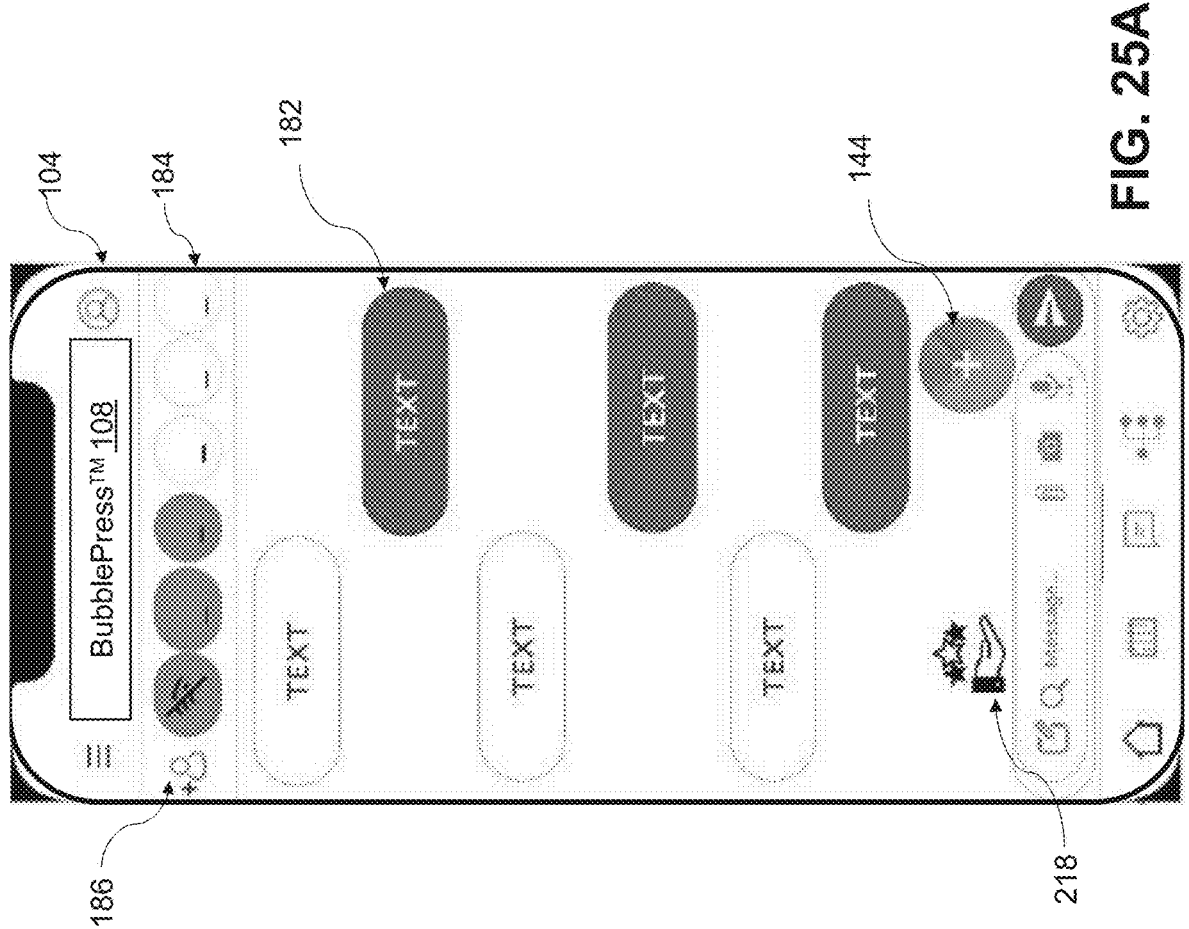
FIG. 25A depicts a user-side schematic diagram depicting circle direct or group channels, as well as messages between users, in a BubblePress™ application of a system, which is based on a continuous cycle, such as a Demojis™/Demoticons™/spaghettis/sequences/chains, with different sharing levels, in accordance with embodiments of the present invention.

Moreover, if the user 102, while on the Home Screen of the BubblePress™ application 108, clicks on the Feeds icon 162, the user 102 will arrive at FIG. 25A. If the user clicks on the push and pull icon 158, the user 102 will arrive at FIG. 26A. If the user 102 arrives at FIG. 26A, the user 102 may navigate between FIG. 26A-FIG. 29A.

Figure 14:
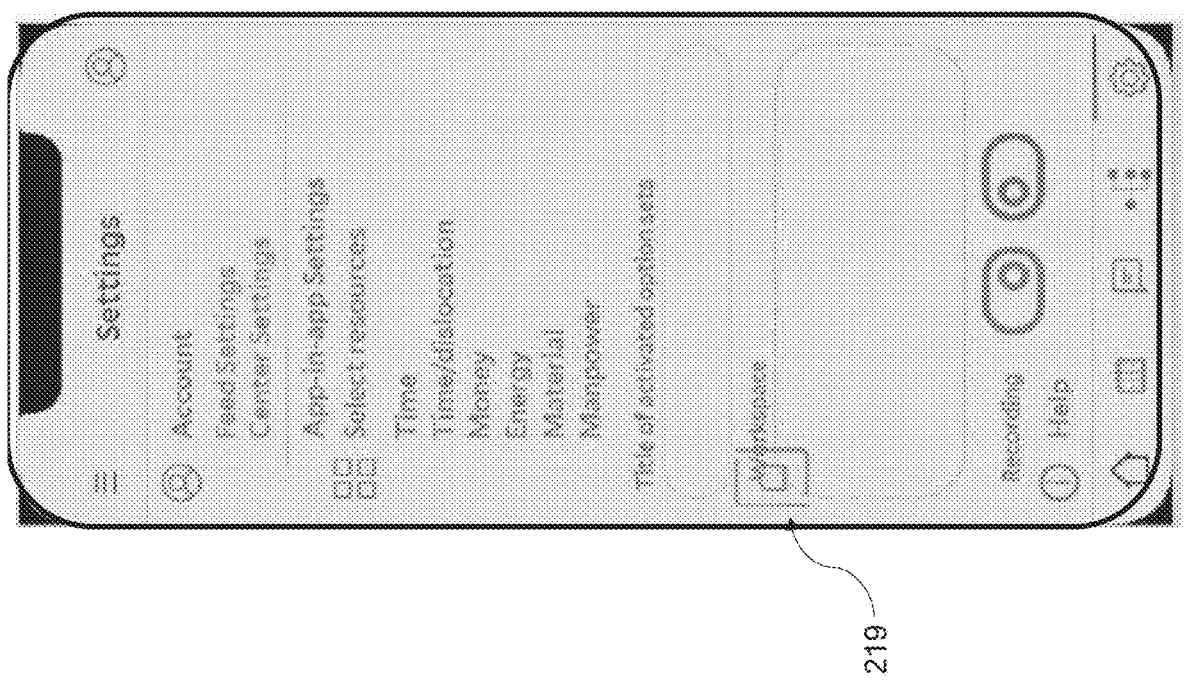
FIG. 14 depicts a schematic diagram of configurable application-in-application settings with a selection of a resource, sub-selection of programmed option or option sets and activation or deactivation of the option/option set recording, in accordance with embodiments of the present invention.
Figure 15:
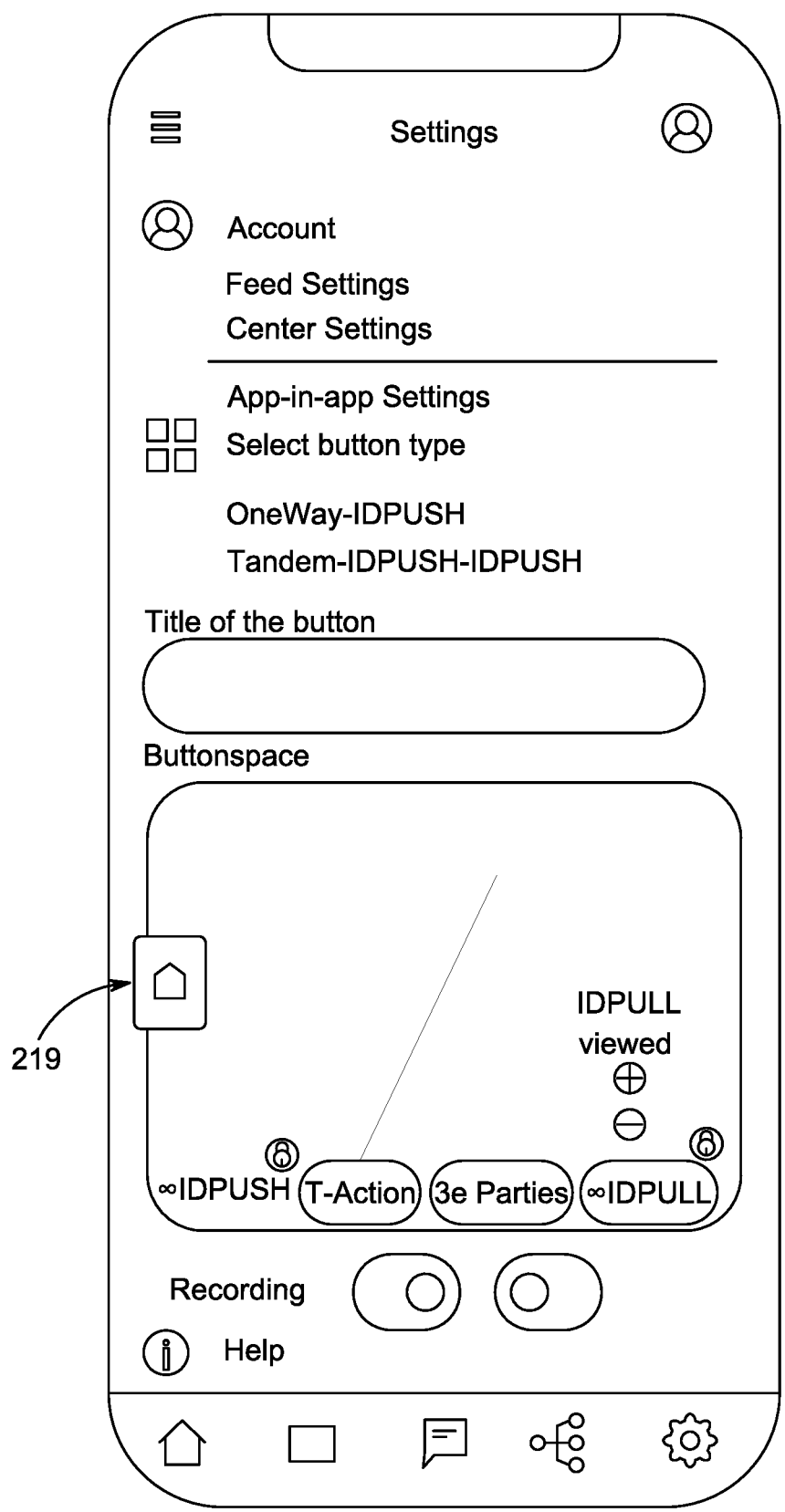
FIG. 15 depicts a schematic diagram of configurable application-in-application settings with a selection of a multilingual action ID button type 'OneWay ID Push & ID Pull' and the specification of the multilingual action ID button, in accordance with embodiments of the present invention.
Figure 16:
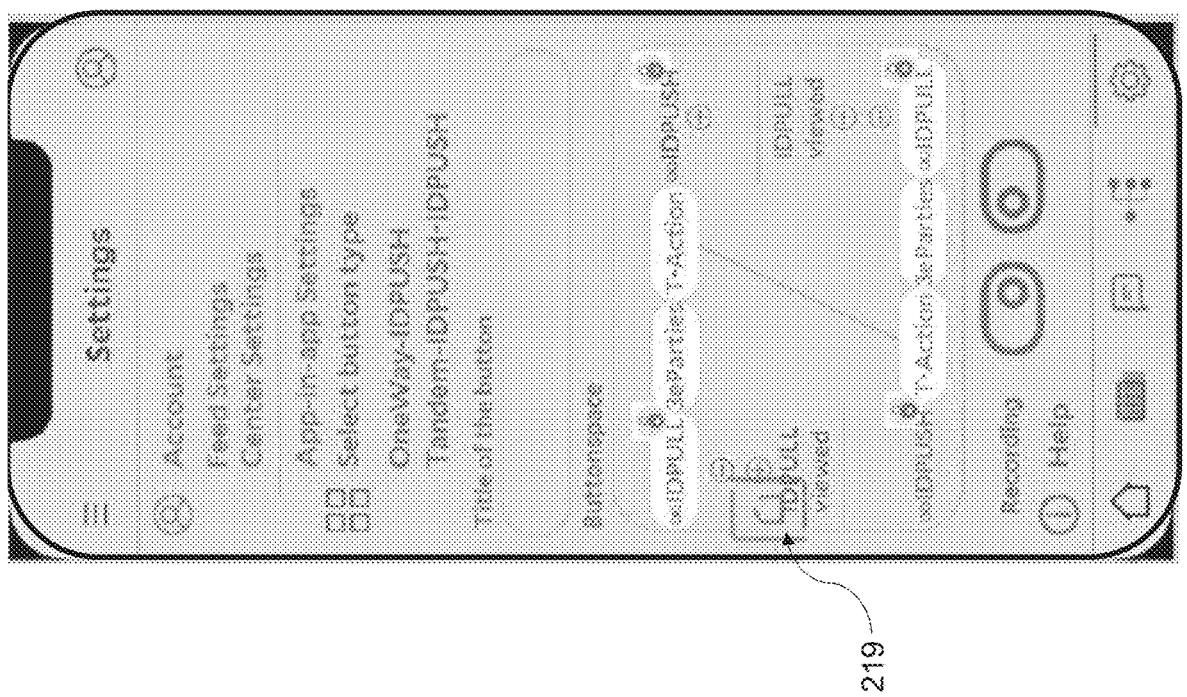
FIG. 16 depicts a schematic diagram of configurable application-in-application settings with a selection of a multilingual action ID button type 'Tandem forward ID Push & ID Pull viewed and backward ID Push & ID Pull viewed' and the specification of the multilingual action ID button, in accordance with embodiments of the present invention.

Additionally, if the user 102, while on the Home Screen of the BubblePress™ application 108, clicks on the settings icon 154, depending on the sub-selection, the user 102 will be brought to FIG. 10-FIG. 12 or to FIG. 14-FIG. 16.

High level hashtags, checklists, to-do lists, notes, spreadsheets, and forms may be used in FIG. 13A. FIG. 13A is also associated with: use of ∞™ i-bubbletags, use of external ∞™ i-bubbletags with links to the BubblePress™ application 108, platforms, services, and ecosystems (e.g., the ecosystem of the BubblePress™, sharing ∞ to other social media platforms, cross-platform compatibility, with diversion to biometric crypto secure BubblePress™) and use of decision circles and menus, as will be discussed herein.

Upon being granted access to the BubblePress™ application 108, a Home Screen of the BubblePress™ application 108 may appear as shown in FIG. 13A. In FIG. 13A, a user icon 152 may be accessed to view contacts, profiles, channels, and/or jobs/job applications/engagements. In an input or entry portion 148 in FIG. 13A, the user 102 may select a color, as well as a sharing level for each i-Bubble™ element or representation. The sharing level described in relation to FIG. 13A may include a private sharing level (e.g., to share with another user or another group of users) or a public sharing level. Moreover, the user 102 can cut, copy, or paste a thread in the entry portion 148. To execute the entry placed in the entry portion 148, an execution button 150 may be clicked or engaged.

As described herein, an "i-Bubble™" is a basic element that is used for communication, collaboration and productivity on this application-in-application element/structure on a human stream ('fireframes'). Put another way, the i-Bubble™ is an application-in-application element including human flow projections on the application. Distinctly, the i-bubbletag is a ∞™, or a metatag addressing the focus of any flow, diverting to the BubblePress™ application and the platform and services only from the Internet.

It should be appreciated that each i-Bubble™ has a double-input layer, including: (1) a resource information basket application-in-application element/structure of the user 102 and (2) a user input (e.g., what the user 102 writes into the BubblePress™ application 108, as well as changes of the activated Human Stream options and sets). Users can switch between both of these layers by clicking on a "hand" icon 218 of the application.

It should be appreciated that each i-Bubble™ has a unique address associated with an ∞™ i-bubbletag. The words used in the ∞™ i-bubbletag are used to find/search for specific flows and are based on words that are multilingual based on a mesh library (not shown). More specifically, hashtags are words to find topics on social media. As described herein, the "mesh" is a set of words that are associated with each other. Multilingual words are important especially for the multilingual action ID button, where a set of actions in different languages are available for use of the "service" provision. As an illustrative example, the "mesh" for fruits are: apples, bananas, strawberries, kiwi, etc. We could imagine that the circle focused on fruits has apples, bananas, strawberries, kiwi on it as well.

Further, each user i-Bubble™ can be pushed to one or more other contacts and/or may be shared according to the given sharing level. As such, each i-Bubble™ will have a different security level.

It follows that the BubblePress™ application 108 enables information stewardness and the exchange to different sharing, trusting and security levels. The i-Bubble™ stewardness also includes the standard features of copy, paste, and cut, as discussed. However, the i-Bubble™ stewardness also allows for the user to hold the push button on your screen to subdivide or fuse each i-Bubble™ and address it to the i-Bubble™ basket.

Examples of these inputs described in relation to FIG. 13A include: biometric login elements, Cross-Service elements like "Stream" "Feed" and "Center", different basic i-Bubble™ elements like hashtag equivalents, an ∞™ i-bubbletag for the BubblePress™ application 108 "flows", the "circle" or menu, stream options or option sets and Feed options, and/or a specified one way action ID push and ID pull button or specified tandem action ID push and ID pull button, personalized or third party projects, BubblePress™ templates etc.

Moreover, the user 102 may write one term, combine ∞™ i-bubbletags plus specifications of the second layer or application-in-application structure and sub-specifications connected via underlines, parenthesis (no spaces), etc. in the input or entry portion 148 in FIG. 13A. Tags used herein may include: #, #- (#- and olo are automatically converted to ∞) or ∞ for any digital resource equivalent/flow/structured content/structured words/structured values (e.g. birthday etc.) with + to add, ( ) and/or =? as element content, { } for Cross-Service sub-specification, @ for contacts/profiles and channels, @@@ for third parties, @ to @ for push's to contacts, $$ for security level specifications, !trusted for trusted content, ?nottrusted for not trusted content, '<@>;' for email addresses, and < > for color/color-priority specifications, 'underline' or - or hyphen used for sub specifications or stewardness specifications (and to replace the spaces as no spaces are allowed within the commands), and/or // // for comments. The ID push and ID pull button are used exclusively for services in a Center/«Push and Pull Service Center».

As an illustrative example, the hashtag # may be used for social media instances and the ∞™ i-bubbletag may be used for flow application-in-application elements/structures (e.g., a (work) cycle or a decision tree starting point directly and only on the BubblePress™ application 108). As such, the starting point of all i-Bubble™ elements is any information addressable with the ∞™ i-bubbletag.

As another example, one can write into a social media platform, "the team A has won. #footballchallenge #sport #winners", meaning that we can connect and classify the sentence "the team A has won" with the terms 'footballchallenge', sport and winners.

Moreover, both portions of the double-input layer can be written into the input line or the entry portion 148 for specification of the application-in-application or the BubblePress™ application 108 user structure by using the Tags #, #- (#- and olo are automatically converted to ∞) or ∞ for any digital resource equivalent/flow/structured content/structured words/structured values (e.g., birthday, etc.) with + to add, ( ) and/or =? as element content, { } for Cross-Service sub-specification, @ for contacts/profiles and channels, @@@ for third parties, @to @ for push's to contacts, $$ for security level specifications, !trusted for trusted content, ? nottrusted for not trusted content, '<@>;' for email addresses, and < > for color/color-priority specifications, 'underline' or - or hyphen used for sub specifications or stewardness specifications (and to replace the spaces as no spaces are allowed within the commands), and/or // // for comments. The ID push and ID pull button are used exclusively for services in a Center/«Push and Pull Service Center». A first illustrative example includes: ∞atworkwayhomehomewaytowork@PatrickSchur@∞ April10th2021. A second illustrative example includes: ∞daylightnight∞nightooatwork∞April4th2021∞atlogin_ BubblePress. A third illustrative example includes: ∞#birthday(birthday_ day)(birthday_month)(birthday_year).

It should be appreciated that the present invention contemplates different "alphabets" of i-Bubbles™/chains. For example, and as described herein, the term "essential" means that the decision tree is inert and term "semi-essential" as described herein means that there is a given decision tree, that can be incrementally added by other decision options. For example, an essential circle has the same level i-Bubbles™ with an essential focus tag, where the focus tag and the i-Bubbles™ are completely unmodifiable. A semi-essential circle has the same level i-Bubbles™ with an essential focus tag, where the focus tag is unmodifiable, but the i-Bubbles™ may be modifiable. An essential i-Bubble™ has a fixed sequence/pathway of only essential circles and an ∞™ i-bubbletag as a starting point (e.g., tasking, delegation, decision making, informed consent, etc.). A semi-essential ∞™ i-bubbletag has a fixed sequence/pathway of semi-essential or essential circles and an ∞™ i-bubbletag as the starting point (e.g., tasking, delegation, decision making, informed consent, etc.).

Moreover, as described, the input line or the entry portion 148 allows the user 102 to write one term and combine an ∞™ i-bubbletag plus specifications of the second layer or application-in-application element/structure and sub-specifications connected via underlines and parenthesis without spaces. These i-Bubbles™ may also be used to create higher level application-in-application elements/structures, like circles/menus and multifunctional IDpush/IDpullview/IDpush/IDpullview buttons with multilingual OneWayAction/TandemAction cycles. The decision making takes place on suggested focused circles (e.g., a multi-colored plus circle 144 for projects with edit right permissions) that can be integrated into the stream and Feed, but as well, more detailed into the Center/«Push and Pull Service Center» and a traffic light system described herein. Specifically, the user 102 can add or change the application flow on the BubblePress™ application 108 with the multi-colored plus circle 144 when the user has edit right permission.

Parallel communication takes place and is fed up over the focused resource measurement stream. It should be appreciated that the user 102 is also able to enter third-party projects and services via the Home Screen of FIG. 13A plus button 146 below the input line or the entry portion 148. Specifically, the plus button 146 brings the user to a third-party space creation for complex third-party application-in-application templates and projects.

If the user 102 engages the multi-colored plus circle 144, the user 102 may be able to open and adopt for projects with edit right permissions or create new projects, open or create (work) cycles with partial 'semi-essential' or complete 'normal' edit right permissions (e.g., "supply chain spaghettis" where an essential element can be implemented, but has no edit right permissions), and/or open or create new appearances (e.g., checklists, to-do lists, notes, spreadsheets, forms, etc.).

As described herein, "spaghetti" is one flow/chain used within the life stream that is based on the i-Bubble™ element. Other structures include: #, #-, olo, ∞ with $$, @, @@, @@@, @to @, !trusted, ?nottrusted, §, § §, § § §, <, >, '<@>;', =?, +, ( ), { }, [ ], // //, etc. Every spaghetti is a "slow" flow/chain of personal measurements of interest within a real-time synchronized situational counter ("fast flow") that: calculates interferences of same resources, fuses measurements of the same resources if the measurements of a different measurement end up, and/or triggers notifications of interests ("requested pull" or allows seamless pushes). Put another way, the term "spaghetti" is used herein to describe a given flow sequence of steps/Demojis™ Demoticons™/sequences/chains/cycles/decision trees (menus/circles on cycles) to take "in one line" or to align digital or real life "actions". The Demojis™/Demoticons™/sequences/chains/cycles/decision trees are a digital path or in-timed checklist that can be used in real life/flow to follow, e.g. one specific work cycle with a "focus" address by ∞™ i-bubbletag without any decisions on it until the outcome is reached (e.g. a recipe Step 1 "take this" Step 2 "do this" Step 3 "eat").

Further, as shown in FIG. 13A, the user 102 may also interact with numerous icons, such as a Streams/«Dynamic Agenda» icon 221, a Feeds icon 162, a push and pull icon 158, and/or a settings icon 154. The Feeds icon 162 allows for the sharing of specific Human Streams ('fireframes'), pushes/pulls, application flows, and/or application-in-application elements/structures (e.g., project, cycles and appearances). The push and pull icon 158 allows for the two-sided or multi-sided sharing of the i-Bubble™ via trusted third parties. The settings icon 154 allows for the creation of a circle/menu, with the creation of options/option sets that may include personal time, money, material, energy, human power engagements/workload, an Internet of Things (IoT) method, an RFID verification method, a WLAN/WIFI pattern/connection strength method, a voice recognition method, a noise recognition method, user actions taken and/or screen time on the computing device, infrared light emitting diode (LED) light changes, among others not explicitly listed herein and their surrogates e.g. displacement over time or any resource management, etc.

As shown in FIG. 13A, the user may interact with a Streams/«Dynamic Agenda» 221, a Social Feed/Work Feed/

Service Feed 223, a Center/«Push and Pull Service Center» and traffic light system 225, or application/application-in-application settings 227. The Streams/«Dynamic Agenda» 221 provides Human Stream option selections, Human Stream ('fireframes') sharing, projection of cycles on Human Streams ('fireframes'), and on the go decisions on private circles. Moreover, the social Feed/Work Feed/Service Feed 223 provides two-sided or multi-sided and shared i-Bubbles™, stewardness with channels and threads, sharing of specific human flow/streams, push/polls, and application flow of application-in-application elements/structures (e.g. projects, cycles, and/or appearances. The Center/«Push and Pull Service Center» and traffic light system 225 allows for the sharing of two-sided or multi-shared i-Bubbles™ via trusted third parties.

The application/application-in-application settings 227 allows for the adoption of Feed settings, Center settings and for the creation of application-in-application settings, like options/option sets including any personal resources, one-way-action buttons, tandem-action buttons and the creation of a menu/circle with add-on and split function. As described herein, an "option" may include time, money, material, energy, human power engagements/workload, an Internet of Things (IoT) method, an RFID verification method, a WLAN/WIFI pattern/connection strength method, a voice recognition method, a noise recognition method, user actions taken and/or screen time on the computing device, infrared light emitting diode (LED) light changes, among others not explicitly listed herein and their surrogates e.g. displacement over time or any resource management.

FIG. 14 depicts a schematic diagram of configurable application-in-application settings with a selection of a resource, sub-selection of programmed option or option sets and activation or deactivation of the option/option set recording. According to FIG. 14, circle setup may include a selection of resources. Moreover, circle setup may include selection of activated options, as well as a recording option.

FIG. 15 depicts a schematic diagram of configurable application-in-application settings with a selection of a multilingual action ID button type 'OneWay ID Push & ID Pull' and the specification of the multilingual action ID button. Specifically, FIG. 15 depicts ID Push and ID Pull viewed with 'one way' action.

FIG. 16 depicts a schematic diagram of configurable application-in-application settings with a selection of a multilingual action ID button type 'Tandem forward ID Push & ID Pull and backward ID Push & ID Pull' and the specification of the multilingual action ID button. Specifically, FIG. 16 depicts ID Push and ID Pull viewed with first action, and the ID Push and ID Pull viewed of the second 'tandem' action.

FIG. 17A depicts a user-side schematic diagram associated with a Dynamic Agenda, Human Streams ('fireframes') and in-Human Stream flow projections ('fireframes') in a BubblePress™ application of a system. Moreover, FIG. 17B depicts a schematic diagram associated with a Dynamic Agenda, Human Streams ('fireframes') and in-Human Stream flow projections ('fireframes') in a BubblePress™ application of a system that is configurable and stream/time-freezed (e.g., for superposition of cycle projections or Cross-Service elements).

FIG. 17A depicts a schematic diagram of a Dynamic Agenda, Human Streams ('fireframes') and in-Human Stream flow projections in the BubblePress™ application 108. Specifically, the user 102 may view buttons 174 associated with different resource frames (e.g., time with months, days, hours, minutes, and other resources measured over time etc.). Different bubble stream situations are also depicted in FIG. 17A, such as a first bubble stream situation 176 (e.g., "at work") and a second bubble stream situation 178 (e.g., "at home").

Figure 17B:
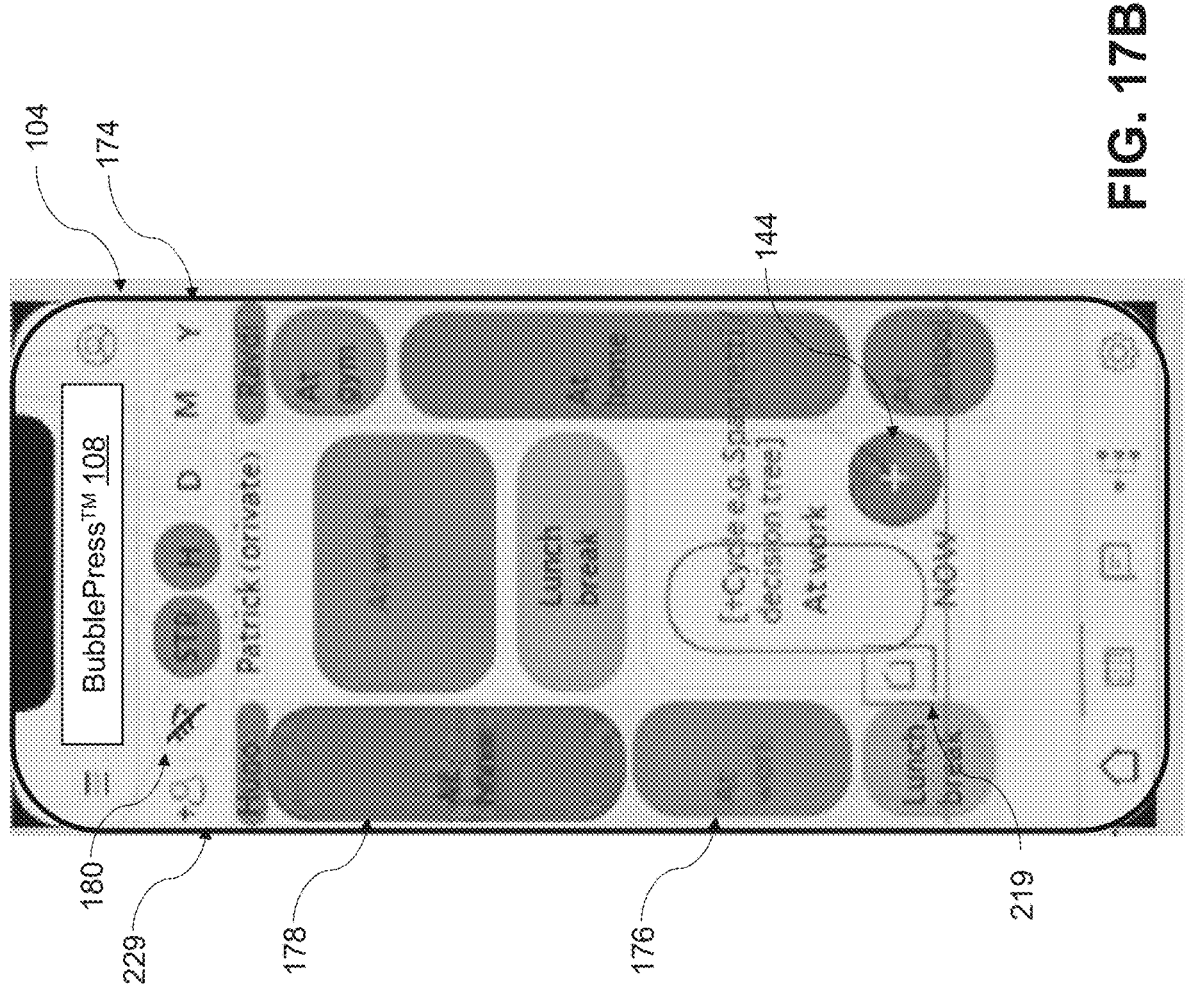
FIG. 17B depicts a schematic diagram associated with a Dynamic Agenda, Human Streams ('fireframes') and in-Human Stream flow projections ('fireframes') in a BubblePress™ application of a system that is configurable and stream/time-freezed (e.g., for superposition of cycle projections or Cross-Service elements), in accordance with embodiments of the present invention.

As shown in FIG. 17B, an inversion button 180 allows for inversion of a selected stream (e.g., shows the time off windows instead of events). A contact button 229 allows for: selection of contact spaghetti and trusted concomitant or associated channels, the addition of the shared options of the Human Stream of others (and the channels they use for sharing), and the visualization on the same screen. FIG. 17B also shows a first bubble stream situation 176 (e.g., "at work") and a second bubble stream situation 178 (e.g., "at home").

Functions of the multi-colored plus circle 144 in FIG. 17B include the following:
[Contact spaghetti, (trusted) concomitant channels]
switch to contact specific feed
Invitation[IDtoPUSHto/user-
INVITATION spaghetti Videoconference, timezone, notification, deadline for confirmation-3eParty?-ID-toPULLto/user-}
Task/Job request
[IDtoPUSH/user-engagement spaghetti-3eParty?-IDtoPUSHto REQUESTENGAGEMENTto/user-]
Task/Job offer
[IDtoPUSH/user-engagement spaghetti-3eParty?-IDtoPUSHto ACCEPTENGAGEMENTof/user-]
3eParty for Workactivity [Shared stream set selection (preconfigured in the application-in-application settings of the engaged employee)]
ProjectionOnStream[+Cycle e.g. Spaghetti/decision tree]
[+IDtoPUSHto APPROVE] (before deadline again)
[+IDtoPUSHto Share]
Stream anticipations e.g. Private Suggested Cycles/Circles; Shared trusted suggested Cycles/Circles
IDPULL (confirmation)
IDtoPUSHto (trusting)

Specifically, FIG. 17B depict flow use, and more specifically, human flow use, application flow cycle or spaghetti use, and flow cycles or spaghettis on human flow projections. Moreover, FIG. 17B depict Cross-Services or Streams/«Dynamic Agenda».

Figure 19:
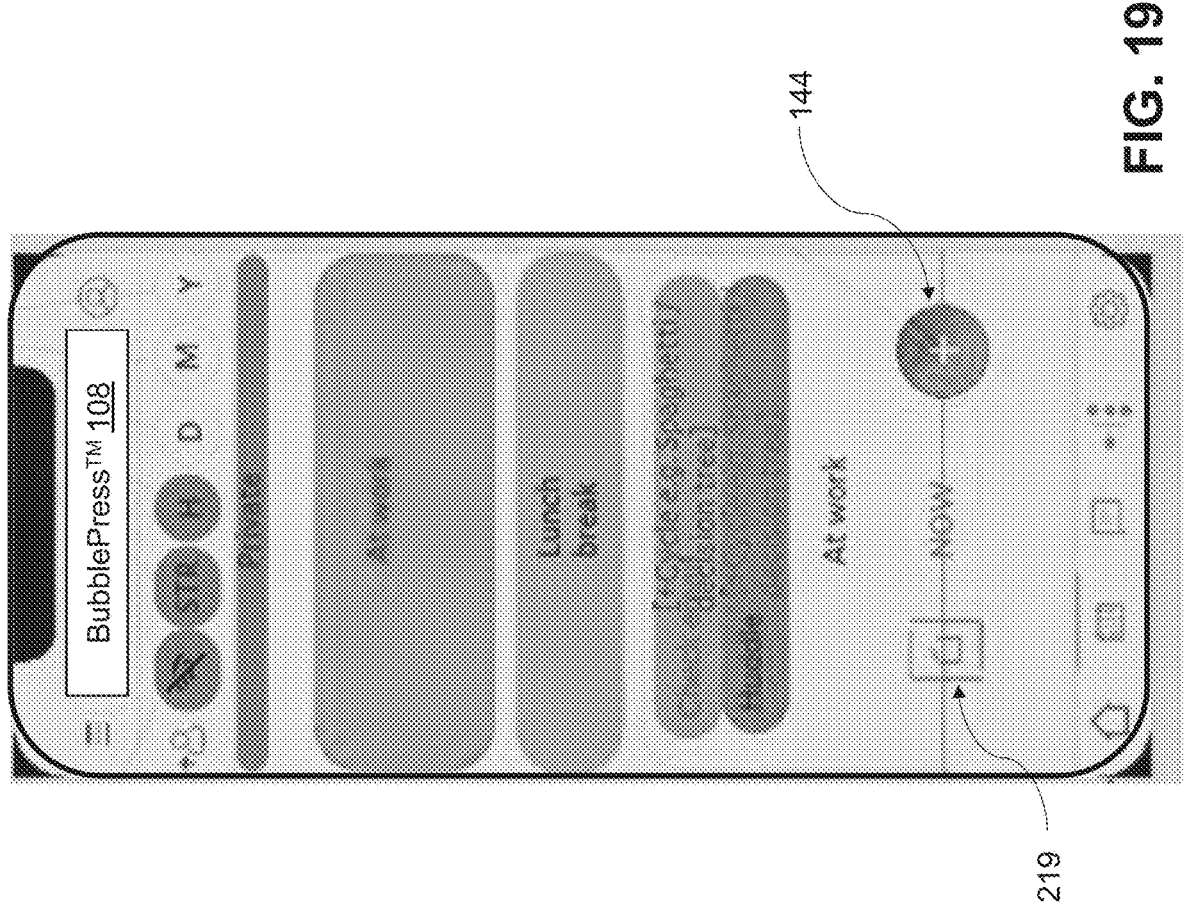
FIG. 19 depicts a schematic diagram depicting a Dynamic Agenda/Human Streams ('fireframes') in a BubblePress™ application of a system that is configurable and stream/time-freezed (e.g., for superposition of cycle projections or other Cross-Service elements), in accordance with embodiments of the present invention.

Specifically, FIG. 18 and FIG. 19 depict flow use, and more specifically, human flow use, application flow cycle or spaghetti use, and flow cycles or spaghettis on human flow projections. FIG. 18 depicts a user-side schematic diagram depicting a Dynamic Agenda and Human Streams ('fireframes') in a BubblePress™ application of a system and FIG. 19 depicts a schematic diagram depicting a Dynamic Agenda and Human Streams ('fireframes') in a BubblePress™ application of a system that is configurable and stream/time-freezed (e.g., for superposition of cycle projections or other Cross-Service elements).

Moreover, FIG. 18 depicts a schematic diagram of a Dynamic Agenda and Human Streams (e.g., daylight/night as a public shared option of time resource) in the BubblePress™ application 108, as well as the inversion button 180 that displays an inversion of a selected stream (e.g., shows time off instead of events) on the GUI 112. The functions of the multi-colored plus circle 144 in FIG. 24B are identical to those of FIG. 19.

Figure 20:
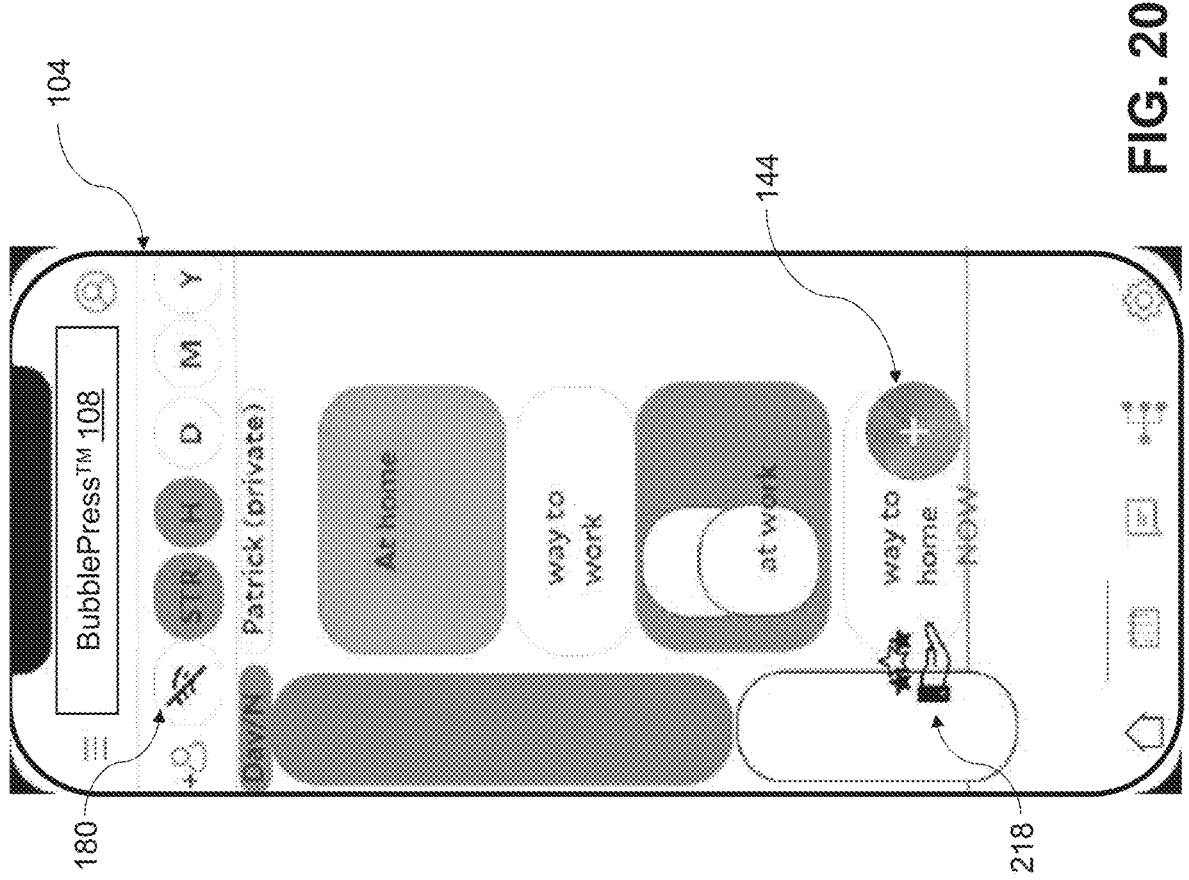
FIG. 20 depicts a user-side schematic diagram depicting a Dynamic Agenda/Human Streams ('fireframes') in a BubblePress™ application of a system, in accordance with embodiments of the present invention.
Figure 21:
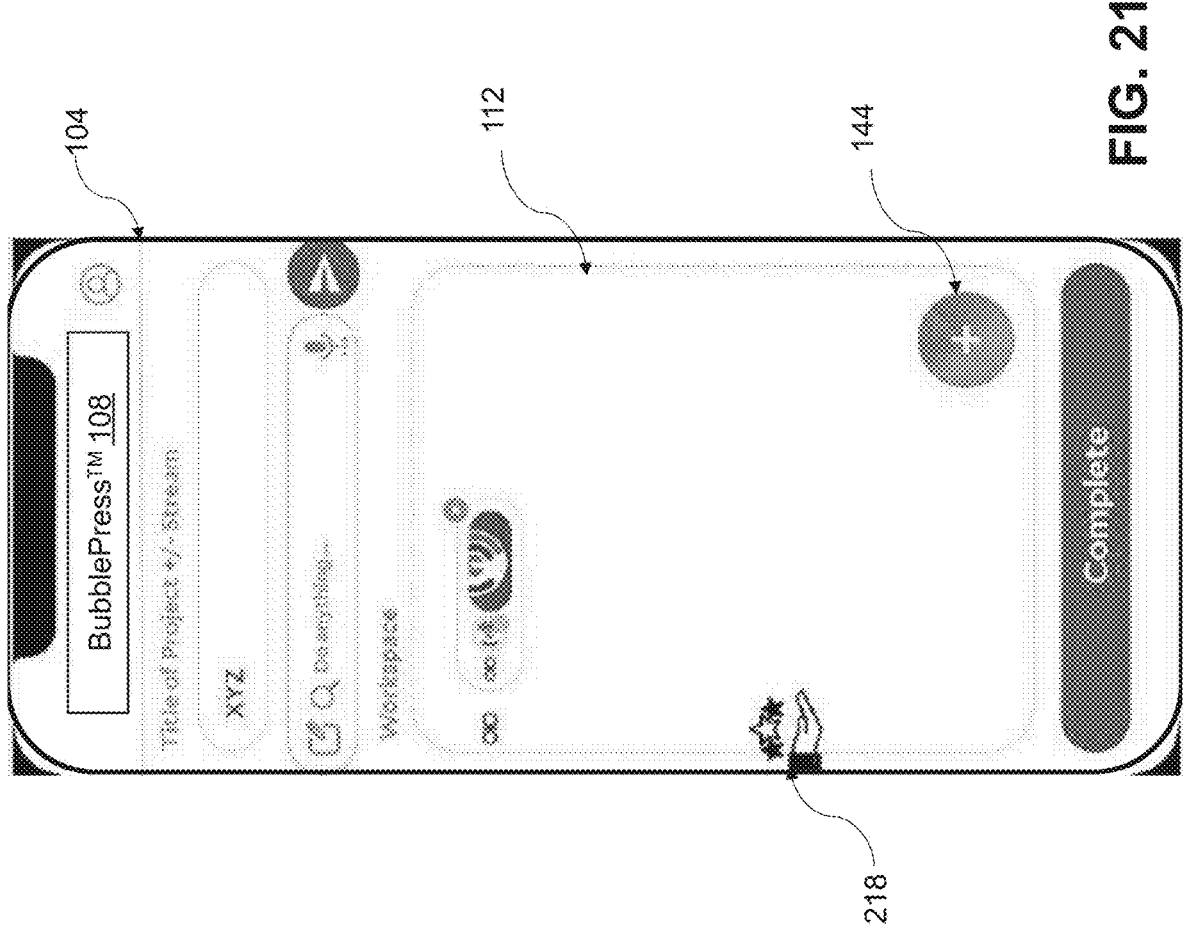
FIG. 21 depicts a user-side schematic diagram associated with creating a project through use of any i-Bubble™ application-in-application element/structure or Cross-Services with assembling of essential or semi-essential structures (e.g., circles with focus on contacts and channel Feeds; essential circles with focus on fix and flexible time windows, circles with focus on task-management with accepted, pending or rejected/failed tasks; or circles with focus on priorities with drop-in, sorted not priority, not sorted not priority, high-priority, urgent and others, etc.) on a BubblePress™ application of a system, that is configurable, in accordance with embodiments of the present invention.

FIG. 20 depicts a user-side schematic diagram depicting a Dynamic Agenda and Human Streams ('fireframes') in a BubblePress™ application of a system. FIG. 21 depicts a user-side schematic diagram associated with creating a project through use of any i-Bubble™ application-in-application element/structure or Cross-Services with assembling of essential or semi-essential structures (e.g., circles with focus on contacts and channel Feeds; essential circles with focus on fix and flexible time windows, circles with focus on task-management with accepted, pending or rejected/failed tasks; or circles with focus on priorities with drop-in, sorted not priority, not sorted not priority, high-priority, urgent and others, etc.) on a BubblePress™ application of a system, that is configurable.

FIG. 21 depicts a schematic diagram associated with creating and completion a project through use of a circle on a BubblePress™ application of a system that is configurable. As shown in FIG. 21, the user 102 may create a project through the use of any i-Bubble™ application-in-application element/structure described herein. Moreover, FIG. 21 depicts a (work)space subframe defined for each ∞™ i-bubbletag/step on a cycle (e.g., what options should be triggered). Moreover, the multi-colored plus circle 144 may be used to open a project or to create/adopt a project, in order to add, or remove any i-Bubble™ application-in-application element/structure (e.g. a cycles, circles, Human Streams ('fireframes') and/or any appearance etc.). As shown in FIG. 21, execution of the multi-colored plus circle 144 allows for stream 'STR' option set selection, confirmation of the IDPULL, confirmation of the IDtoPUSHto, creation or addition of cycles (such as spaghettis or decision trees with subdivision or fusion of sections), creation or addition of circles, and/or addition of Human Streams ('fireframes').

The functions of the multi-colored plus circle 144 of FIG. 21 are as follows:
[Contact spaghetti, (trusted) concomitant channels]
switch to contact specific feed
Job application
[IDtoPUSH/user-engagementspaghetti-3eParty?-IDtoPUSHtoREQUESTENGAGEMENTto/user-]
Job offer
[IDtoPUSH/user-engagementspaghetti3eParty?-IDto-PUSHto
ACCEPTENGAGEMENTof/user-]
3eParty for Workactivity [Shared stream set selection (preconfigured in the application-in-application settings of the engaged employee)]
IDPULL (confirmation)
IDtoPUSHto (trusting)

Figure 22:
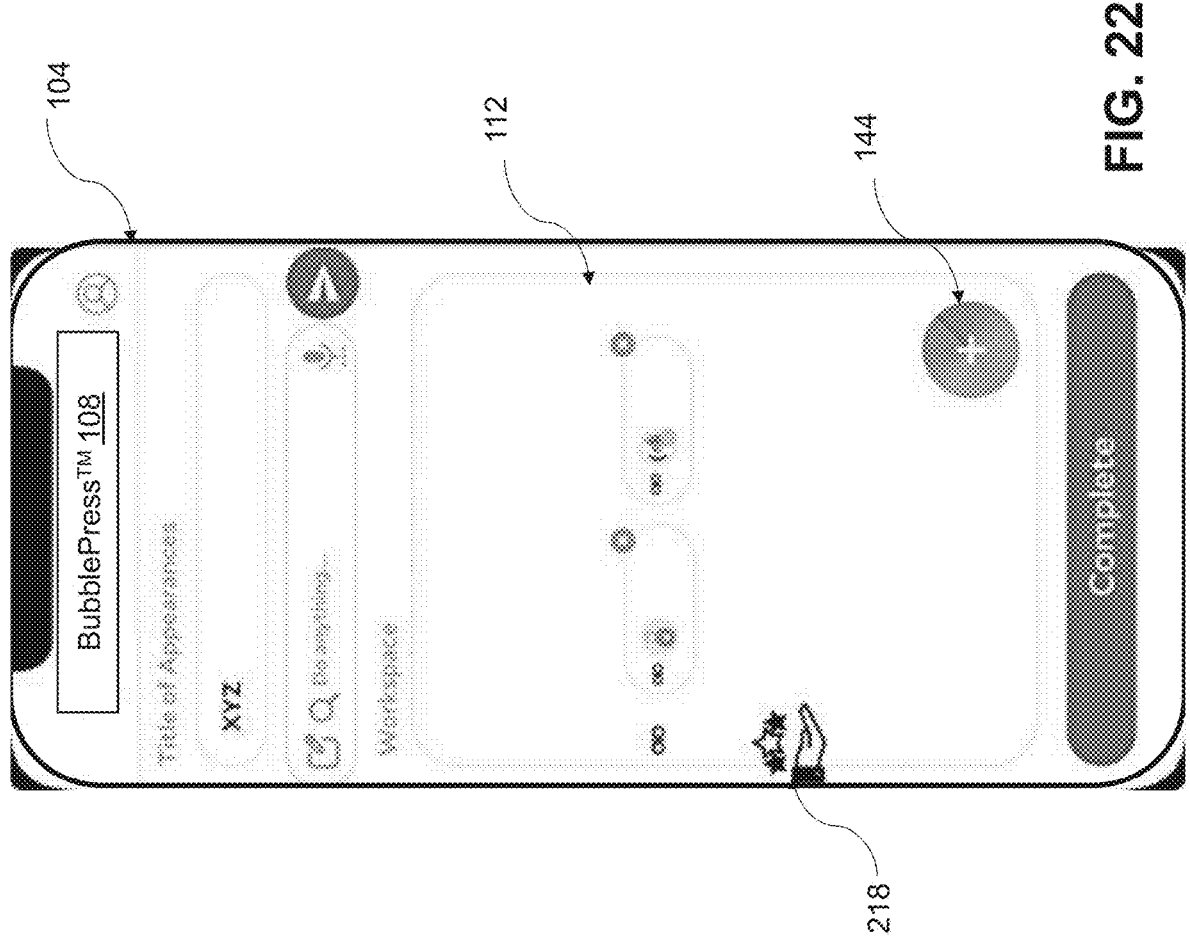
FIG. 22 depicts a schematic diagram associated with creating an appearance through the use of circles in a BubblePress™ application of a system that is configurable, in accordance with embodiments of the present invention.

FIG. 22 depicts a schematic diagram associated with creating an appearance through the use of circles in a BubblePress™ application of a system that is configurable. Moreover, it should be appreciated that FIG. 22 is associated with high level hashtags, checklists, to-do lists, notes, spreadsheets, forms and other appearances.

As shown in FIG. 21 and FIG. 22, (work)space subframes are defined for each ∞™ i-bubbletag step on a cycle (e.g., on the Demoji™/Demoticon™/spaghetti/sequence/chain/cycle/decision tree), what option 'on' or what option 'off' should be triggered, what IDPULL or IDtoPUSHto, and in what interval. The functions of the multi-colored plus circle 144 of FIG. 21 and FIG. 22 are as follows:
[Contact spaghetti, (trusted) concomitant channels]
switch to contact specific feed
Job application
[IDtoPUSH/user-engagement spaghetti-3eParty?-IDtoPUSHto REQUESTENGAGEMENTto/user-]
Job offer
[IDtoPUSH/user-engagement spaghetti3eParty?-IDtoPUSHto ACCEPTENGAGEMENTof/user-]
880-3eParty for Workactivity [Shared stream set selection (preconfigured in the application-in-application settings of the engaged employee)]
IDPULL (confirmation)
IDtoPUSHto (trusting)

It should be appreciated that any process described herein can be neutralized of information. In fact, the information can be fused under a given focus, any information can be subdivided under a given sub-focus, pushed to others, modified or deleted, etc.

Figure 23B:
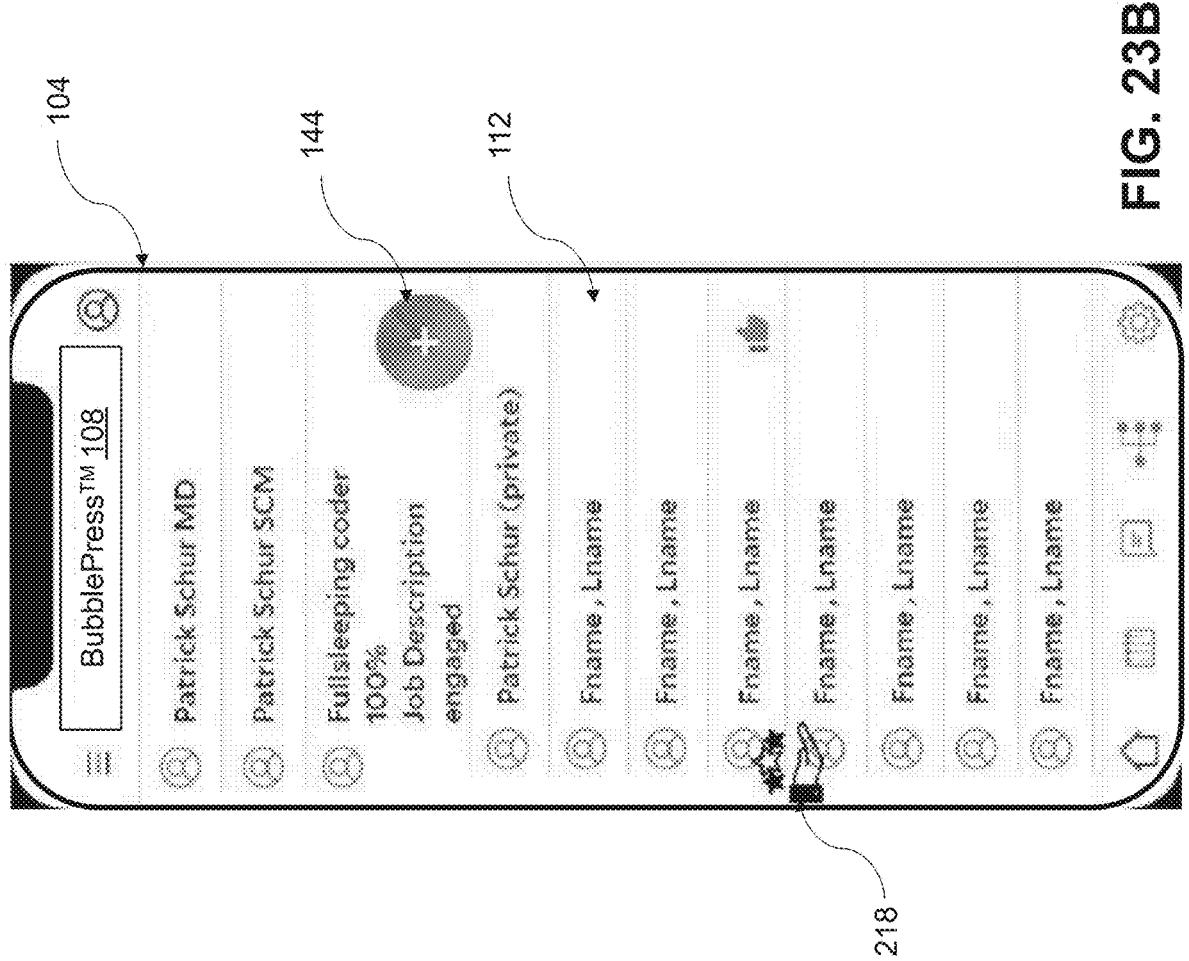
FIG. 23B depicts a user-side schematic diagram associated with a listing of contacts, profiles, channels, and jobs/job applications/engagements for various users in a BubblePress™ application of a system, where a job description has been engaged, in accordance with embodiments of the present invention.
Figure 23C:
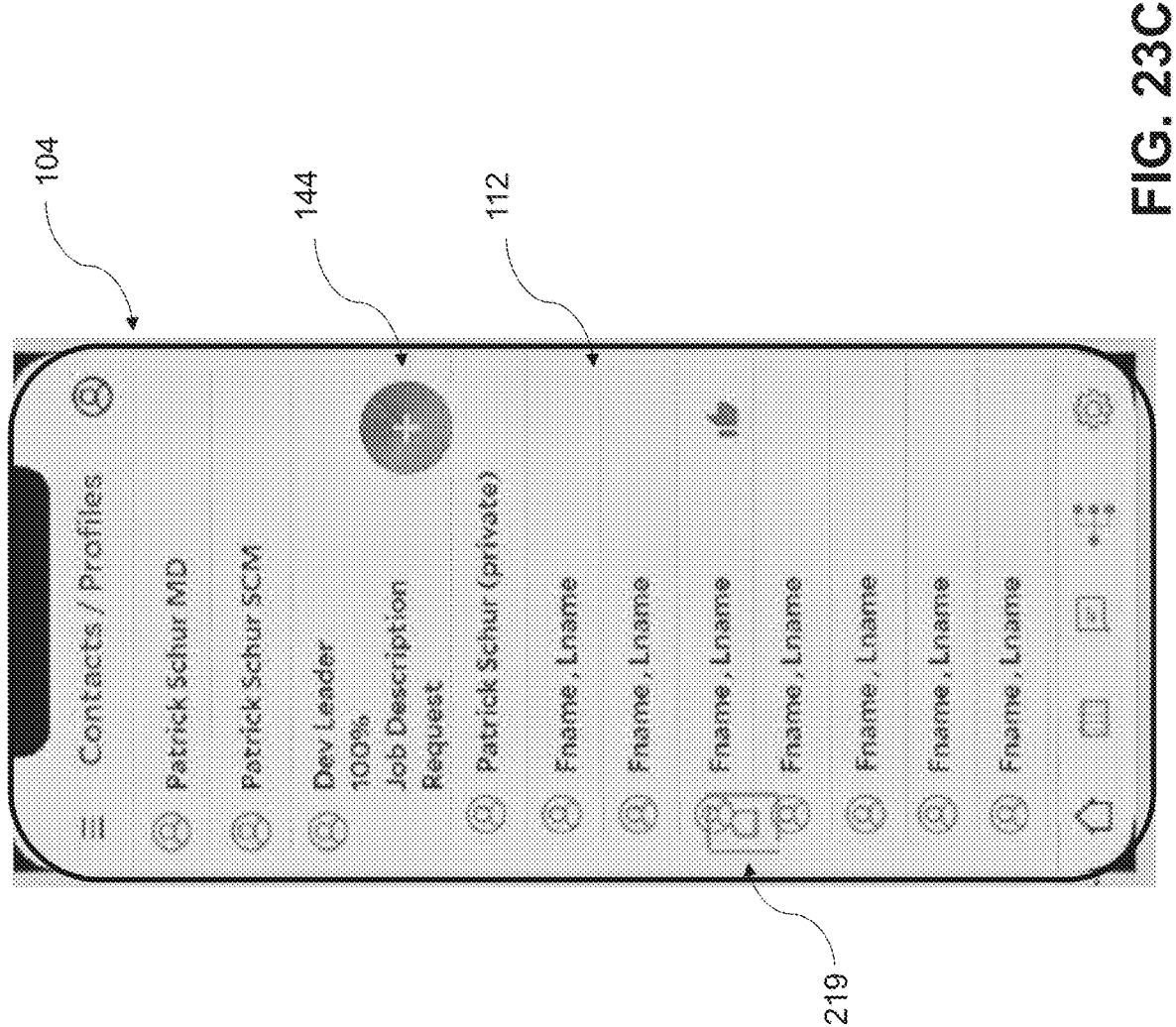
FIG. 23C depicts a schematic diagram associated with a listing of contacts/profiles/engagements for various users in a BubblePress™ application of a system that is configurable, where a job description has been requested, in accordance with embodiments of the present invention.
Figure 23D:
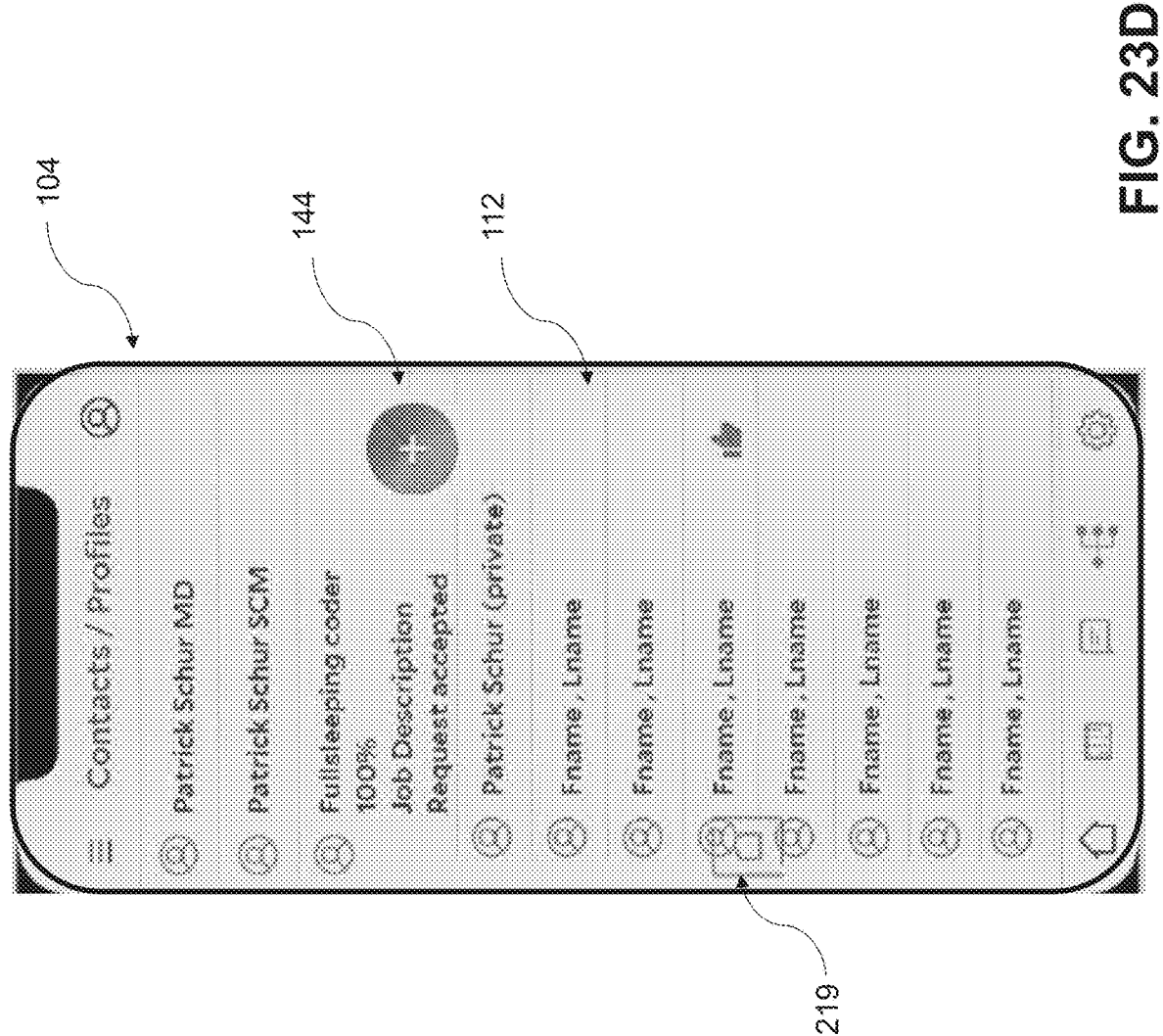
FIG. 23D depicts a schematic diagram associated with a listing of contacts/profiles/engagements for various users in a BubblePress™ application of a system that is configurable, where a job description request has been accepted, in accordance with embodiments of the present invention.

In general, FIG. 23A-FIG. 23D depict Cross-Services including contacts, profiles, channels, and jobs/job applications/engagements. FIG. 23A depicts a user-side schematic diagram associated with a listing of contacts, profiles, channels, and jobs/job applications/engagements for various users in a BubblePress™ application of a system, where a job description has been requested. FIG. 23B depicts a user-side schematic diagram associated with a listing of contacts, profiles, channels, and jobs/job applications/engagements for various users in a BubblePress™ application of a system, where a job description has been engaged. FIG. 23C depicts a schematic diagram associated with a listing of contacts/profiles/engagements for various users in a BubblePress™ application of a system that is configurable, where a job description has been requested. FIG. 23D depicts a schematic diagram associated with a listing of contacts/profiles/engagements for various users in a BubblePress™ application of a system that is configurable, where a job description request has been accepted.

Functions of the multi-colored plus circle 144 of FIG. 23C and FIG. 23D include the following:
[Contact spaghetti, (trusted) concomitant channels]
switch to contact specific feed
Job application
[IDtoPUSH/user-engagement spaghetti-3eParty?-IDtoPUSHto REQUESTENGAGEMENTto/user-]
Job offer
[IDtoPUSH/user-engagement spaghetti3eParty?-IDtoPUSHto ACCEPTENGAGEMENTof/user-]
3eParty for Workactivity [Shared stream set selection (preconfigured in the application-in-application settings of the engaged employee)]
IDPULL (confirmation)
IDtoPUSHto (trusting)

Figure 24A:
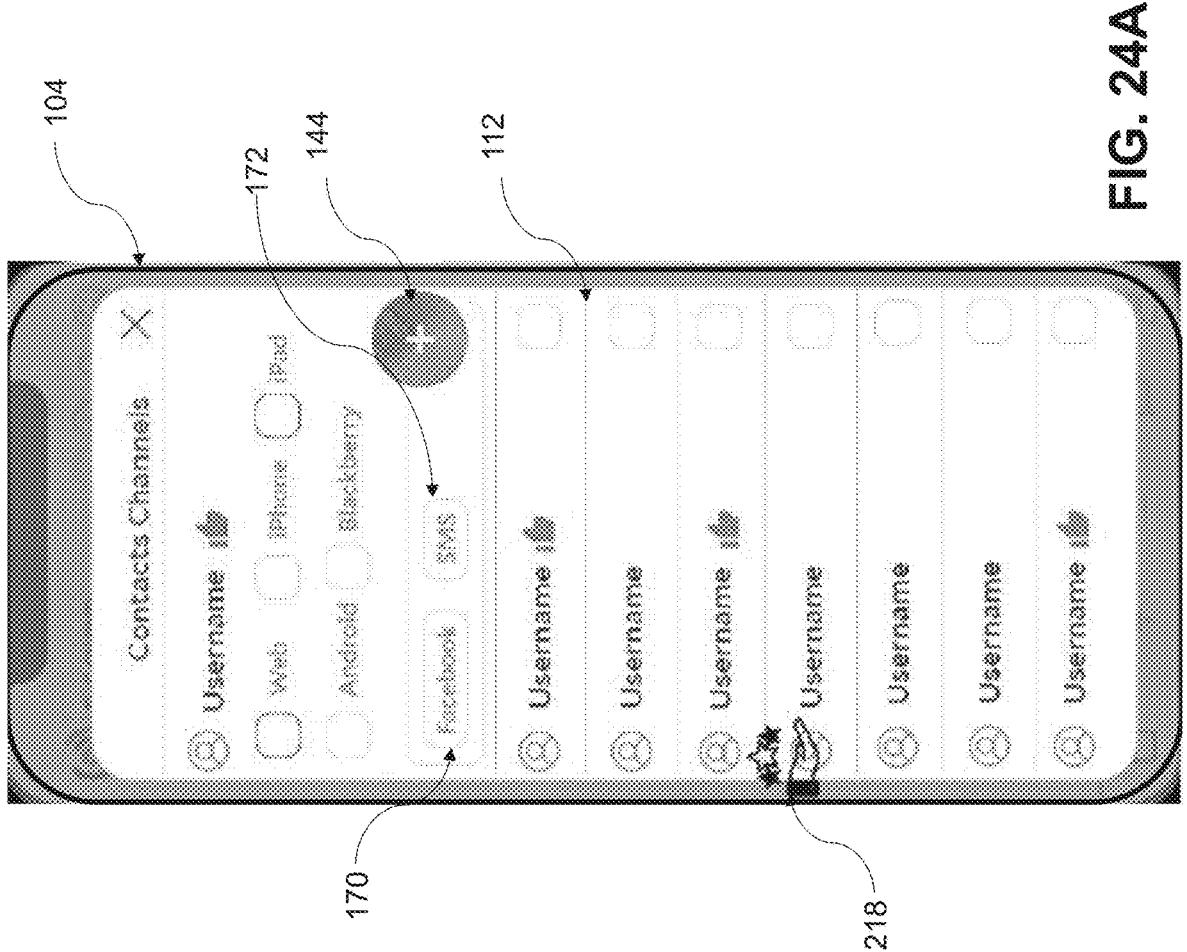
FIG. 24A depicts a user-side schematic diagram associated with contact channels for various users in a BubblePress™ application of a system, in accordance with embodiments of the present invention.
Figure 24B:
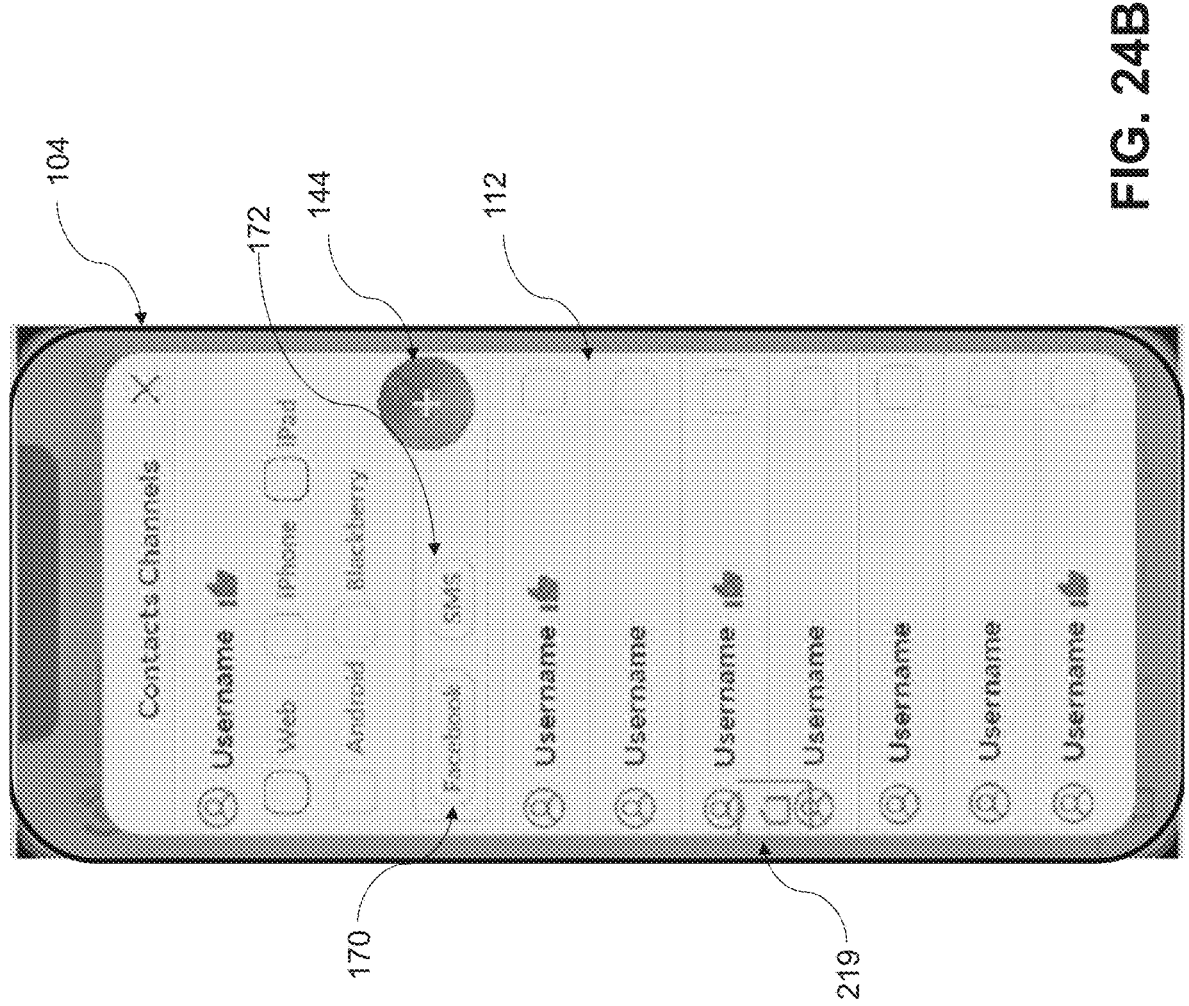
FIG. 24B depicts a schematic diagram associated with contact channels for various users in a BubblePress™ application of a system that is configurable, in accordance with embodiments of the present invention.

FIG. 24A depicts a user-side schematic diagram associated with contact channels for various users in a BubblePress™ application of a system and FIG. 24B depicts a schematic diagram associated with contact channels for various users in a BubblePress™ application of a system that is configurable.

FIG. 24A depicts channels to communicate with one or more contacts that may be selected by the user 102. These channels may be accessed by username (e.g., via the web, smartphone, laptop, etc.), text message or SMS message 172, or via the service 170 (such as a social media networking service, e.g., Facebook). The user 102 may execute the multi-colored plus circle 144 to request or accept an engagement (e.g., the job offer). The user 102 may also select specific Feeds or channels for groups, sub-services, threads, etc.

Channels may be trusted based on measurements that define the situation apart from Geolocation GPS, in order to assemble the relevant personal information of the user 102. These measurements include: RFID verification, WLAN/WIFI pattern/connection strength, voice recognition, noise recognition, user actions taken on the computing device 104, infrared light emitting diode (LED) light changes, or a screen time verification, among other methods known to those having ordinary skill in the art. Moreover, the BubblePress™ application 108 may utilize a background protocol for incremental changes of all connected sharing levels, specific third-parties and specific authorities.

Functions of the multi-colored plus circle 144 in FIG. 24B include the following:
[Contact spaghetti, (trusted) concomitant channels]
switch to contact specific feed
Job application
[IDtoPUSH/user-engagement spaghetti-3eParty?-IDtoPUSHto REQUESTENGAGEMENTto/user-]
Job offer
[IDtoPUSH/user-engagement spaghetti3eParty?-IDtoPUSHto ACCEPTENGAGEMENTof/user-]
3eParty for Workactivity [Shared stream set selection (preconfigured in the application-in-application settings of the engaged employee)]
IDPULL (confirmation)
IDtoPUSHto (trusting)

Figure 25B:
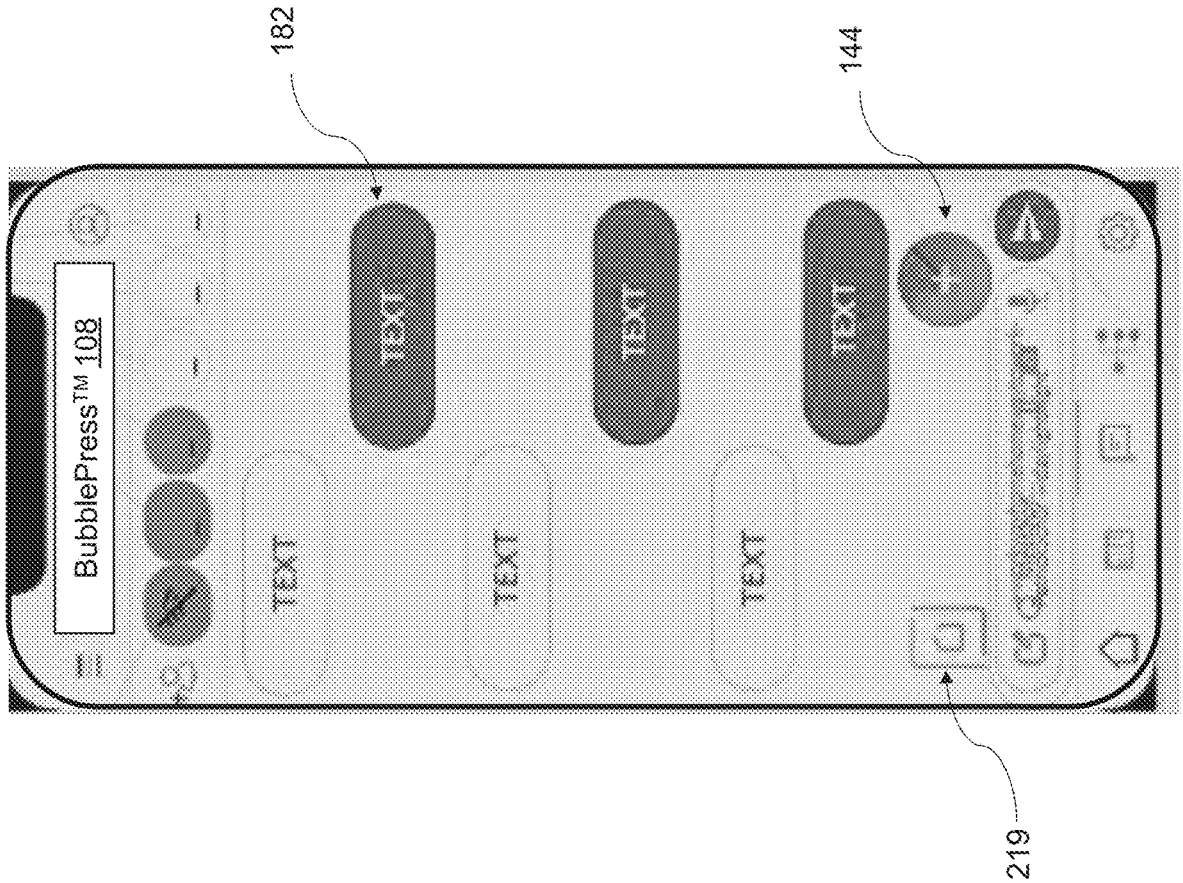
FIG. 25B depicts a schematic diagram depicting circle direct or group channels, as well as messages between users, in a BubblePress™ application of a system that is configurable and stream/time-freezed (e.g., for adoption of circles focused on contacts and channels, or other Cross-Service elements for channel specification with another circle focused on e.g. priorities), in accordance with embodiments of the present invention.

FIG. 25A depicts a user-side schematic diagram depicting circle direct or group channels, as well as messages between users, in a BubblePress™ application of a system. FIG. 25B depicts a schematic diagram depicting circle direct or group channels, as well as messages between users, in a BubblePress™ application of a system that is configurable and stream/time-freezed (e.g., for adoption of circles focused on contacts and channels, or other Cross-Service elements for channel specification with another circle focused on e.g. priorities).

As shown in FIG. 25A, circle direct or group channels 184 may be depicted via the GUI 112. Further, trusted channels may be added via a button 186. The button 186 is a circle with focus on contacts and channel Feeds. FIG. 25A also depicts messages 182 between users. It should also be appreciated that the BubblePress™ application 108 also includes a speech to text engine (not shown) that provides suggested text and/or allows users to chat over the focused resource measurement stream and i-Bubble™ stewardness.

Functions of the multi-colored plus circle 144 in FIG. 25B include the following:
[Contact spaghetti, (trusted) concomitant channels]
//
Invitation[IDtoPUSHto/user-
INVITATION spaghetti Videoconference, timezone, notification, deadline for confirmation-3eParty?-IDtoPULLto/user-}
Task/Job request
[IDtoPUSH/user-engagement spaghetti-3eParty?-IDtoPUSHto REQUESTENGAGEMENTto/user-]
Task/Job offer
[IDtoPUSH/user-engagement spaghetti-3eParty?-IDtoPUSHto ACCEPTENGAGEMENTof/user-]
3eParty for Workactivity [Shared stream set selection (preconfigured in the application-in-application settings of the engaged employee)]
ProjectionOnStream[+Cycle e.g. Spaghetti/decision tree]
[+IDtoPUSHto APPROVE] (before deadline again)
[+IDtoPUSHto Share]
Stream anticipations e.g. Private Suggested Cycles/Circles; Shared trusted suggested Cycles/Circles
IDPULL (confirmation)
IDtoPUSHto (trusting)

Figure 26A:
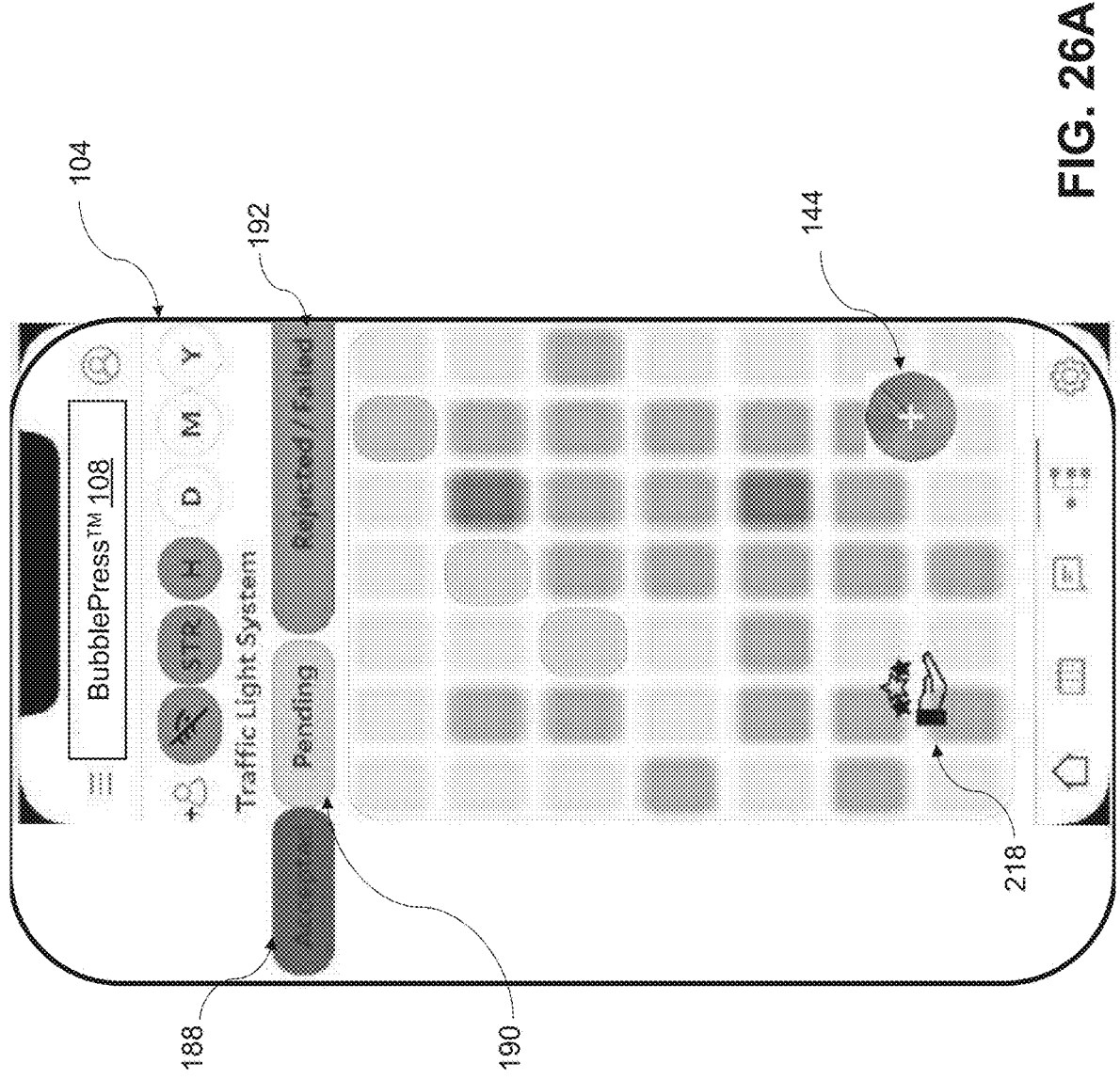
FIG. 26A depicts a user-side schematic diagram depicting a "traffic light system" in a BubblePress™ application of a system, in accordance with embodiments of the present invention.

FIG. 26A-FIG. 29A depict the Center/«Push and Pull Service Center». Specifically, FIG. 26A depicts a user-side schematic diagram depicting a "traffic light system" in a BubblePress™ application of a system and FIG. 26B depicts a schematic diagram depicting a "traffic light system" in a BubblePress™ application of a system that is configurable and stream/time-freezed (e.g., for adoption of circles focused on contacts and channels or other Cross-Service elements for "traffic light system" specification with another circle focused on e.g. priorities).

FIG. 26A depicts another implementation of the system, deemed the "traffic light system." In general, the traffic light system is the surface of the Center/«Push and Pull Service Center» and works in a service-to-be-done control system. The Center/«Push and Pull Service Center» is one of three Cross-Services on the BubblePress™ application 108, as well two layers and is mostly based on the i-Bubble™ elements including circles/menus, spaghettis and appearances e.g. forms, etc.

It should be appreciated that the "traffic light system" may be configured to show progress in pushes and workup of pulls. Moreover, this "traffic light system" allows the user 102 to add an importance or priority circle (e.g., an urgent level or a non-urgent level) or other circles. Additionally, the traffic light system focuses on: defined sequences or different sub-sequences allowed (beyond automatic resource measurements) and the categorization into preconfigured essential value-focused circles (e.g., "gives value," "gives no value but is needed," "gives no value and is not needed," "waiting time," "error, critical event," or "extra work with parallel processing and communication," etc.).

It should be appreciated that in this embodiment, the user 102 can make his/her choice for each sub-sequence. An engaged supply chain expert (not shown) is able to rearrange the processes from an "as-is" status to a future status with supply chain excellence over all resources (including information, time, money, material, energy, human power engagements/workload, an Internet of Things (IoT) method, an RFID verification method, a WLAN/WIFI pattern/connection strength method, a voice recognition method, a noise recognition method, user actions taken and/or screen time on the computing device, infrared light emitting diode (LED) light changes, among others not explicitly listed herein and their surrogates e.g. displacement over time or any resource management etc.).

Peered streams of different (combined) options of resources of different users allows forecasting, planning, coordination and intervention of activities. Utilizing this traffic light system, same level information (e.g., menus or decision options) can be visualized on issue-focused circles or as usual on different appearances (e.g. checklists, to-do lists, notes, spreadsheets, forms, etc.).

The traffic light system allows the user 102 to view "accepted" 188, "rejected/failed" 192, or "pending" 190 engagements. Each of these designations (e.g., the "accepted" 188, the "rejected/failed" 192, and the "pending" 190 engagements) may be distinguishable by differing colors, sizes, shapes, text, etc.

In an illustrative example, and in the healthcare space, the BubblePress™ application 108 allows for the service-push of timed control (e.g., deadline obligation, like an intake request, patient-push of approval of medication intake and the control of this "medication delivery intake" process on the traffic light system).

In another illustrative example, and in the legal space, the application-in-application element/structure allows the user 102 to add other options to a form. For example, a lawyer may add classes of a trademark issue and provide the best options with criteria so that the pulled user on the other side will make his or her "maturation" for the best decision making.

As a further illustrative example, the traffic light system of FIG. 26A may be used by a given group to see what tasks have been accepted, which tasks are pending, and which tasks have been rejected or have failed. On the application-in-application side, the traffic light system may be used to see how many contributions have been made and to ensure that groups are working together efficiently.

Figure 26B:
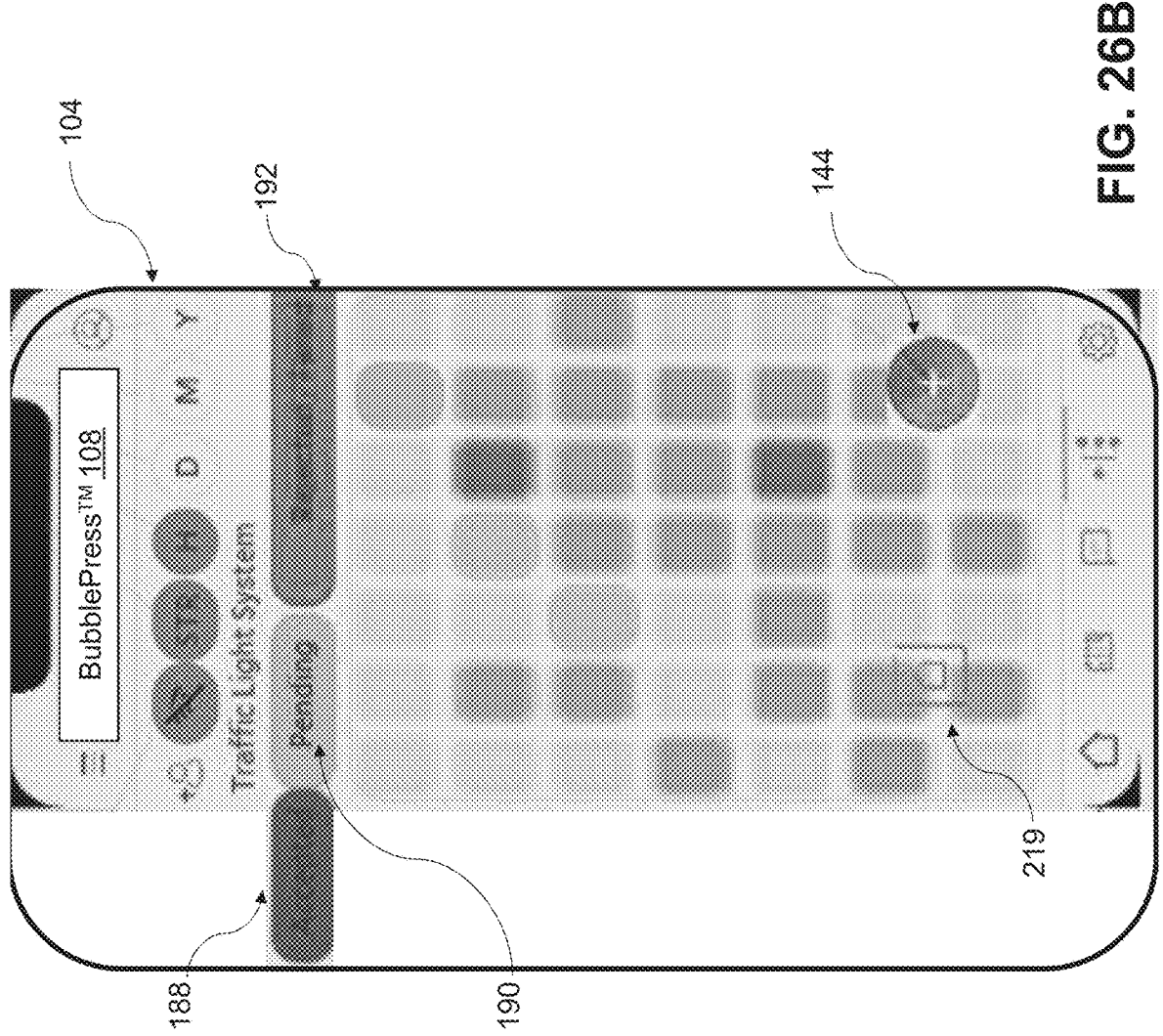
FIG. 26B depicts a schematic diagram depicting a "traffic light system" in a BubblePress™ application of a system that is configurable and stream/time-freezed (e.g., for adoption of circles focused on contacts and channels or other Cross-Service elements for "traffic light system" specification with another circle focused on e.g. priorities), in accordance with embodiments of the present invention.

Functions of the multi-colored plus circle 144 in FIG. 26B include the following:

[Contact spaghetti, (trusted) concomitant channels]
switch to contact specific feed
Invitation
[IDtoPUSHto/user-INVITATION spaghetti Videoconference, timezone, notification, deadline for confirmation-3eParty?-IDtoPULLto/user-}
Task/Job request
[IDtoPUSH/user-engagement spaghetti-3eParty?-IDtoPUSHto REQUESTENGAGEMENTto/user-]
Task/Job offer
[IDtoPUSH/user-engagement spaghetti-3eParty?-IDtoPUSHto ACCEPTENGAGEMENTof/user-]
3eParty for Workactivity [Shared stream set selection (preconfigured in the application-in-application settings of the engaged employee)]
ProjectionOnStream[+Cycle e.g. Spaghetti/decision tree]
[+IDtoPUSHto APPROVE] (before deadline again)
[+IDtoPUSHto Share]
Stream anticipations e.g. Private Suggested Cycles/Circles; Shared trusted suggested Cycles/Circles
IDPULL (confirmation)
IDtoPUSHto (trusting)

Figure 27A:
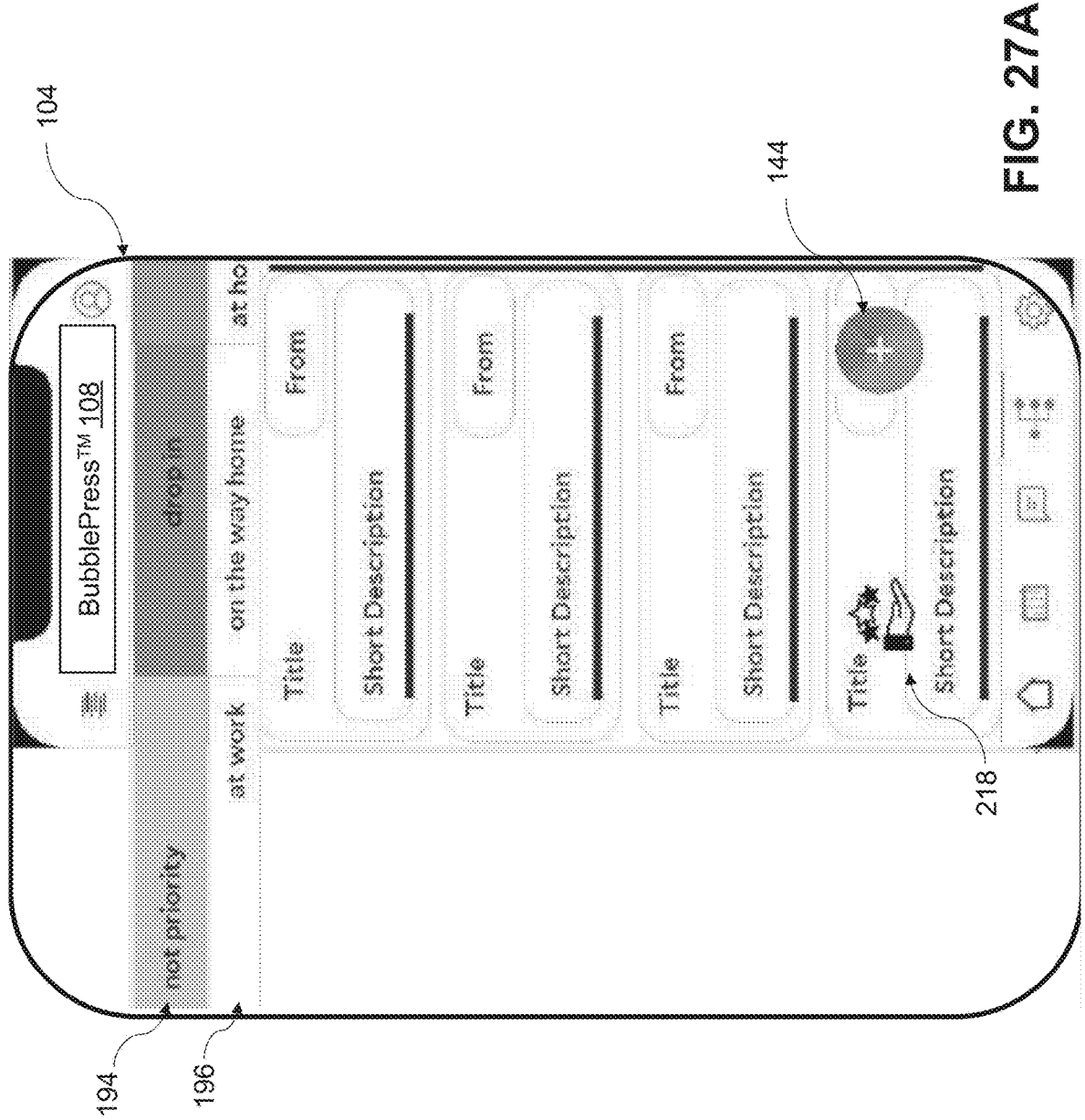
FIG. 27A depicts a user-side schematic diagram showcasing a priority level of a given task, as well as a location of a user, in a BubblePress™ application of a system, in accordance with embodiments of the present invention.
Figure 27B:
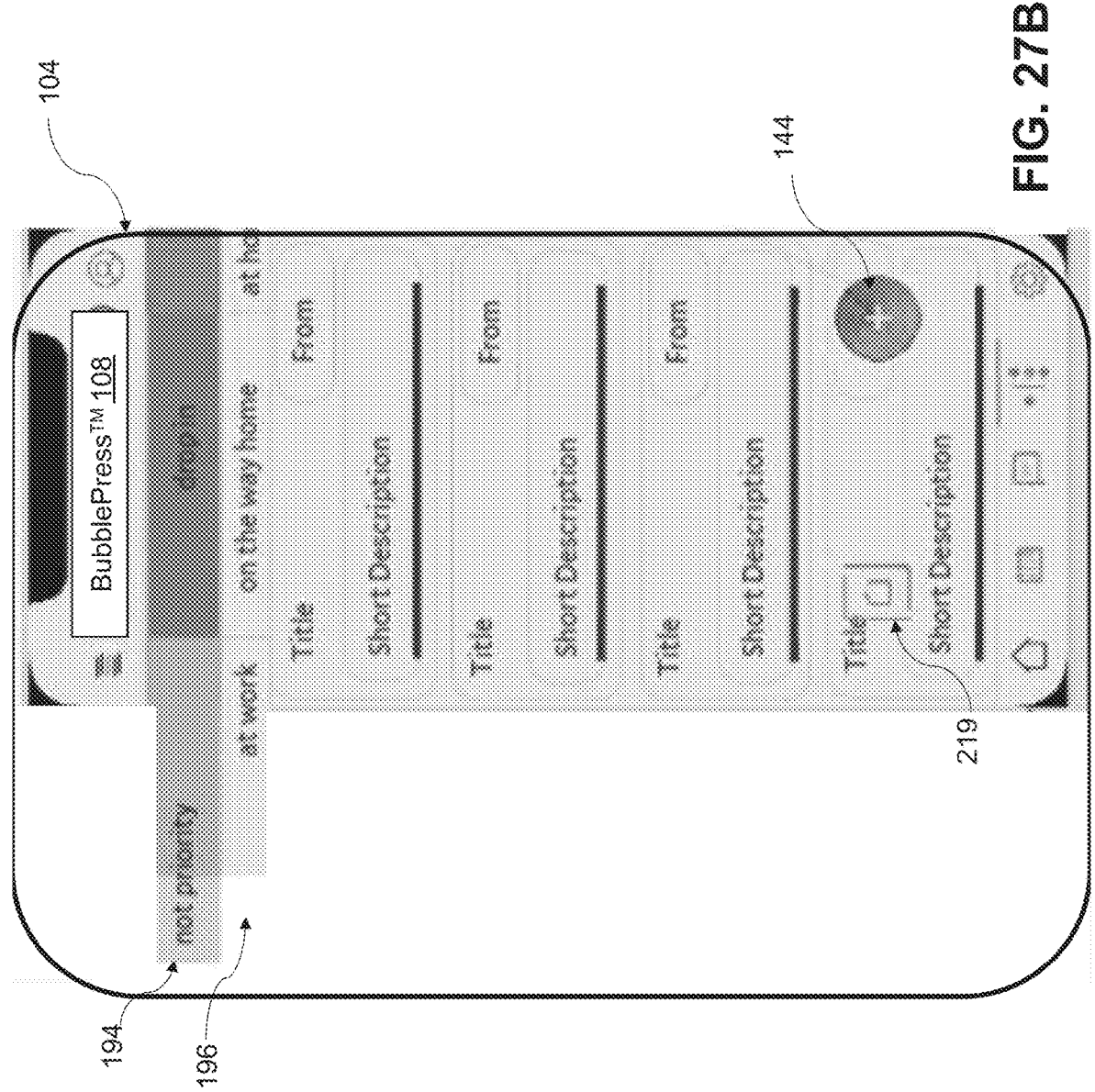
FIG. 27B depicts a schematic diagram showcasing a priority level of a given task, as well as a location of a user, in a BubblePress™ application of a system that is configurable and stream/time-freezed (e.g., for adoption of circles focused on contacts and channels or other Cross-Service elements for "traffic light system" specification with another circle focused on e.g. priorities and/or other situational specifications etc.), in accordance with embodiments of the present invention.

FIG. 27A depicts a user-side schematic diagram showcasing a priority level of a given task, as well as a location of a user, in a BubblePress™ application of a system. FIG. 27B depicts a schematic diagram showcasing a priority level of a given task, as well as a location of a user, in a BubblePress™ application of a system that is configurable and stream/time-freezed (e.g., for adoption of circles focused on contacts and channels or other Cross-Service elements for "traffic light system" specification with another circle focused on e.g. priorities and/or other situational specifications etc.).

As shown in FIG. 27A, a priority level 194 of a given task, as well as a location 196 of a given user, may also be depicted and viewable via the GUI 112. Specifically, reference numeral 194 is a circle with a focus on priorities with drop-in, sorted not priority, not sorted not priority, high-priority, urgent and other.

Functions of the multi-colored plus circle 144 in FIG. 27B include the following:

[Contact spaghetti, (trusted) concomitant channels]
switch to contact specific feed
Invitation
[IDtoPUSHto/user-
INVITATION spaghetti Videoconference, timezone, notification, deadline for confirmation-3eParty?-IDtoPULLto/user-}
Task/Job request
[IDtoPUSH/user-engagement spaghetti-3eParty?-IDtoPUSHto REQUESTENGAGEMENTto/user-]
Task/Job offer
[IDtoPUSH/user-engagement spaghetti-3eParty?-IDtoPUSHto ACCEPTENGAGEMENTof/user-]
3eParty for Workactivity [Shared stream set selection (preconfigured in the application-in-application settings of the engaged employee)]
ProjectionOnStream[+Cycle e.g. Spaghetti/decision tree]
[+IDtoPUSHto APPROVE] (before deadline again)
[+IDtoPUSHto Share]
Stream anticipations e.g. Private Suggested Cycles/Circles; Shared trusted suggested Cycles/Circles
IDPULL (confirmation)
IDtoPUSHto (trusting)

Figure 28A:
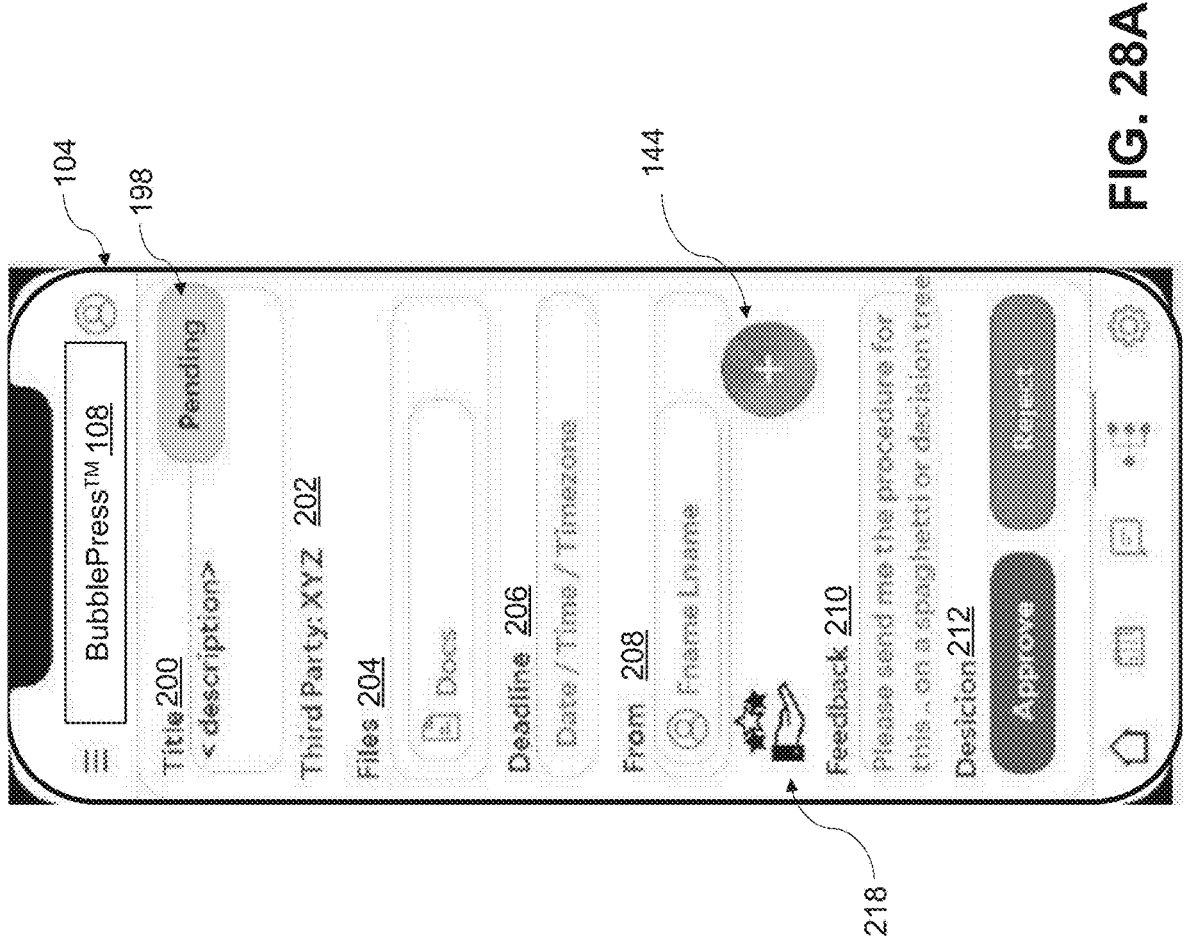
FIG. 28A depicts a user-side schematic diagram depicting pending transfers in a BubblePress™ application of a system, in accordance with embodiments of the present invention.
Figure 28B:
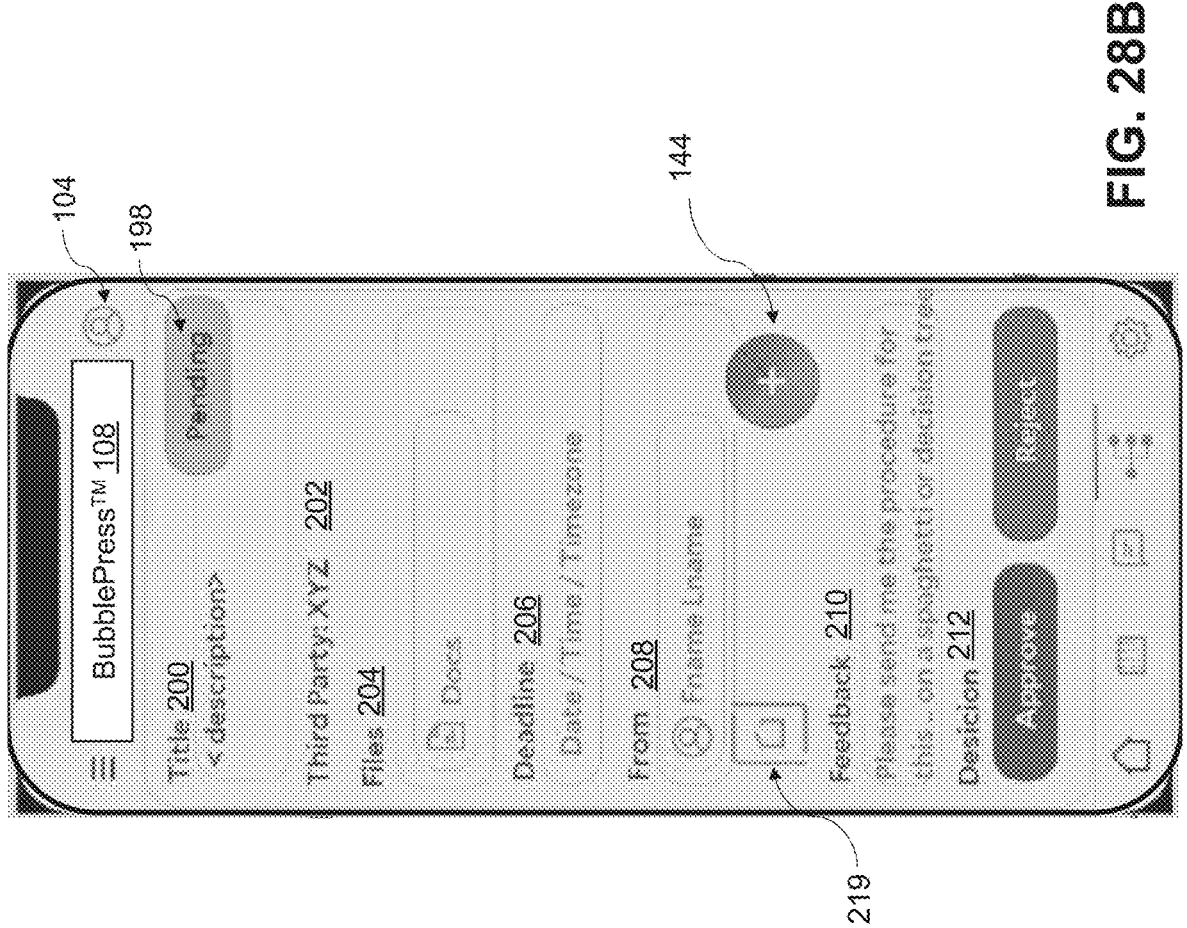
FIG. 28B depicts a schematic diagram depicting pending transfers in a BubblePress™ application of a system that is configurable and stream/time-freezed (e.g., for adoption and specification of push and pull service forms with criteria and options e.g. priorities, trusted third party authorization with validity interval, deadline, push/pull time stamp of each stakeholder, pull-acceptance, sharing level, security level, trusting level, etc.), in accordance with embodiments of the present invention.

FIG. 28A depicts a user-side schematic diagram depicting pending transfers in a BubblePress™ application of a system. FIG. 28B depicts a schematic diagram depicting pending transfers in a BubblePress™ application of a system that is configurable and stream/time-freezed (e.g., for adoption and specification of push and pull service forms with criteria and options e.g. priorities, trusted third party authorization with validity interval, deadline, push/pull time stamp of each stakeholder, pull-acceptance, sharing level, security level, trusting level, etc.).

As shown in FIG. 28A, the BubblePress™ application 108 may display pending transfers (e.g., a transfer of one or more documents/files 204 from a user 208 to another user 202, such as a third-party XYZ). The transfer may be named/titled 200, have a deadline 206 (e.g., including a date, time, and/or time zone), and include feedback 210. Moreover, a status of the transfer may be deemed as pending via one or more visual or textual cues 198. The decision 212 to transfer the one or more documents/files 204 may also be approved or rejected/denied.

It should be appreciated that, as shown in FIG. 28B, the user 208 and/or the other user 202 (e.g., the third-party XYZ) may be trusting or not trusted. Execution of the multi-colored plus circle 144 allows for addition of cycles. Moreover, execution of the approve button approves the IDtoPUSHto and execution of the rejection button rejects the IDtoPUSHto.

Figure 29A:
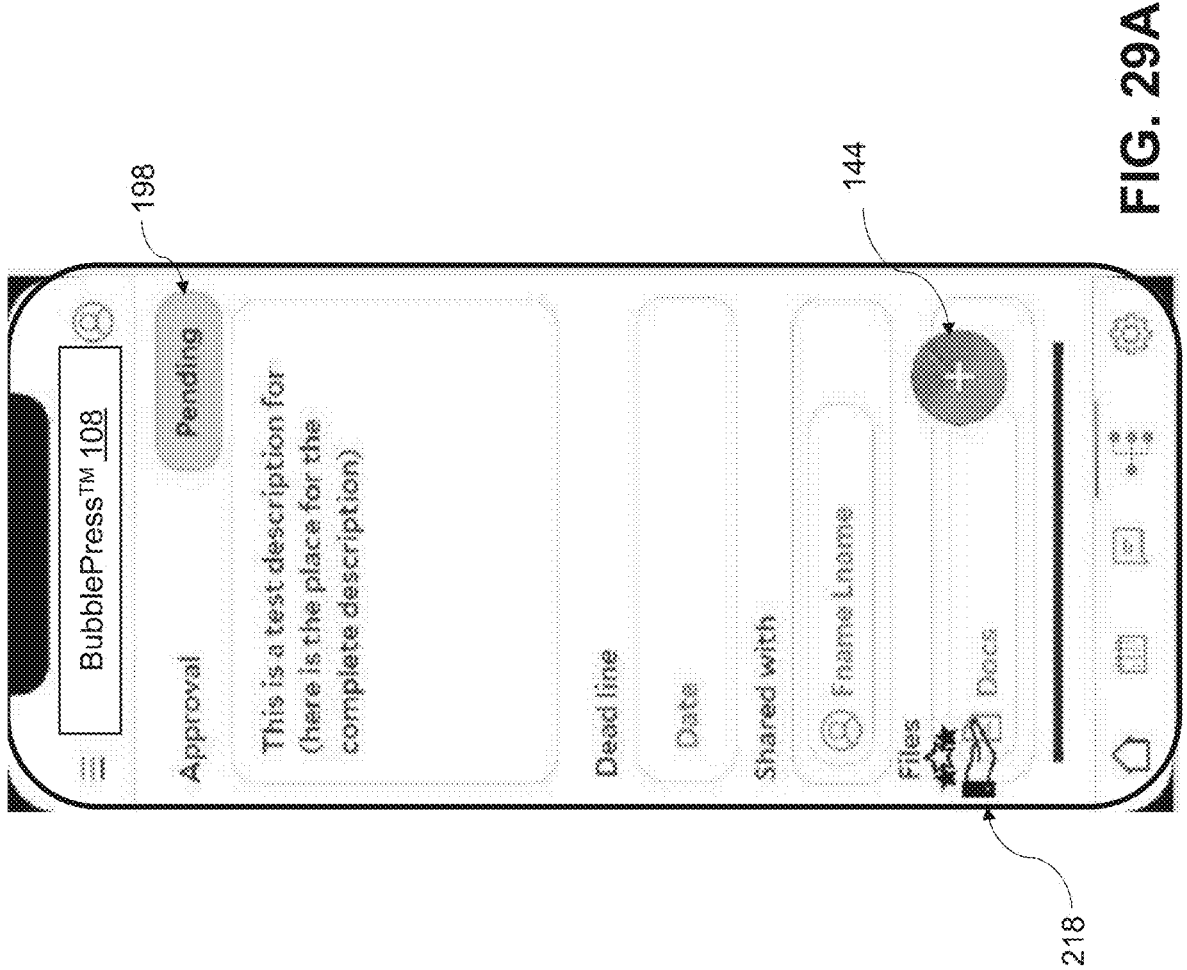
FIG. 29A depicts a user-side schematic diagram depicting a pending approval of a document transfer in a BubblePress™ application of a system, in accordance with embodiments of the present invention.
Figure 29B:
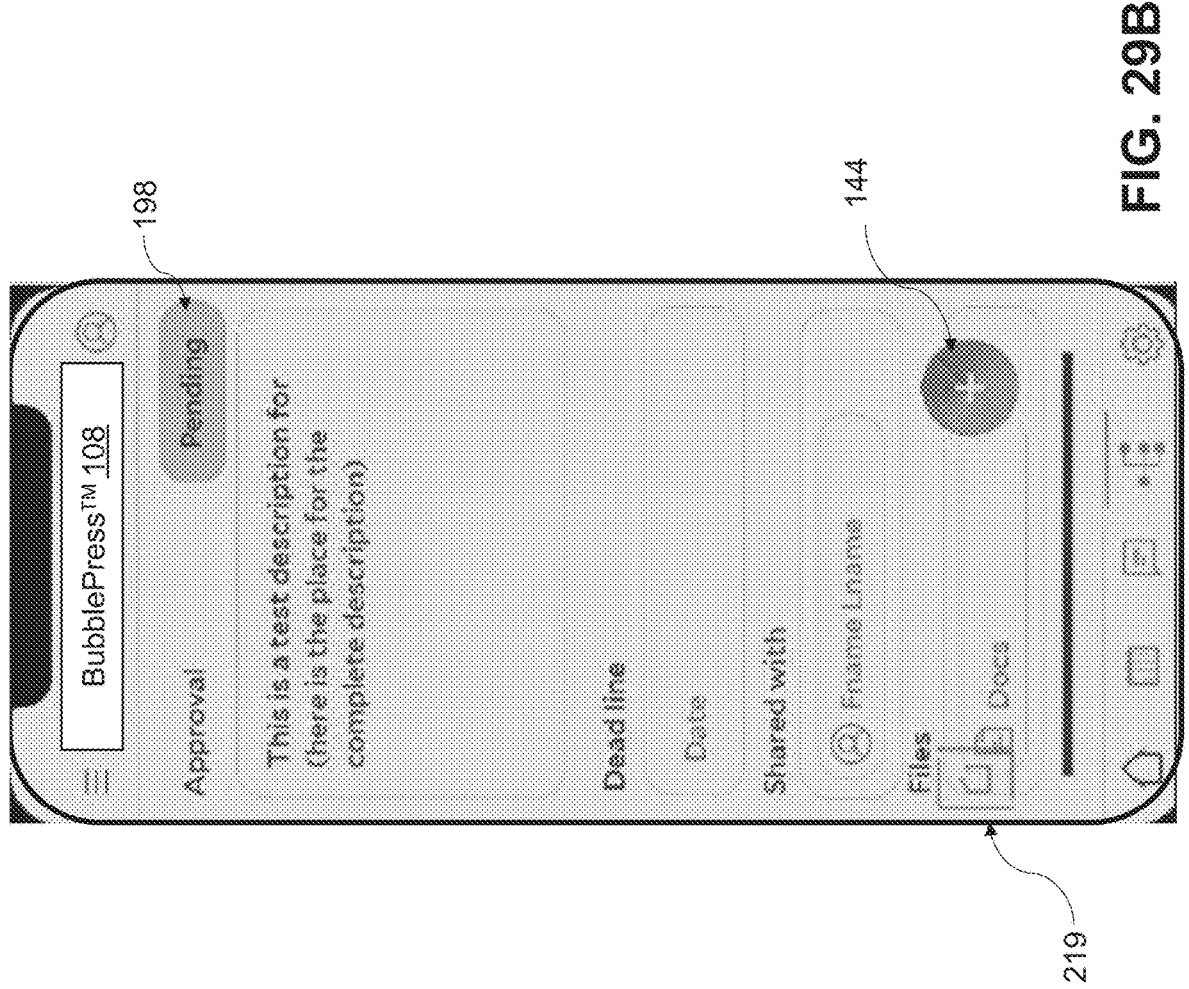
FIG. 29B depicts a schematic diagram depicting a pending approval of a document transfer in a BubblePress™ application of a system that is configurable and stream/time-freezed (e.g., for adoption and specification of push and pull service forms with criteria and options e.g. priorities, trusted third party authorization with validity interval with reminder, deadline, push/pull time stamp of each stakeholder, pull-acceptance, sharing level, security level, trusting level etc.), in accordance with embodiments of the present invention.

FIG. 29A depicts a user-side schematic diagram depicting a pending approval of a document transfer in a BubblePress™ application of a system. FIG. 29B depicts a schematic diagram depicting a pending approval of a document transfer in a BubblePress™ application of a system that is configurable and stream/time-freezed (e.g., for adoption and specification of push and pull service forms with criteria and options e.g. priorities, trusted third party authorization with validity interval, deadline, push/pull time stamp of each stakeholder, pull-acceptance, sharing level, security level, trusting level etc.). As shown in FIG. 29B, execution of the multi-colored plus circle 144 approves the IDtoPUSHto before expiration of a given deadline (e.g., a deadline to respond to a job offer).

Figure 30A:
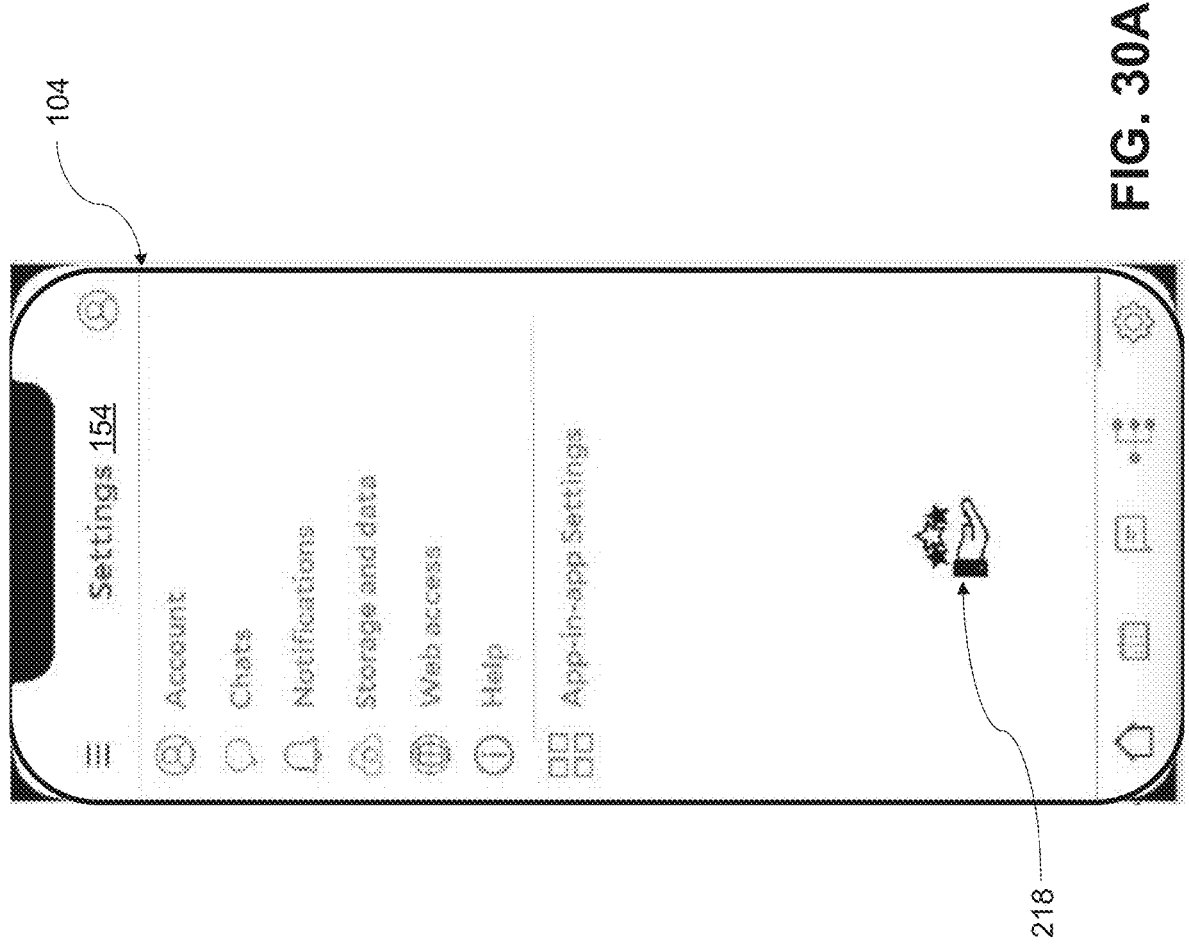
FIG. 30A depicts a user-side schematic diagram showcasing settings in a BubblePress™ application of a system, in accordance with embodiments of the present invention.
Figure 30B:
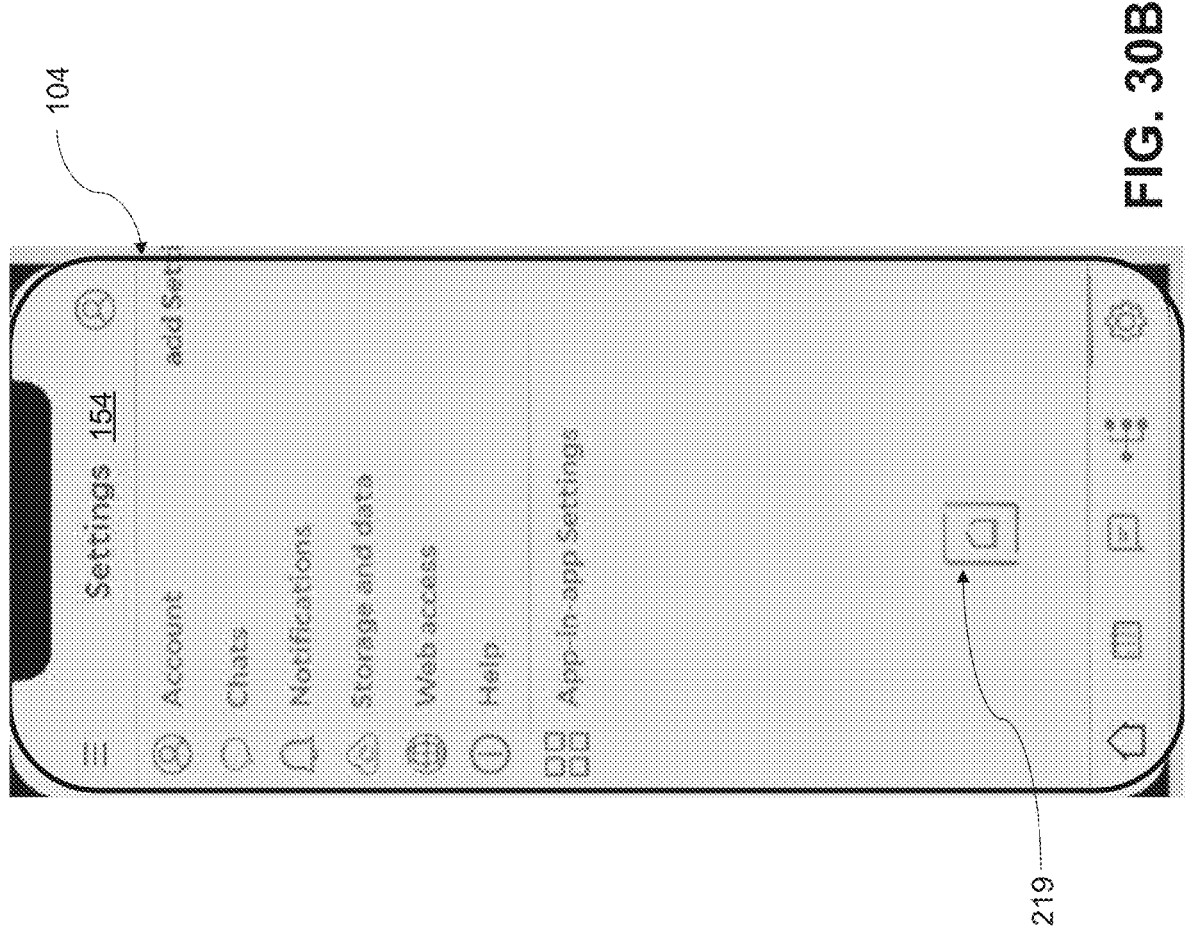
FIG. 30B depicts a schematic diagram showcasing settings in a BubblePress™ application of a system that assembles Beta-Feedback without edit right permissions, in accordance with embodiments of the present invention.

FIG. 30A depicts a user-side schematic diagram showcasing settings in a BubblePress™ application of a system. FIG. 30B depicts a schematic diagram showcasing settings in a BubblePress™ application of a system that assembles Beta-Feedback without edit right permissions.

The settings button 154, as shown in FIG. 30A and FIG. 30B, may allow the user 102 to modify an account, chats, notifications, storage and data, web access, or application-in-application settings. On the application-in-application element/structure, the settings for the creation of the circle may include resources, such as: time, money, material, energy, human power engagements/workload, an Internet of Things (IoT) method, an RFID verification method, a WLAN/WIFI pattern/connection strength method, a voice recognition method, a noise recognition method, user actions taken and/or screen time on the computing device, infrared light emitting diode (LED) light changes, among others not explicitly listed herein and their surrogates e.g. displacement over time or any resource management etc. As an illustrative example, the settings may be configured to only show availability during quiet times of the day.

Figure 31A:
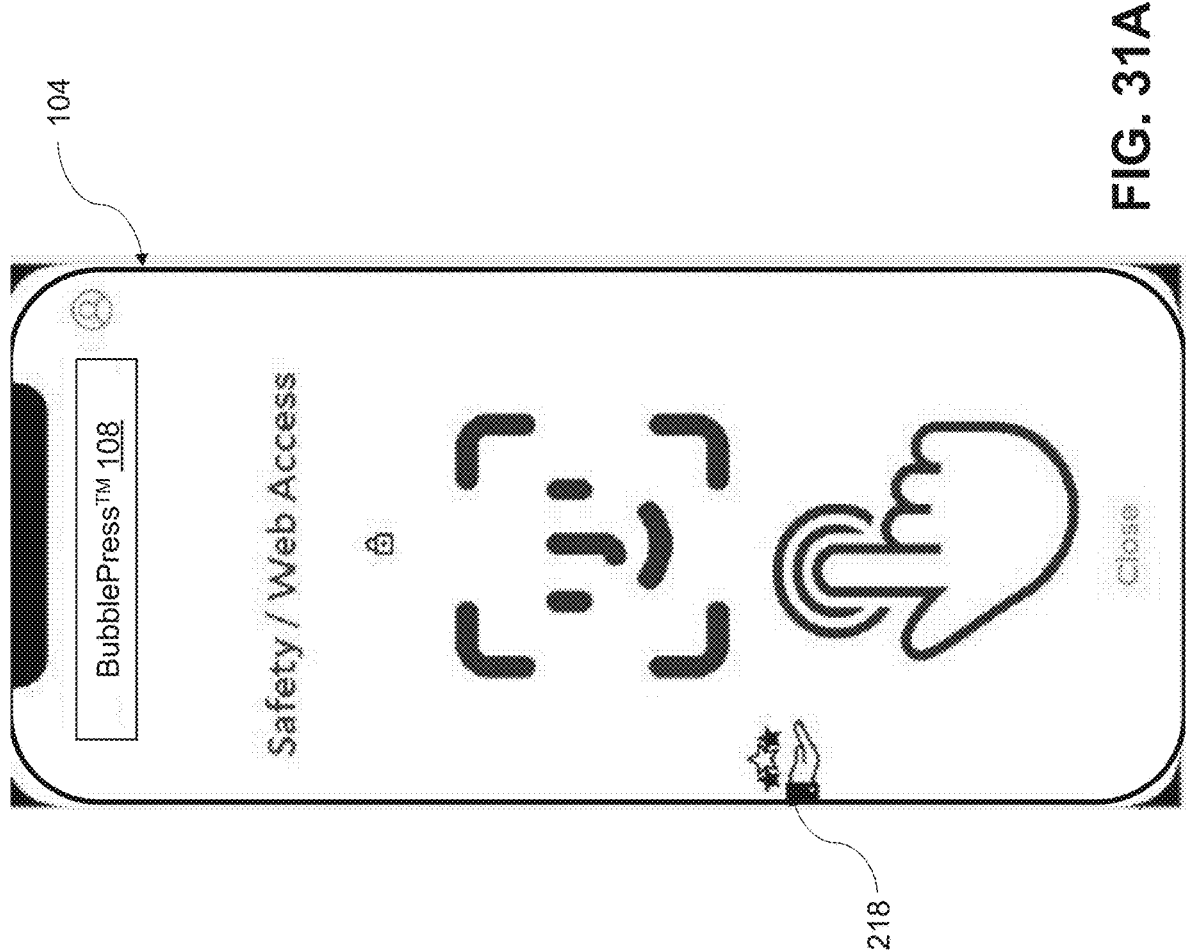
FIG. 31A depicts a user-side schematic diagram showcasing a first method to safely access the Internet via a BubblePress™ application of a system, in accordance with embodiments of the present invention.
Figure 31B:
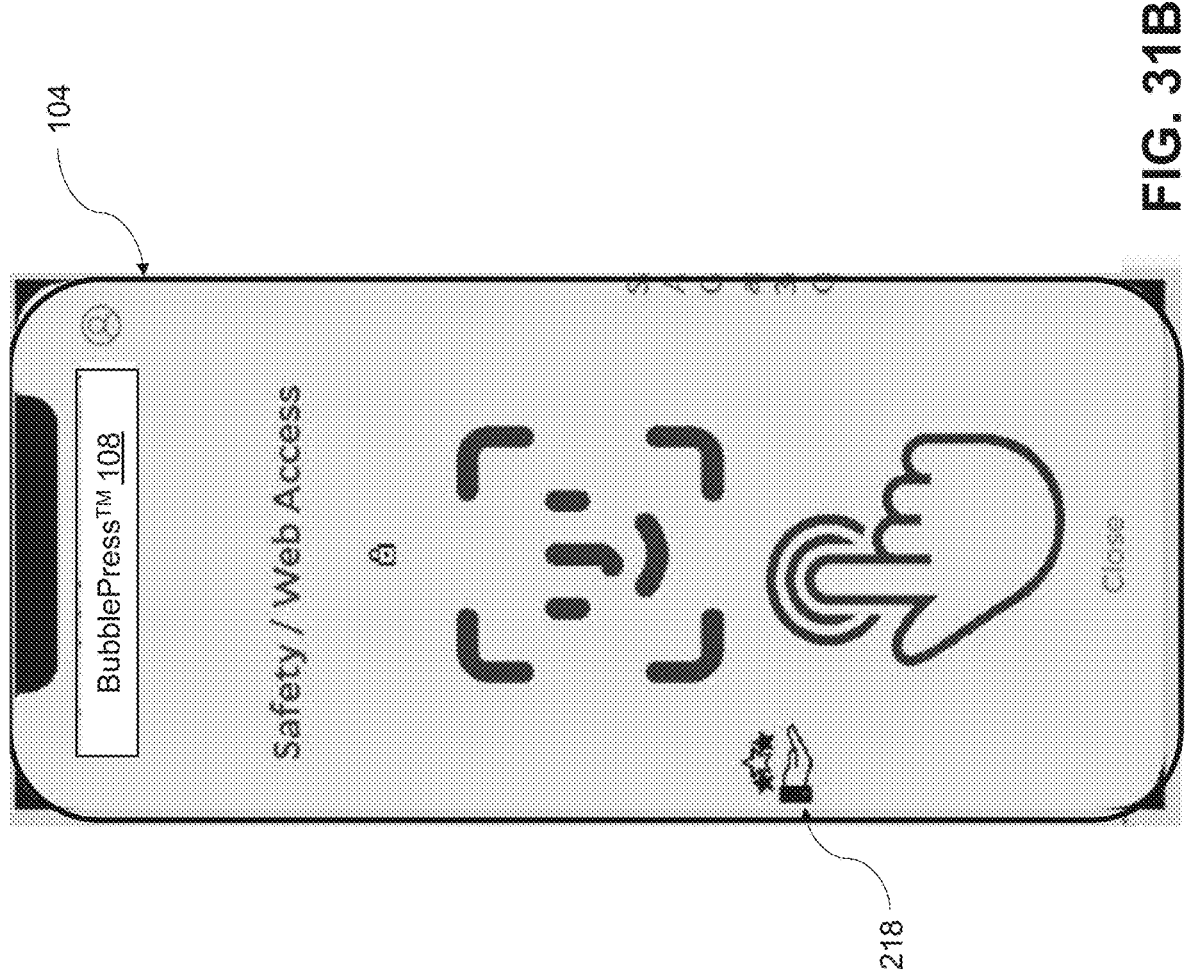
FIG. 31B depicts a schematic diagram showcasing a first method to safely access the Internet via a BubblePress™ application of a system that is configurable, in accordance with embodiments of the present invention.
Figure 32:
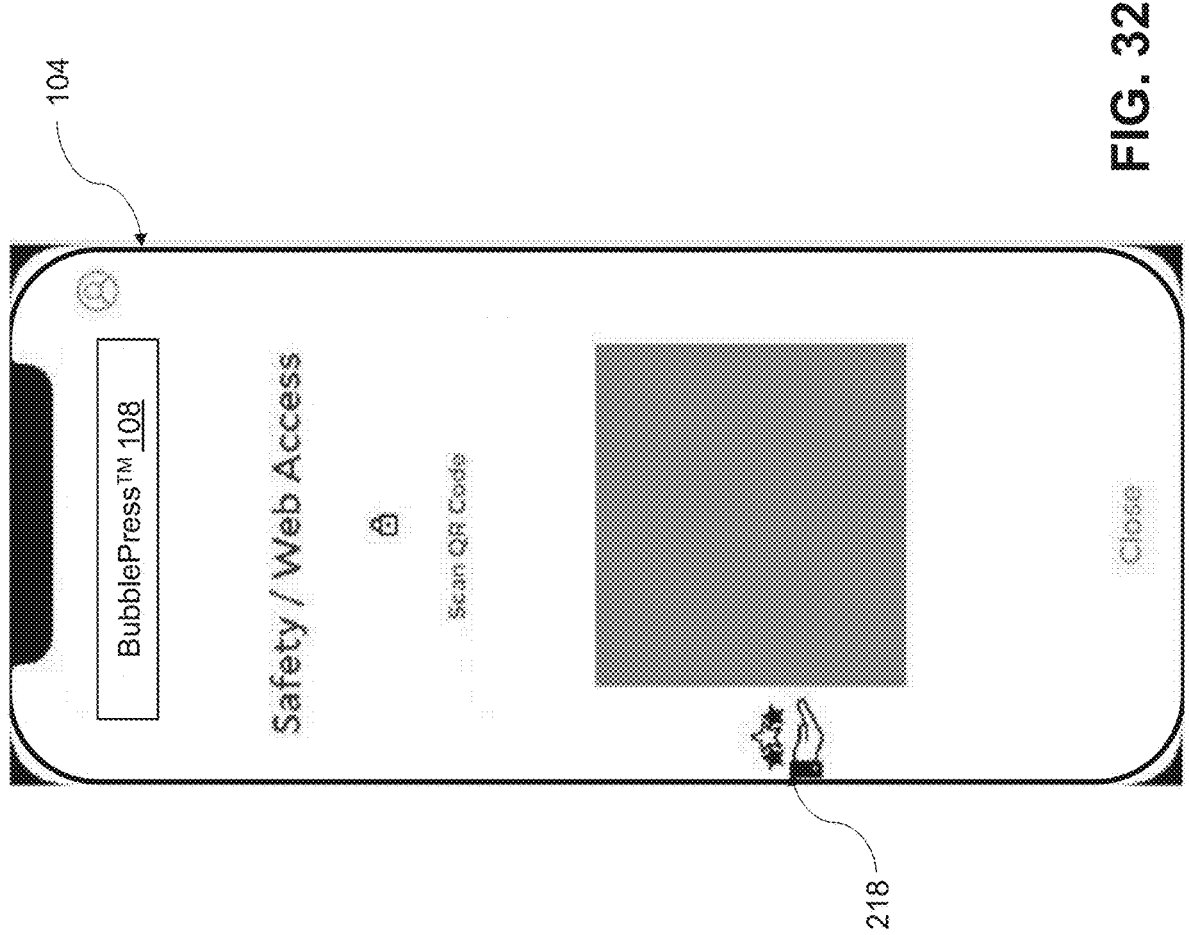
FIG. 32 depicts a user-side schematic diagram showcasing a second method to safely access the Internet via a QR code on a BubblePress™ application of a system, in accordance with embodiments of the present invention.

FIG. 31A depicts a user-side schematic diagram showcasing a first method to safely access the Internet via a BubblePress™ application of a system. FIG. 31B depicts a schematic diagram showcasing a first method to safely access the Internet via a BubblePress™ application of a system that is configurable. FIG. 32 depicts a user-side schematic diagram showcasing a second method to safely access the Internet via a QR code on a BubblePress™ application of a system.

Figure 34:
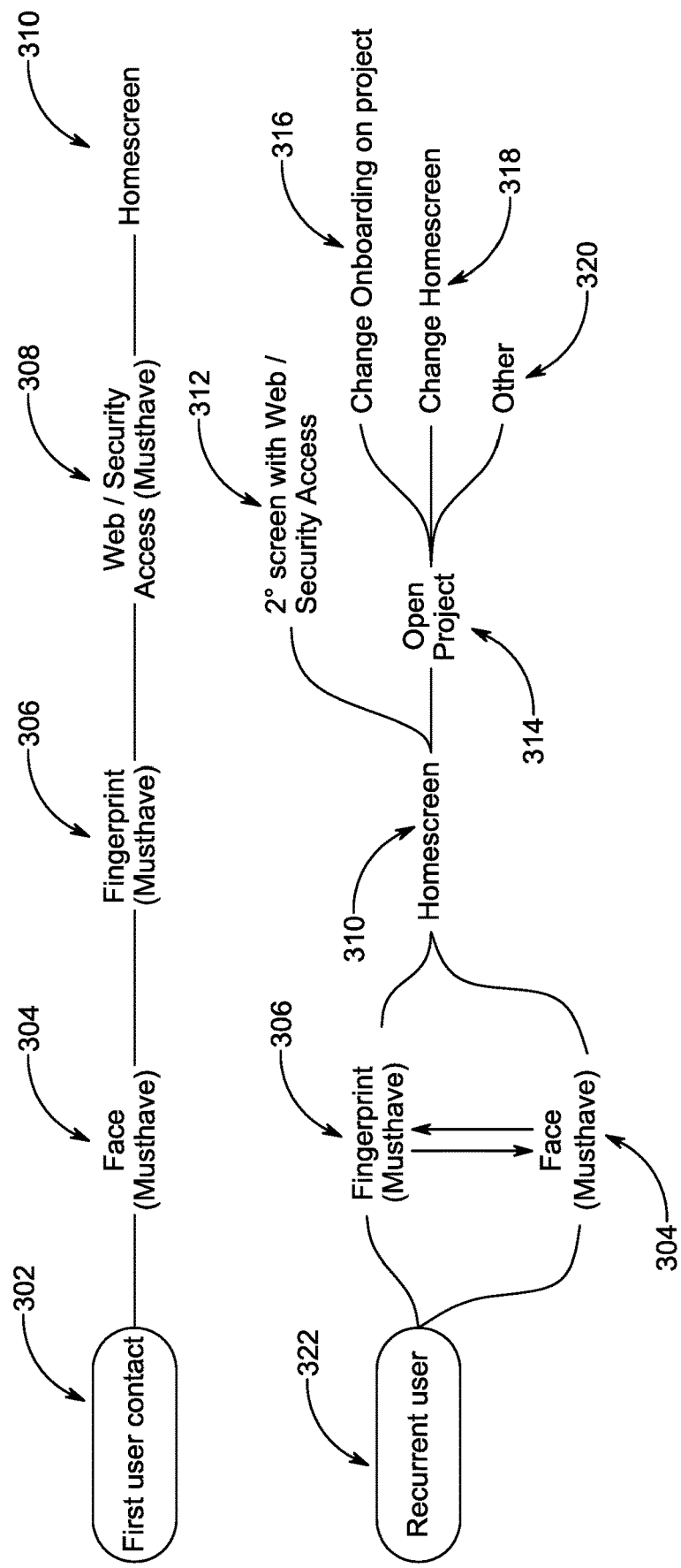
FIG. 34 depicts a schematic diagram associated with onboarding a first user contact and a recurrent user, in accordance with embodiments of the present invention.

Moreover, FIG. 34 depicts a schematic diagram associated with onboarding a first user contact and the recurrent user. Both a first user contact 302 and a recurrent user 322 are depicted in FIG. 34. For the first user contact 302, face authentication 304 (also shown in FIG. 3A), a fingerprint authentication 306 (also shown in FIG. 4, FIG. 5A, and FIG. 6), and/or a web/security access 308 leads to the Home Screen 310 (also shown in FIG. 13A).

For the recurrent user 322, the fingerprint authentication 306 (also shown in FIG. 4, FIG. 5A, and FIG. 6) and/or the face authentication 304 (also shown in FIG. 3A) lead to the Home Screen 310 (also shown in FIG. 13A). From the Home Screen 310, the recurrent user 322 may open a project 314 or access a secondary screen with a web/security access option 312 (as shown in FIG. 31A and FIG. 31B). From the opening of the project 314, the recurrent user 322 may change the onboarding of a project 316, may change the Home Screen on the projects, or may perform another option 320.

It should be appreciated that, in some implementations, the BubblePress™ application 108 may comprise an artificial intelligent (AI) assistant or engine (not shown). The AI assistant or engine may be used to provide the user 102 with best matched suggestions of private inputs or public trusted inputs (e.g., for the insertion of other circles into the circles or the suggestions of user inputs, such as words, ∞™ i-bubbletags, or hashtag inputs). This allows intelligent remote preconfigured personal answers "off-hand" and the provision of suggested answers on the GUI 112.

Moreover, no-coding commands for action/flow/case/app-visualizations-example-links/reminders are attached in the Appendix section.

Example

Healthcare has been historically characterized by information asymmetry. One of the four priorities of action areas that have been mentioned in the Swiss government's media report "Health 2020" is to create transparency on a high level that should simplify the system, the management of healthcare policy, and the implementation of healthcare within an international environment. The goal was to implement measures with the involvement of key stakeholders, to implement transparent structures, and to introduce better and more clearly regulated controls. Despite the requested support of self-competence in public health, there is still no equivalence and no opportunities established on the lowest level of stakeholders to monitor/share processes and get non-identifiable transparency at a higher level. Dissatisfaction, bad clinical outcomes and/or cost explosions must always be avoided for the sake of obtaining objective information.

A system as complex as healthcare cannot be understood without objective information. Bringing transparency into focus is indispensable for several reasons. First, transparency is a shared responsibility, and process transparency can be shared over boundaries and leadership responsibilities, allowing learning to occur from other process landscapes anonymously and without the need to access rights. Second, new generations are more open to sharing information beyond boundaries in order to obtain a better understanding of their humanity.

Cost transparency in healthcare should be deeply linked to a microeconomic approach with process related efficiencies and clinically-evident outcomes. In order to satisfy this need of medical information in the field of healthcare services, each stakeholder who is willing to share registered approved performance measurements, approved feedback and approved quality outcome should do so, and in return take advantage of the gathered data. The present invention provides an application that solves this need for micro- and macro-performance data beyond boundaries with the details necessary to be useful.

Medical information systems are core systems when it comes to microeconomic healthcare systems. The present invention leverages experience based, qualitative analysis of the information channel systems in healthcare according to a certain degree of modularity or subsystem. These modularities or subsystems are described by channel criteria, such as permeability (e.g., access/interface possibilities, simplicity/non-complexity, non-resistance, degree of perception, interaction, and/or spread), formal value (e.g., modular standards/structuring/systematic completion of hidden agendas, integrated data, degree of visualization, standard language, and/or prioritizing or bundling) and (re-)liability (e.g., confidentiality, non-volatility, liability/responsibilities, and/or data protocol/mirror).

Further, current healthcare channels have human disconnected, inner- and inter-channel differences and flaws. Moreover, current medical information channels are only optimized in a particular area. In areas of high interest, such as communication, collaboration, and productivity, there are almost no current possibilities or capabilities for enhancement or facilitation. In other words, it seems like there is no area in the system that would encourage people to use them and make them more functional. This is very problematic because from the patient and doctor's perspective, the major actors don't want to or can't interact or are dependent on multi-channeling, over-processing and parallel communications. When comparing the smart medical information system of the present invention to the "current normal" of medical information systems, a back-dated status within segregated systems is realized, which may be replaced by the present biometric verified, crypto secured, flexible, in-stream and dynamic application.

Thus, as described herein, the BubblePress™ application 108 allows for data collection and sharing of timely determined personal or/and specific collaborative resource streams. Specifically, the streams created in the BubblePress™ application 108 are associated with resource measurements of personal interests that are coded in options and can be combined to set of options. As such, the combined resource measurements are associated with different personal interests.

As described herein, "value-stream mapping" is a lean-management method for analyzing the current state and designing a future state for the series of events that take a product or service from the beginning of the specific process until it reaches the customer.

Since the BubblePress™ application 108 of the present invention has a value stream, the BubblePress™ application 108 is a supply chain application. In fact, the i-Bubble™ represents not only a chain, but is a supply chain projection of any resource and the BubblePress™ application 108 uses bubbles to visualize them (e.g., digital, real live, and digital-real life synchronized). The BubblePress™ application 108 utilizes them to optimize the order for seamless chains/flow or estimate limitations/bottlenecks upfront within other chains of other systems. The BubblePress™ application 108 may be useful to identify bottlenecks, repetitions with prolonged work cycles, errors and work overflow, etc. to improve supply chain performance. Though the BubblePress™ application 108 was described herein in the healthcare space, the BubblePress™ application 108 may be used in other sectors to improve supply chain performance.

Computer System

Figure 33:
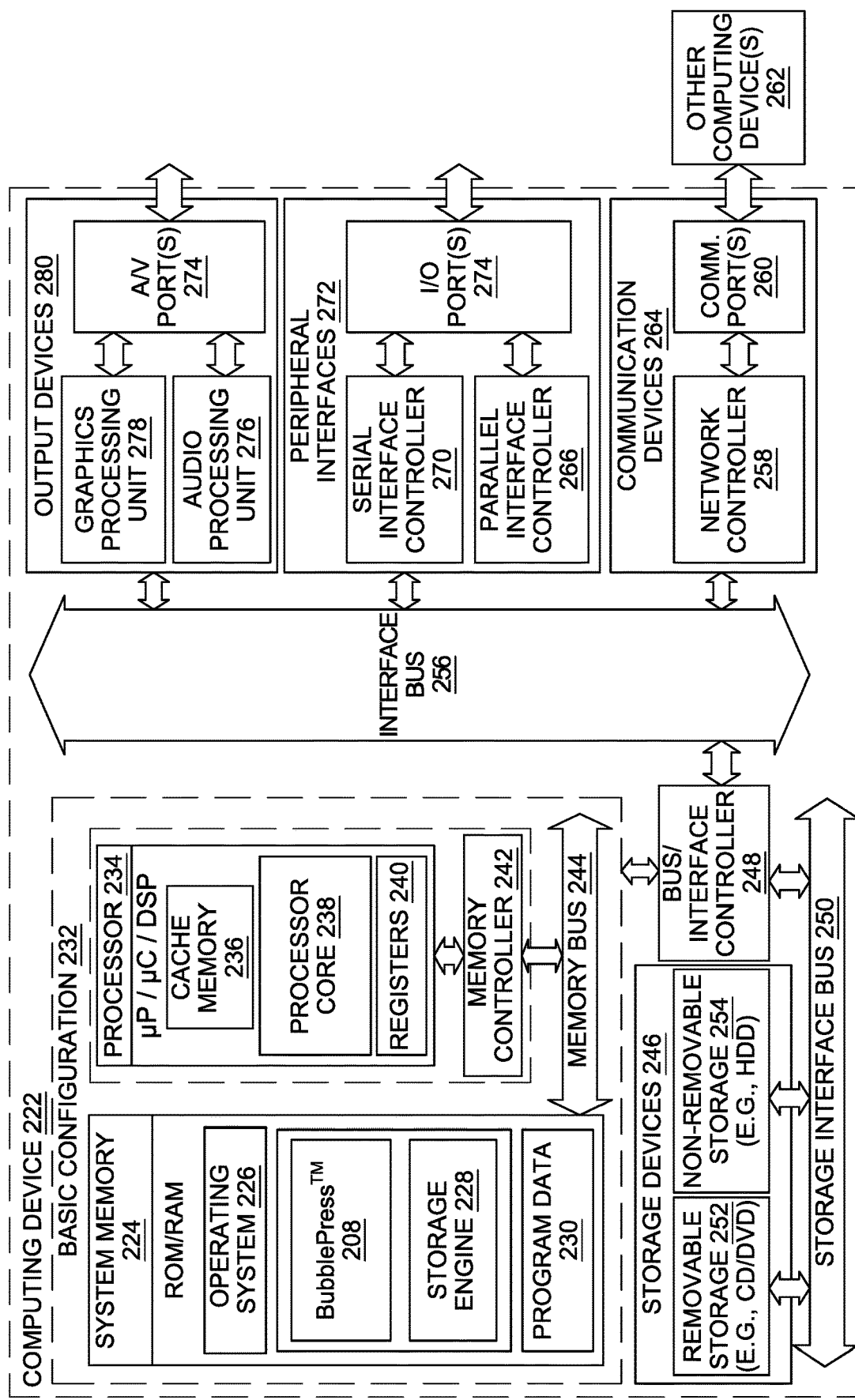
FIG. 33 is a block diagram of a computing device included within the computer system of FIG. 1 that is configured to implement a method, in accordance with embodiments of the present invention.

FIG. 33 is a block diagram of a computing device included within the computer system of FIG. 1 that is configured to implement a method described herein. In some embodiments, the present invention may be a computer system, a method, and/or the computing device 222 (of FIG. 33). For example, the computer system and/or the computing device 222 may be utilized to implement one or more methods described herein.

A basic configuration 232 of a computing device 222 is illustrated in FIG. 33 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an non-coding operating system 226, one or more applications, such as the BubblePress™ application 108, and program data 230. In some embodiments, the BubblePress™ application 108 may be an engine, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps described herein. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by an application of a computing device to provide enhanced communication between users, the method comprising:
   receiving a prompt to authenticate a user via a verification method;
   in response to authenticating the user, providing the user with access to an application, wherein the application is built on a created programming/management system, an application flow, a human flow, or a streams application-in-application element or structure;
   receiving, via a graphical user interface (GUI) of the computing device and from the user, a representation from said programming/management system wherein the representation is associated with at least an input and a tag associated with text wherein the representation comprises multiple segments each of which is addressed by the tag, the multiple segments being able to be fused into a single representation;
   wherein the tag is selected from the group consisting of: #- or olo or ∞ for any digital resource equivalent/flow/structured content/structured words/structured values with + to add, and
   wherein the #- or olo are automatically converted to the ∞;
   receiving, via the GUI and from the user, a selection of a color, a sharing level (public or private sharing), a trusting level by way of authentication, and a security level that is crypto secure for the representation;
   pushing the representation to a thread based on the sharing level; and
   receiving an action executed on the text of the tag to find data streams associated with the text of the tag,
      wherein when a word or sentence of a message is addressed by the tag, the word or sentence becomes visualized on a mobile screen.

2. The method of claim 1, wherein the application is an inter-programmable operating system in flows/streams and Cross-Services on which templates of services or projects are developed, provided, and shared.

3. The method of claim 2, wherein the Cross-Services comprise virtual communication services that allow for communication, collaboration, and service productivity between the user and one or more other users,
   wherein the Cross-Services allow the user to define measurable resources on options or option sets within the application such that over time, at least one of: money, material, human power engagements/workload, an Internet of Things (IoT) method, RFID verification, WLAN/WIFI pattern/connection strength, voice recognition, noise recognition, user actions taken on the computing device, screen time on the computing device, and infrared light emitting diode (LED) light changes, and their surrogates are combinable and/or shared with other streams, and
   wherein the surrogates comprise displacement over time that define a stream.

4. The method of claim 2, wherein the templates of services and projects comprise supply chain capabilities.

5. The method of claim 1, wherein the application comprises a collaboration and productivity management tool.

6. The method of claim 5, wherein the collaboration and productivity management tool comprises an artificial intelligent (AI) no-coding interface.

7. The method of claim 1, wherein the verification method is selected from the group consisting of: a biometric identification method and a method utilizing login credentials.

8. The method of claim 7, wherein the biometric identification method is selected from the group consisting of: a facial identification method, a fingerprint identification method, a palm print identification method, an iris recognition method, and a retina recognition method.

9. The method of claim 1, further comprising:
   receiving, from another user, an action executed on the text of the tag of the representation of the programming/management system to locate information flows associated with the text of the tag.

10. The method of claim 1, further comprising:
    combining the representation of the programming/management system with one or more other representations to create a structure,
    wherein the structure is selected from the group consisting of: a menu/circle and a flow structure, and wherein the flow structure is selected from the group consisting of: steps, flow representations, spaghettis, sequences, chains, cycles, and decision trees.

11. The method of claim 1, further comprising:
    receiving, via the GUI, an action on a circle to open or create a new project, an application flow/human flow application-in-application elements/structures or an appearance structure, wherein the appearance is selected from the group consisting of: a high level programming/management system, a checklist, a to-do list, a note, a spreadsheet, and a form.

12. The method of claim 1, further comprising:
    receiving, via the GUI, an action on a streams icon, a Feeds icon, a push and pull icon, or a settings icon, and wherein the push and pull icon is used for services in a Center/«Push and Pull Service Center».

13. The method of claim 12,
    wherein the Feeds icon allows for sharing of at least one of: words, a high-level programming/management system and other appearances, specific application flows, human flow/streams, pushes/pulls, and the programming/management system or application-in- application elements/structures, and
    wherein each of the programming/management system or application-in-application elements/structures are selected from the group consisting of: steps, flow representations, spaghettis, sequences, chains, cycles, decision trees, and appearances.

14. The method of claim 12, wherein the push and pull icon allows for two-sided or multi-sided sharing of the representation of the programming/management system with an approve-reject tandem action ID push and ID pull button that enforces trusted third-parties.

15. The method of claim 12,
    wherein the settings icon allows for an adoption of Feed settings and Center settings, wherein the settings icon allows for a creation of application-in-application settings, and wherein the application-in-application settings are selected from the group consisting of:
personal resources, one-way-action buttons, tandem-action buttons, and a menu/circle with an add-on or split function.

16. The method of claim 1, further comprising:
receiving, via the GUI and through a contact channel, at least one of: communication, contacts, profiles, channels, jobs, job applications, and engagements from the user to one or more other users, wherein the contact channel is trusted based on a verification method.

17. The method of claim 1, further comprising:
providing the user safe access to the web via a biometric method or via scanning a QR code.

18. The method of claim 1, wherein the application comprises an artificial intelligent (AI) assistant or engine configured to provide the user with best matched suggestions of private inputs or public trusted inputs.

19. A computer system comprising:
one or more processor;
one or more memories; and
one or more computer-readable hardware storage devices, the one or more computer-readable hardware storage devices containing program code executable by the one or more processors via the one or more memories to implement a method for providing enhanced communication between users, the method comprising:
receiving a prompt to authenticate a user via a verification method;
in response to authenticating the user, providing the user access to an application, wherein the application is built on created human flow elements;
receiving, from the user, a representation of the programming/management system associated with at least an input and a tag associated with text wherein the representation is marked as high level or low level;
wherein the tag is selected from the group consisting of: #- or olo or ∞ for any digital resource equivalent/flow/structured content/structured words/structured values with + to add, and
wherein the #- or olo are automatically converted to the ∞;
receiving, from the user, a selection of a color, a sharing level (public or private sharing), trusting level by way of authentication and security level that is crypto secure for the representation;
combining the representation with one or more other representations to create a structure, wherein the structure is a menu; and
receiving an action executed on the text of the tag to find data streams associated with the text of the tag, wherein when a word or sentence of a message is addressed by the tag, the word or sentence becomes visualized on a mobile screen.

20. The computer system of claim 19,
wherein the application is an inter-programmable operating system in streams and Cross- Services on which templates of services or projects are developed, provided, shared and individualized,
wherein the Cross-Services comprise virtual communication services that allow for communication between the user and one or more other users and for the user to define resources on options within the application such that over time, a stream is created that is combinable with other streams, and
wherein the templates of services and projects comprise supply chain capabilities.

21. The computer system of claim 19,
wherein the application comprises a biometric verified, crypto secure, flexible in-stream and dynamic no coding core system application.

22. The computer system of claim 19,
wherein the tags are selected from the group consisting of: 0 and/or =? as element content, { } for a Cross-Service sub-specification, @ for contacts/profiles and channels, @ @ @ for third parties, @ to @ for pushes to the contacts, $$ for security level specifications, !trusted for trusted content, ?nottrusted for not trusted content, '<@>;' for email addresses, and < > for color/color-priority specifications, _ 'underline' or - or hyphen used for sub specifications or stewardness specifications and to replace the spaces as no spaces are allowed within the commands, and // // for comments, and
wherein an IDpush and IDpull button are used for services in a Center/«Push and Pull Service Center.

23. A method executed by an application of a computing device to provide enhanced communication between users, the method comprising:
receiving a prompt to authenticate a user via a verification method;
in response to authenticating the user, providing the user with access to an application, wherein the application is built on a created representation associated with at least an input, an application flow, a human flow, or a streams application-in-application element or structure;
receiving, via a graphical user interface (GUI) of the computing device and from the user, the representation associated with at least an input and a tag associated with text wherein the representation comprises multiple segments each of which is addressed by a tag, the multiple segments being able to be fused into a single representation;
wherein the tag is selected from the group consisting of: #- or olo or ∞ for any digital resource equivalent/flow/structured content/structured words/structured values with + to add, and
wherein the #- or olo are automatically converted to the ∞;
receiving, via the GUI and from the user, a selection of a color, a sharing level (public or private sharing), a trusting level by way of authentication, and a security level that is crypto secure for the representation, wherein the representation may be combined with one or more other representations to create a structure, wherein the structure is a menu;
pushing the representation to a thread based on the sharing level; and
receiving an action executed on the text of the tag to find data streams associated with the text of the tag, wherein when a word or sentence of a message is addressed by the tag, the word or sentence becomes visualized on a mobile screen.

24. A computer system comprising:
one or more processor;
one or more memories; and
one or more computer-readable hardware storage devices, the one or more computer-readable hardware storage devices containing program code executable by the one or more processors via the one or more memories to implement a method for providing enhanced communication between users, the method comprising:

receiving a prompt to authenticate a user via a verification method;

in response to authenticating the user, providing the user access to an application, wherein the application is built on created human flow elements;

receiving, from the user, a representation associated with at least an input and a tag associated with text wherein the representation is marked as high level or low level;

wherein the tag is selected from the group consisting of: #- or olo or ∞ for any digital resource equivalent/flow/structured content/structured words/structured values with + to add and wherein the #- or olo are automatically converted to the ∞;

receiving, from the user, a selection of a color, a sharing level (public or private sharing), trusting level by way of authentication and security level that is crypto secure for the representation;

combining the representation with one or more other representations to create a structure wherein the structure is a menu; and receiving an action executed on the text of the tag to find data streams associated with the text of the tag, wherein when a word or sentence of a message is addressed by the tag, the word or sentence becomes visualized on a mobile screen.

* * * * *